US012462757B2

(12) United States Patent
Wang et al.

(10) Patent No.: US 12,462,757 B2
(45) Date of Patent: Nov. 4, 2025

(54) PIXEL DRIVING CIRCUIT AND DRIVING METHOD THEREOF, AND DISPLAY PANEL

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Miao Wang, Beijing (CN); Yunsheng Xiao, Beijing (CN)

(73) Assignees: Chengdu BOE Optoelectronics Technology Co., Ltd., Sichuan (CN); Beijing BOE Technology Development Co., Ltd., Beijing (CN)

(*) Notice: Subject to any disclaimer, the term of this patent is extended or adjusted under 35 U.S.C. 154(b) by 0 days.

(21) Appl. No.: 18/255,183

(22) PCT Filed: Jun. 30, 2022

(86) PCT No.: PCT/CN2022/103187
§ 371 (c)(1),
(2) Date: May 31, 2023

(87) PCT Pub. No.: WO2024/000547
PCT Pub. Date: Jan. 4, 2024

(65) Prior Publication Data

US 2024/0363073 A1 Oct. 31, 2024

(51) Int. Cl.
*G09G 3/3258* (2016.01)

(52) U.S. Cl.
CPC ... *G09G 3/3258* (2013.01); *G09G 2300/0426* (2013.01); *G09G 2300/0819* (2013.01);
(Continued)

(58) Field of Classification Search
None
See application file for complete search history.

(56) References Cited

U.S. PATENT DOCUMENTS 10,546,535 B2 * 1/2020 Dong .................. G09G 3/3233
10,714,005 B2 * 7/2020 Ling .................. G09G 3/3233
(Continued)

FOREIGN PATENT DOCUMENTS

CN 107731143 A 2/2018
CN 110648631 A 1/2020
(Continued)

*Primary Examiner* — Fred Tzeng
(74) *Attorney, Agent, or Firm* — Dority & Manning, P.A.

(57) ABSTRACT

A pixel driving circuit includes a driving sub-circuit, a writing sub-circuit, a compensation sub-circuit and an adjustment sub-circuit. The driving sub-circuit is coupled to a first node, a second node, and a third node. The writing sub-circuit is coupled to the second node, a first scan signal terminal and a data signal terminal. The compensation sub-circuit is coupled to the first node, the third node and a compensation control terminal. The adjustment sub-circuit is coupled to the second node and/or the third node, a second scan signal terminal and a first reference voltage signal terminal. The adjustment sub-circuit is configured to, in a light-emitting adjustment phase, transmit a reference voltage signal received at the first reference voltage signal terminal to the second node and/or the third node under control of a scan signal transmitted by the second scan signal terminal.

19 Claims, 31 Drawing Sheets

(52) U.S. Cl.
CPC ................. *G09G 2310/061* (2013.01); *G09G 2320/0233* (2013.01); *G09G 2320/0247* (2013.01)

(56) References Cited

U.S. PATENT DOCUMENTS

| | | | | |
|---|---|---|---|---|
| 10,825,396 | B2 * | 11/2020 | Chen | G09G 3/3258 |
| 10,923,032 | B2 * | 2/2021 | Qing | G09G 3/3275 |
| 10,923,039 | B2 * | 2/2021 | Yu | G09G 3/3233 |
| 11,328,669 | B2 * | 5/2022 | Qin | G09G 3/325 |
| 11,532,267 | B2 * | 12/2022 | Feng | G09G 3/3208 |
| 11,605,347 | B2 * | 3/2023 | Qin | G09G 3/3225 |
| 11,615,738 | B2 * | 3/2023 | Yue | G09G 3/3233 345/204 |
| 11,798,473 | B2 * | 10/2023 | Liu | G09G 3/3241 |
| 11,893,936 | B2 * | 2/2024 | Wang | G09G 3/3275 |
| 11,942,040 | B2 * | 3/2024 | Yokoyama | G09G 3/3266 |
| 11,978,380 | B2 * | 5/2024 | Qiu | G09G 3/3233 |
| 2014/0292623 | A1 | 10/2014 | Moon et al. | |
| 2018/0240407 | A1 | 8/2018 | Chaji | |
| 2018/0374417 | A1 * | 12/2018 | Yang | G09G 3/3233 |
| 2019/0103055 | A1 * | 4/2019 | Gao | G09G 3/3233 |
| 2019/0130830 | A1 * | 5/2019 | Han | G09G 3/3233 |
| 2019/0189053 | A1 | 6/2019 | Kim et al. | |
| 2019/0272785 | A1 * | 9/2019 | Qian | G09G 3/3208 |
| 2020/0013336 | A1 * | 1/2020 | Yang | G09G 3/3266 |
| 2020/0243009 | A1 * | 7/2020 | Li | G09G 3/3233 |
| 2020/0273406 | A1 * | 8/2020 | Xu | G09G 3/3233 |
| 2020/0302867 | A1 * | 9/2020 | Gao | G09G 3/3275 |
| 2020/0357337 | A1 | 11/2020 | Kim et al. | |
| 2021/0027706 | A1 * | 1/2021 | Zhang | G09G 3/3233 |
| 2021/0104196 | A1 * | 4/2021 | Yuan | G09G 3/3258 |
| 2021/0225293 | A1 | 7/2021 | Wang | |
| 2021/0375198 | A1 | 12/2021 | Zhang et al. | |
| 2022/0076601 | A1 | 3/2022 | Sun et al. | |
| 2022/0180810 | A1 | 6/2022 | Zhang et al. | |
| 2022/0309991 | A1 * | 9/2022 | Yuan | G09G 3/32 |
| 2022/0327997 | A1 * | 10/2022 | Liu | G09G 3/3233 |
| 2023/0042966 | A1 * | 2/2023 | Huangfu | G09G 3/3258 |
| 2023/0136129 | A1 * | 5/2023 | Qiu | G09G 3/3233 345/214 |
| 2024/0105119 | A1 * | 3/2024 | Liu | G09G 3/3233 |
| 2024/0135885 | A1 * | 4/2024 | Shi | G09G 3/3258 |
| 2024/0144880 | A1 * | 5/2024 | Zhu | G09G 3/3233 |
| 2024/0169904 | A1 * | 5/2024 | Liu | G09G 3/3233 |
| 2024/0233635 | A1 * | 7/2024 | Wang | G09G 3/3233 |
| 2024/0304142 | A1 * | 9/2024 | Yu | G09G 3/3208 |
| 2024/0339077 | A1 * | 10/2024 | Li | G09G 3/3208 |
| 2024/0355287 | A1 * | 10/2024 | Tanaka | G09G 3/3233 |
| 2024/0360065 | A1 * | 10/2024 | Flint | C07C 29/38 |
| 2024/0379057 | A1 * | 11/2024 | Yu | G09G 3/32 |

FOREIGN PATENT DOCUMENTS

| | | | |
|---|---|---|---|
| CN | 212256866 | U | 12/2020 |
| CN | 112908266 | A | 6/2021 |
| CN | 113012634 | A | 6/2021 |
| CN | 113096604 | A | 7/2021 |
| CN | 113593478 | A | 11/2021 |
| CN | 114078430 | A | 2/2022 |

* cited by examiner

PIXEL DRIVING CIRCUIT AND DRIVING METHOD THEREOF, AND DISPLAY PANEL

CROSS-REFERENCE TO RELATED APPLICATION

This application is a national phase entry under 35 USC 371 of International Patent Application No. PCT/CN2022/103187, filed on Jun. 30, 2022, which is incorporated herein by reference in its entirety.

TECHNICAL FIELD

The present disclosure relates to the field of display technologies, and in particular, to a pixel driving circuit, a driving method of a pixel driving circuit, and a display panel.

BACKGROUND

An active-matrix organic light-emitting diode (AMOLED) display panel has many advantages such as self-luminescence, ultra-small thickness, quick response, high contrast and a wide viewing angle, and is a display device that has been widely concerned.

The AMOLED display panel includes a plurality of pixel driving circuits and a plurality of light-emitting elements, and the pixel driving circuits are each used for driving a corresponding light-emitting element to emit light, thus realizing a display function.

SUMMARY

In an aspect, a pixel driving circuit is provided. The pixel driving circuit includes a driving sub-circuit, a writing sub-circuit, a compensation sub-circuit and an adjustment sub-circuit. The driving sub-circuit is coupled to a first node, a second node, and a third node. The driving sub-circuit is configured to transmit a voltage from the second node to the third node under control of a voltage of the first node. The writing sub-circuit is coupled to the second node, a first scan signal terminal and a data signal terminal. The writing sub-circuit is configured to, in a writing phase, transmit a data signal received at the data signal terminal to the second node under control of a gate scan signal received from the first scan signal terminal. The compensation sub-circuit is coupled to the first node, the third node, and a compensation control terminal. The compensation sub-circuit is configured to, in the writing phase, transmit a voltage of the third node to the first node under control of a compensation signal received from the compensation control terminal. The adjustment sub-circuit is coupled to the second node and/or the third node, and is further coupled to a second scan signal terminal and a first reference voltage signal terminal. The adjustment sub-circuit is configured to, in a light-emitting adjustment phase, transmit a reference voltage signal received at the first reference voltage signal terminal to the second node and/or the third node under control of a scan signal transmitted by the second scan signal terminal.

In some embodiments, the adjustment sub-circuit is further configured to, in a reset phase, transmit the reference voltage signal received at the first reference voltage signal terminal to the second node under the control of the scan signal transmitted by the second scan signal terminal, so as to reset the second node.

In some embodiments, the adjustment sub-circuit includes a second transistor. A gate of the second transistor is coupled to the second scan signal terminal, a first electrode of the second transistor is coupled to the second node, and a second electrode of the second transistor is coupled to the first reference voltage signal terminal.

In some embodiments, the driving sub-circuit includes a driving transistor. A gate of the driving transistor is coupled to the first node, a first electrode of the driving transistor is coupled to the second node, and a second electrode of the driving transistor is coupled to the third node.

In some embodiments, the writing sub-circuit includes a third transistor. A gate of the third transistor is coupled to the first scan signal terminal, a first electrode of the third transistor is coupled to the data signal terminal, and a second electrode of the third transistor is coupled to the second node.

In some embodiments, the first scan signal terminal is configured to control the third transistor to be turned on at least once before the first electrode of the third transistor is controlled to receive the data signal of the data signal terminal.

In some embodiments, the pixel driving circuit further includes a first storage sub-circuit. The first storage sub-circuit is coupled to a first voltage terminal and the second node. The first storage sub-circuit includes a first capacitor. A first electrode plate of the first capacitor is coupled to the first voltage terminal, and a second electrode plate of the first capacitor is coupled to the second node.

In some embodiments, the pixel driving circuit further includes a second energy storage sub-circuit. The second energy storage sub-circuit includes a second capacitor. A first electrode plate of the second capacitor is coupled to the first voltage terminal, and a second electrode plate of the second capacitor is coupled to the first node. C1 is greater than or equal to one fifth of Cst and is less than or equal to a half of Cst ($\frac{1}{5}Cst \le C1 \le \frac{1}{2}Cst$), C1 represents a capacitance of the first capacitor, and Cst represents a capacitance of the second capacitor.

In some embodiments, the pixel driving circuit further includes a first reset sub-circuit. The first reset sub-circuit is coupled to the first node, a first reset signal terminal, and a first initialization signal terminal. The first reset sub-circuit is configured to, in a reset phase, transmit an initialization signal received at the first initialization signal terminal to the first node under control of a reset signal received from the first reset signal terminal, so as to reset the first node.

In some embodiments, the first reset sub-circuit includes a fourth transistor group, and the fourth transistor group includes at least two fourth transistors that are connected in series. Gates of all fourth transistors in the fourth transistor group are coupled to the first reset signal terminal, a first electrode of a first fourth transistor in the fourth transistor group is coupled to the first node, and a second electrode of a last fourth transistor in the fourth transistor group is coupled to the first initialization signal terminal. The first reset signal terminal is configured to control at least one fourth transistor to be turned on at least once before a second electrode of the at least one fourth transistor is controlled to receive the first initialization signal of the first initialization signal terminal.

In some embodiments, the pixel driving circuit further includes a light-emitting control sub-circuit. The light-emitting control sub-circuit is coupled to a first voltage terminal, an enable signal terminal, the second node, the third node and a light-emitting device. The light-emitting control sub-circuit is configured to cooperate with the driving sub-circuit to transmit a driving signal to the light-emitting device under control of an enable signal from the enable signal terminal.

In some embodiments, the light-emitting control sub-circuit includes a fifth transistor and a sixth transistor. A gate of the fifth transistor is coupled to the enable signal terminal, a first electrode of the fifth transistor is coupled to the first voltage terminal, and a second electrode of the fifth transistor is coupled to the second node. A gate of the sixth transistor is coupled to the enable signal terminal, a first electrode of the sixth transistor is coupled to the third node, and a second electrode of the sixth transistor is coupled to the light-emitting device.

In some embodiments, the pixel driving circuit further includes a second reset sub-circuit. The second reset sub-circuit is coupled to a second reset signal terminal, a second initialization signal terminal, and the light-emitting device. The second reset sub-circuit is configured to transmit an initialization signal received at the second initialization signal terminal to the light-emitting device under control of a reset signal received from the second reset signal terminal.

In some embodiments, the second reset sub-circuit includes a seventh transistor. A gate of the seventh transistor is coupled to the second reset signal terminal, a first electrode of the seventh transistor is coupled to the light-emitting device, and a second electrode of the seventh transistor is coupled to the second initialization signal terminal.

In some embodiments, the second reset signal terminal and the second scan signal terminal are controlled in response to a same control signal.

In some embodiments, the reset signal received at the second reset signal terminal and the enable signal received at the enable signal terminal are inverted.

In some embodiments, a value of the reference voltage signal received at the first reference voltage signal terminal is in a range from −5 V to 5 V.

In some embodiments, the value of the reference voltage signal received at the first reference voltage signal terminal is approximately 2 V.

In another aspect, a driving method of a pixel driving circuit is provided. The pixel driving circuit includes: a driving sub-circuit, a writing sub-circuit, a compensation sub-circuit, a light-emitting control sub-circuit, and an adjustment sub-circuit. The driving sub-circuit is coupled to a first node, a second node and a third node. The writing sub-circuit is coupled to the second node, a first scan signal terminal, and a data signal terminal. The compensation sub-circuit is coupled to the first node, the third node, and a compensation control terminal. The light-emitting control sub-circuit is coupled to a first voltage terminal, an enable signal terminal, the second node, the third node, and a light-emitting device. The adjustment sub-circuit is coupled to the second node and/or the third node, and is further coupled to a second scan signal terminal and a first reference voltage signal terminal. The driving method includes a plurality of light-emitting cycles, and a light-emitting cycle includes a reset phase, a writing phase, a first light-emitting phase, a light-emitting adjustment phase, and a second light-emitting phase. In the writing phase, the writing sub-circuit transmits a data signal received at the data signal terminal to the second node under control of a gate scan signal received from the first scan signal terminal, the driving sub-circuit transmits the data signal from the second node to the third node, and the compensation sub-circuit transmits a voltage of the third node to the first node. In the first light-emitting phase, under control of an enable signal from the enable signal terminal, the light-emitting control sub-circuit cooperates with the driving sub-circuit to transmit a voltage signal provided by the first voltage terminal to the light-emitting device, so as to drive the light-emitting device to emit light. In the light-emitting adjustment phase, the adjustment sub-circuit transmits a reference voltage signal received at the first reference voltage signal terminal to the second node and/or the third node under control of a scan signal transmitted by the second scan signal terminal. In the second light-emitting stage, under control of the enable signal from the enable signal terminal and the first node, the light-emitting control sub-circuit and the driving sub-circuit cooperate to transmit the voltage signal provided by the first voltage terminal to the light-emitting device, so as to drive the light-emitting device to emit light.

In some embodiments, in the reset phase, the adjustment sub-circuit transmits the reference voltage signal received at the first reference voltage signal terminal to the second node to reset the second node at least once.

In some embodiments, the second node is reset a plurality of times.

In some embodiments, the second node is reset 2 to 4 times.

In some embodiments, the pixel driving circuit further includes a first reset sub-circuit.

The first reset sub-circuit is coupled to the first node, a first reset signal terminal, and a first initialization signal terminal. In the reset phase, after the adjustment sub-circuit resets the second node, the first reset sub-circuit transmits an initialization signal received at the first initialization signal terminal to the first node under control of a reset signal received from the first reset signal terminal.

In some embodiments, in the writing phase, after the data signal received at the data signal terminal is transmitted to the first node, the adjustment sub-circuit transmits the reference voltage signal received at the first reference voltage signal terminal to the second node under the control of the scan signal transmitted by the second scan signal terminal, so as to reset the second node.

In some embodiments, the pixel driving circuit further includes a first storage sub-circuit. The first storage sub-circuit is coupled to the first voltage terminal and the second node. In the writing phase, the first storage sub-circuit is charged. In the first light-emitting phase, the first storage sub-circuit discharges electricity to the second node to compensate a voltage of the second node.

In some embodiments, the pixel driving circuit further includes a second reset sub-circuit. The second reset sub-circuit is coupled to a second reset signal terminal, a second initialization signal terminal, and the light-emitting device. The second reset signal terminal and the second scan signal terminal are controlled in response a same control signal. In the reset phase and the light-emitting adjustment phase, the adjustment sub-circuit transmits the reference voltage signal received at the first reference voltage signal terminal to the second node, and at a same time the second reset sub-circuit transmits an initialization signal received at the second initialization signal terminal to the light-emitting device under control of a reset signal received from the second reset signal terminal.

In some embodiments, the pixel driving circuit further includes a light-emitting control sub-circuit and a second reset sub-circuit. The light-emitting control sub-circuit is coupled to a first voltage terminal, an enable signal terminal, the second node, the third node, and a light-emitting device. The second reset sub-circuit is coupled to a second reset signal terminal, a second initialization signal terminal, and the light-emitting device. A reset signal received from the second reset signal terminal and an enable signal received at the enable signal terminal are inverted. In the first light-emitting phase, the light-emitting control sub-circuit cooperates with the driving sub-circuit to transmit a driving signal to the light-emitting device under control of the enable signal from the enable signal terminal. In the reset phase and the light-emitting adjustment phase, the second reset sub-circuit transmits the initialization signal received at the second initialization signal terminal to the light-emitting device under control of the reset signal received from the second reset signal terminal.

In another aspect, a display panel is provided. The display panel includes: pixel driving circuits according to any one of the above embodiments, and light-emitting devices electrically connected to the pixel driving circuits.

In some embodiments, the display panel includes a substrate and a first gate conductive layer. The first gate conductive layer is located on a side of the substrate. The first gate conductive layer includes a second scan signal line, and the second scan signal line extends in a first direction. The pixel driving circuit includes a second transistor and a seventh transistor. The second scan signal line includes a first portion and a second portion. The first portion is also used as a gate of the second transistor, and the second portion is also used as a gate of the seventh transistor.

In some embodiments, the display panel further includes a shielding layer, an active layer, a second gate conductive layer and a first source-drain conductive layer. The shielding layer is located on a side of the substrate proximate to the first gate conductive layer. The active layer is located between the shielding layer and the first gate conductive layer. The second gate conductive layer is located on a side of the first gate conductive layer away from the active layer. The first source-drain conductive layer is located on a side of the second gate conductive layer away from the active layer. The pixel driving circuit further includes a first capacitor. A first electrode plate of the first capacitor and a second electrode plate of the first capacitor are located in at least two layers of the shielding layer, the active layer, the first gate conductive layer, the second gate conductive layer, and the first source-drain conductive layer.

In some embodiments, the pixel driving circuit further includes a second capacitor, a third transistor and a fifth transistor. The active layer includes an active portion of the third transistor, an active portion of the fifth transistor, and the first electrode plate of the first capacitor; and the first electrode plate of the first capacitor is located between the active portion of the third transistor and the active portion of the fifth transistor. The second gate conductive layer includes a first electrode plate of the second capacitor, and the second electrode plate of the first capacitor and the first electrode plate of the second capacitor are located in a same layer and electrically connected to each other.

In some embodiments, the pixel driving circuit includes a second transistor, a third transistor, and a fifth transistor. The active layer includes an active portion of the third transistor, an active portion of the fifth transistor, and the first electrode plate of the first capacitor; and the first electrode plate of the first capacitor is located between the active portion of the third transistor and the active portion of the fifth transistor; the first source-drain conductive layer includes a first electrode of the second transistor, a second electrode of the third transistor, and the second electrode plate of the first capacitor; and the second electrode plate of the first capacitor is located between the first electrode of the second transistor and the second electrode of the third transistor.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these accompanying drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Figure 1:
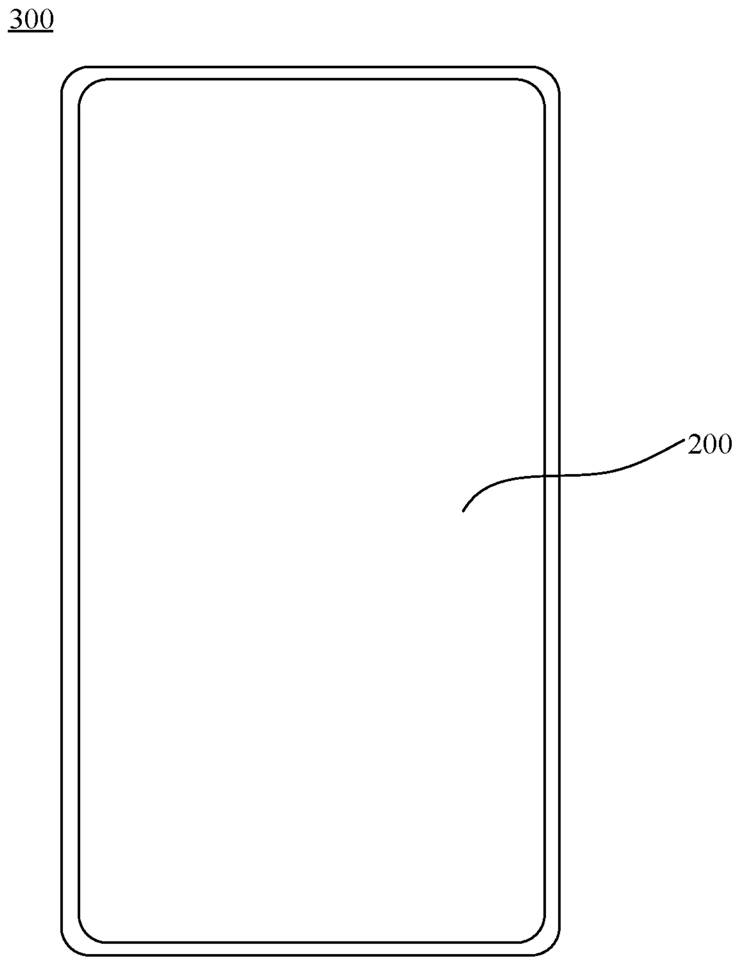
FIG. 1 is a structural diagram of a display apparatus, in accordance with some embodiments of the present disclosure.

The technical solutions in some embodiments of the present disclosure will be described clearly and completely below with reference to the accompanying drawings. However, the described embodiments are merely some but not all embodiments of the present disclosure. All other embodiments obtained by a person having ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed in an open and inclusive meaning, i.e., "including, but not limited to". In the description of the specification, the terms such as "one embodiment," "some embodiments," "exemplary embodiments," "example," "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, a feature defined with "first" or "second" may explicitly or implicitly include one or more of the features. In the description of the embodiments of the present disclosure, the terms "a plurality of", "the plurality of" and "multiple" each mean two or more unless otherwise specified.

In the description of some embodiments, terms such as "coupled" and "connected" and derivatives thereof may be used. For example, the term "connected" may be used when describing some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has the same meaning as the phrase "at least one of A, B or C", and they both include following combinations of A, B and C: only A, only B, only C, a combination of A and B, a combination of A and C, a combination of B and C, and a combination of A, B and C.

As used herein, depending on the context, the term "if" is optionally construed to mean "when", "in a case where", "in response to determining" or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The phase "applicable to" or "configured to" as used herein indicates an open and inclusive expression, which does not exclude devices that are applicable to or configured to perform additional tasks or steps.

In addition, the phrase "based on" used is meant to be open and inclusive, since a process, step, calculation or other action that is "based on" one or more of the stated conditions or values may, in practice, be based on additional conditions or value exceeding those stated.

The term such as "about", "substantially" or "approximately" as used herein includes a stated value and an average value within an acceptable range of deviation of a particular value. The acceptable range of deviation is determined by a person of ordinary skill in the art, in consideration of measurement in question and errors associated with measurement of a particular quantity (i.e., limitations of a measurement system).

It will be understood that, in a case where a layer or an element is referred to be on another layer or substrate, it may be that the layer or the element is directly on the another layer or substrate, or it may be that there is intermediate layer(s) between the layer or the element and the another layer or substrate.

Exemplary embodiments are described herein with reference to sectional views and/or plan views as idealized exemplary drawings. In the accompanying drawings, thicknesses of layers and areas of regions are enlarged for clarity. Variations in shape with respect to the accompanying drawings due to, for example, manufacturing technologies and/or tolerances may be envisaged. Therefore, the exemplary embodiments should not be construed as being limited to the shapes of the regions shown herein, but as including shape deviations due to, for example, manufacturing. For example, an etched region shown in a rectangular shape generally has a feature being curved. Therefore, the regions shown in the accompanying drawings are schematic in nature, and their shapes are not intended to show actual shapes of regions in a device, and are not intended to limit the scope of the exemplary embodiments.

Transistors used in the circuit structures (e.g., the pixel driving circuits) provided in the embodiments of the present disclosure may be thin film transistors (TFTs), field effect transistor (FETs), or other switching devices with the same characteristics. The embodiments of the present disclosure will be described by taking an example where the transistors are TFTs.

In the circuit structure provided in the embodiments of the present disclosure, a first electrode of each transistor used is one of a source and a drain of the transistor, and a second electrode of each transistor used is the other of the source and the drain. Since the source and the drain of the TFT may be symmetrical in structure, there may be no difference in structure between the source and the drain of the TFT, that is to say, the first electrode and the second electrode of the transistor in the embodiments of the present disclosure may be the same in structure. For example, in a case where the transistor is a P-type transistor, the first electrode of the transistor is the source, and the second electrode of the transistor is the drain. For example, in a case where the transistor is an N-type transistor, the first electrode of the transistor is the drain, and the second of the transistor is the source.

In the circuit structures provided by the embodiments of the present disclosure, nodes such as a first node and a second node do not represent actual components, but represent junction points of relevant couplings in circuit diagrams. That is, these nodes are equivalent to the junction points of the relevant couplings in the circuit diagram.

The transistors included in the circuit structures provided in the embodiments of the present disclosure may all be N-type transistors or P-type transistors; or part of the transistors may be N-type transistors, and another part of the transistors may be P-type transistors. In the present disclosure, the term "active level" refers to a level at which the transistor can be turned on. The P-type transistor may be turned on under control of a low-level signal, and the N-type transistor may be turned on under control of a high-level signal.

Hereinafter, the description will be illustrated by taking an example in which the transistors included in the circuit structures provided in the embodiments of the present disclosure are all P-type transistors.

In the present disclosure, a P-type transistor may be turned on under control of a low-level signal, and an N-type transistor may be turned on under control of a high-level signal.

FIG. 1 is a structural diagram of a display apparatus, in accordance with some embodiments of the present disclosure. Referring to FIG. 1, some embodiments of the present disclosure provide a display apparatus 300, and the display apparatus 300 includes a display panel 200.

In some examples, the display apparatus 300 may be, for example, an organic light-emitting diode (OLED) display apparatus.

For example, the display apparatus 300 further includes a frame, a display driver integrated circuit (IC), and other electronic components.

For example, the display apparatus 300 may be any device that displays an image whether in motion (e.g., a video) or stationary (e.g., a still image), and whether textual or graphical. More specifically, it is anticipated that the display apparatus in the embodiments described may be implemented in or associated with a variety of electronic devices. The variety of electronic devices may include (but are not limited to), for example, mobile phones, wireless devices, personal digital assistants (PDAs), hand-held or portable computers, global positioning system (GPS) receivers/navigators, cameras, MPEG-4 Part 14 (MP4) video players, video cameras, game consoles, watches, clocks, calculators, television (TV) monitors, flat-panel displays, computer monitors, car displays (e.g., odometer displays), navigators, cockpit controllers and/or displays, displays of camera views (e.g., displays of rear view camera in vehicles), electronic photos, electronic billboards or signs, projectors, architectural structures, and packaging and aesthetic structures (e.g., displays for displaying an image of a piece of jewelry).

Figure 2:
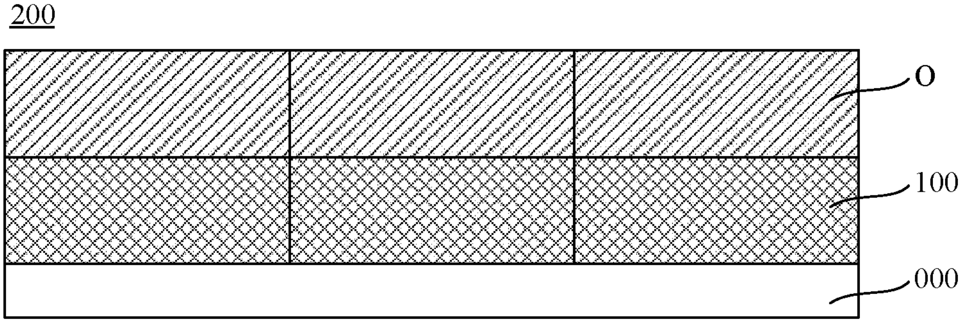
FIG. 2 is a structural diagram of a display panel, in accordance with some embodiments of the present disclosure.

FIG. 2 is a structural diagram of a display panel, in accordance with some embodiments of the present disclosure.

In some embodiments, referring to FIG. 2, the display panel 200 includes a substrate 000, a plurality of pixel driving circuits 100 disposed on a side of the substrate 000, and a plurality of light-emitting devices O disposed on a side of the plurality of pixel driving circuits 100 away from the substrate 000. The plurality of pixel driving circuits 100 are coupled to the plurality of light-emitting devices O.

For example, the substrate 000 may be a flexible substrate or a rigid substrate.

For example, in a case where the substrate 000 is a flexible substrate, the substrate 000 may be made of a material with high elasticity, such as dimethyl siloxane, polyimide (PI), or polyethylene terephthalate (PET).

For another example, in a case where the substrate 000 is a rigid substrate, the substrate 000 may be made of glass or the like.

In some examples, the plurality of pixel driving circuits 100 may be coupled to the plurality of light-emitting devices O in one-to-one correspondence. In some other examples, a single pixel driving circuit 100 may be coupled to light-emitting devices O, or pixel driving circuits 100 may be coupled to a single light-emitting device O.

The structure of the display panel 200 will be schematically described below by taking an example in which a single pixel driving circuit 100 is coupled to a single light-emitting device O.

For example, in the display panel 200, the pixel driving circuit 100 may generate a driving signal. Each light-emitting device O may be driven by a driving signal generated by a corresponding pixel driving circuit 100 to emit light. Due to cooperation of light emitted by the plurality of light-emitting devices O, the display panel 200 realizes display function.

For example, the light-emitting devices O may be OLEDs.

Figure 3:
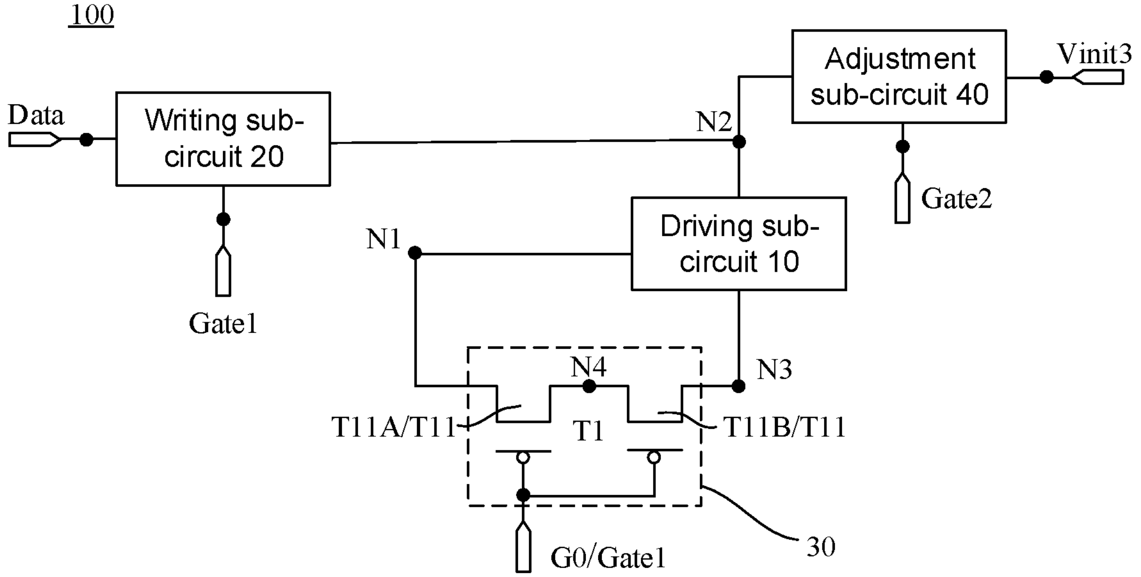
FIG. 3 is a structural diagram of a pixel driving circuit, in accordance with some embodiments of the present disclosure.
Figure 4:
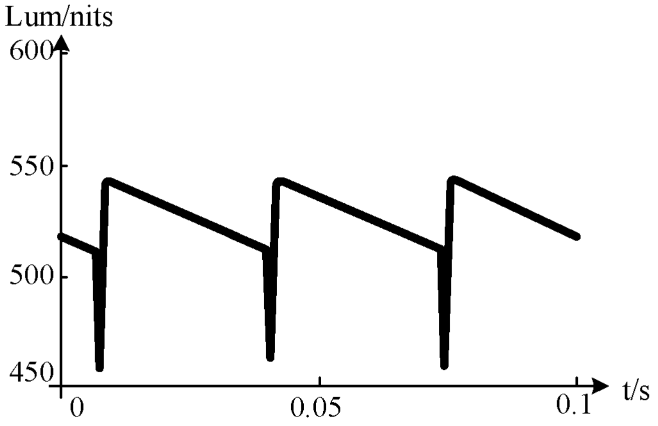
FIG. 4 is a simulation diagram of brightness variation of a light-emitting device driven by a pixel driving circuit, in accordance with some embodiments of the present disclosure.

FIG. 3 is a structural diagram of a pixel driving circuit, in accordance with some embodiments of the present disclosure. FIG. 4 is a simulation diagram of brightness variation of a light-emitting device driven by a pixel driving circuit, in accordance with some embodiments of the present disclosure.

Referring to FIG. 3, some embodiments of the present disclosure provide the pixel driving circuit 100, which includes a driving sub-circuit 10, a writing sub-circuit 20, and a compensation sub-circuit 30.

The driving sub-circuit 10 is coupled to a first node N1, a second node N2, and a third node N3. The driving sub-circuit 10 is configured to transmit a voltage from the second node N2 to the third node N3 under control of a voltage of the first node N1.

The compensation sub-circuit 30 is coupled to the first node N1, the third node N3, and a compensation control terminal G0. The compensation sub-circuit 30 is configured to: in a writing phase, transmit a voltage of the third node N3 to the first node N1 under control of a compensation signal received from the compensation control terminal G0, so as to control the driving sub-circuit to be turned on. For example, the compensation sub-circuit 30 includes a first transistor group T1. The first transistor group T1 includes at least two first transistors T11 that are connected in series. The first transistors T11 may be oxide semiconductor TFTs.

FIG. 3 shows an example in which the first transistor group T1 includes two first transistors T11 that are connected in series. A first first transistor is T11A, and a second (last) first transistor is T11B. It will be understood that, in some other embodiments, the first transistor group T1 may include other number of first transistors T11 that are connected in series.

Gates of all first transistors T11 in the first transistor group T1 are coupled to a first scan signal terminal Gate1. A first electrode of the first transistor T11A in the first transistor group T1 is coupled to the first node N1, and a second electrode of the last first transistor T11B in the first transistor group T1 is coupled to the third node N3. A second electrode of the first first transistor T11A in the first transistor group T1 and a first electrode of the second first transistor T11B in the first transistor group T1 have a fourth node N4 therebetween.

In some examples, with continued reference to FIG. 3, the writing sub-circuit 20 is coupled to the second node N2, the first scan signal terminal Gate1 and a data signal terminal Data. The writing sub-circuit 20 is configured to: in the writing phase, transmit a data signal received at the data signal terminal Data to the second node N2 under control of a gate scan signal received from the first scan signal terminal Gate1.

It will be understood that, by using the above arrangement manner, in the writing phase, an active signal of the gate scan signal received by the first scan signal terminal Gate1 and an active signal of the compensation signal received by the compensation control terminal G0 at least partially overlap. For example, the active signal of the gate scan signal received by the first scan signal terminal Gate1 coincides with the active signal of the compensation signal received by the compensation control terminal G0. For example, the gate scan signal received by the first scan signal terminal Gate1 is also used as the compensation signal received by the compensation control terminal G0. FIG. 3 shows an example in which the gate scan signal received by the first scan signal terminal Gate1 is also used as the compensation signal received by the compensation control terminal G0.

Based on this, the writing sub-circuit 20 may be turned on under the control of the gate scan signal received from the first scan signal terminal Gate1, so that the writing sub-circuit 20 transmits the data signal received at the data signal terminal Data to the second node N2. The data signal passes through the driving sub-circuit 10 to obtain the compensation signal, and the compensation signal is transmitted to the first node N1 through the compensation sub-circuit 30, so that the writing of the compensation signal is completed, and the compensation of a threshold voltage Vth of the driving sub-circuit 10 is realized.

It will be noted that, light emission of each sub-pixel in the display panel 200 is driven by a plurality of TFTs, and a display speed, contrast, brightness and resolution may be improved by using the TFT driving technology. However, the TFT has a magnetic hysteresis effect, which is an uncertainty of electrical characteristics of the TFT under a certain bias voltage. That is, a current flowing through the TFT is not only related to a current bias voltage, but also related to a state of the TFT at a previous moment. The magnetic hysteresis effect of the TFT is related to the gate dielectric of the TFT, the semiconductor material of the TFT, and the interface state trap between the gate dielectric and the semiconductor material of the TFT. In the light-emitting phase, the magnetic hysteresis effect of the TFT may cause current drop in the frame, which is viewed as a flicker phenomenon by human eyes. As a result, the display quality of the display panel 200 is affected.

A light-emitting cycle (a frame) includes a refresh frame and at least one holding frame. A light-emitting cycle (a frame) is a display frame, i.e., a display image. The refresh frame includes a reset phase, a writing phase, and a first light-emitting phase. The holding frame includes a light-emitting adjustment phase and a second light-emitting phase. It has been found by the inventors of the present disclosure that, in the refresh frame, the voltage of the first node N1 is substantially the same as a voltage of the fourth node N4; in the holding frame, the voltage of the fourth node N4 is pulled up by a voltage of the first scan signal terminal Gate1; therefore, the voltage of the fourth node N4 may be greater than the voltage of the first node N1. In a case where the voltage of the fourth node N4 is greater than the voltage of the first node N1, there is a leakage current from the fourth node N4 to the first node N1, so that the voltage of the first node N1 cannot be stabilized. A brightness holding ratio of the light-emitting device in one frame is low, and when the brightness holding ratio in one frame is reduced to be within a viewable range of the human eyes, flicker phenomenon is easy to occur.

The pixel driving circuit 100 includes the driving sub-circuit 10, the writing sub-circuit 20, and the compensation sub-circuit 30. A simulation verification is performed on the voltage of the first node N1 and the voltage of the fourth node N4 in the present disclosure, and calculation results shown in FIG. 4 and Table 1 are obtained.

Each light-emitting cycle shown in Table 1 includes three holding frames, and data of the last holding frame in the light-emitting cycle is taken as an example for illustration.

TABLE 1 shows variation of the voltage of the first node N1 and the voltage of the anode of the light-emitting device O in the pixel driving circuit 100.

| Cycle | First light-emitting cycle | | Second light-emitting cycle | | Third light-emitting cycle | |
|---|---|---|---|---|---|---|
| | First refresh frame | First holding frame | Second refresh frame | Second holding frame | Third refresh frame | Third holding frame |
| Voltage of the node N1 (V) | 1.149 | 1.189 | 1.207 | 1.215 | 1.219 | 1.22 |
| Voltage of the anode of the light-emitting device O (V) | 0.05 | 0.013 | −0.003 | −0.009 | −0.013 | −0.014 |

When the scan signal provided by the first scan signal terminal Gate1 is a low voltage signal (an active signal), the at least two first transistors T11 that are connected in series and included in the first transistor group T1 are turned on under the control of the low voltage signal provided by the first scan signal terminal Gate1, and the voltage of the fourth node N4 is equal to the voltage of the first node N1.

When the scan signal provided by the first scan signal terminal Gate1 is a high voltage signal (an inactive signal), the at least two first transistors T11 that are connected in series and included in the first transistor group T1 are turned off under the control of the high voltage signal provided by the first scan signal terminal Gate1. In this case, a capacitance exists between a gate and a source of a first transistor T11 in the first transistor group, or a capacitance exists between a gate and a drain of the first transistor T11 in the first transistor group; therefore, when the voltage of the scan signal provided by the first scan signal terminal Gate1 changes from the low voltage to the high voltage, the voltage of the fourth node N4 is pulled up due to coupling of the capacitance Cgs and the capacitance Cgd. When the voltage of the fourth node N4 is pulled up, the voltage of the first node N1 cannot be stabilized, so that the brightness holding ratio of the light-emitting device in one frame is low, resulting in the flicker phenomenon of the display panel 200 at a low frequency.

Figure 5:
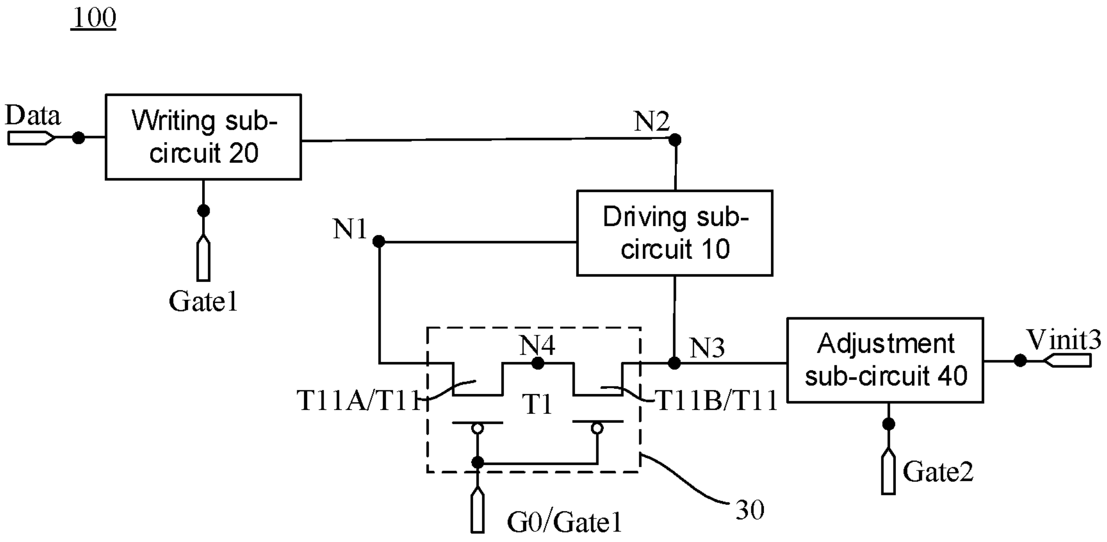
FIG. 5 is a structural diagram of a pixel driving circuit, in accordance with some other embodiments of the present disclosure.
Figure 6:
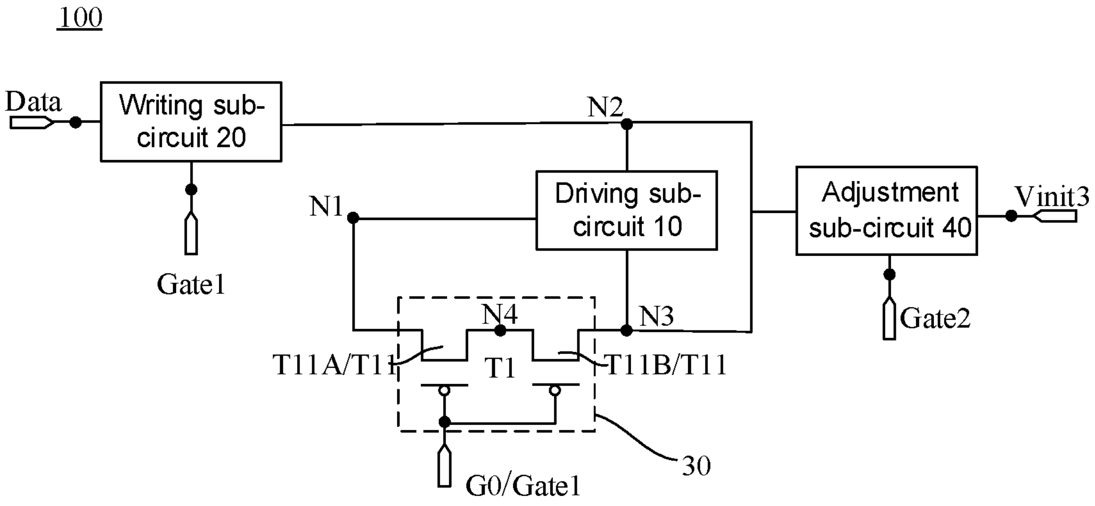
FIG. 6 is a structural diagram of a pixel driving circuit, in accordance with yet some other embodiments of the present disclosure.

FIG. 5 is a structural diagram of a pixel driving circuit, in accordance with some other embodiments of the present disclosure. FIG. 6 is a structural diagram of a pixel driving circuit, in accordance with some other embodiments of the present disclosure.

Based on this, with continued reference to FIGS. 3, 5 and 6, the pixel driving circuit 100 provided in the embodiments of the present disclosure further includes an adjustment sub-circuit 40. The adjustment sub-circuit 40 is coupled to the second node N2 and/or the third node N3, and is further coupled to a second scan signal terminal Gate2 and a first reference voltage signal terminal Vinit3. The adjustment sub-circuit 40 is configured to: in the light-emitting adjustment phase, transmit a reference voltage signal received at the first reference voltage signal terminal Vinit3 to the second node N2 and/or the third node N3 under control of a scan signal transmitted by the second scan signal terminal Gate2.

The description that "transmit a reference voltage signal received at the first reference voltage signal terminal Vinit3 to the second node N2 and/or the third node N3" includes three situations.

In a first situation, with continued reference to FIG. 3, the reference voltage signal received at the first reference voltage signal terminal Vinit3 is transmitted to the second node N2.

The adjustment sub-circuit 40 is provided, and the adjustment sub-circuit is coupled to the second scan signal terminal Gate2 and the first reference voltage signal terminal Vinit3. Therefore, in the light-emitting adjustment phase, the adjustment sub-circuit 40 transmits the reference voltage signal received at the first reference voltage signal terminal Vinit3 to the second node N2 under the control of the scan signal transmitted by the second scan signal terminal Gate2. Since data is not refreshed in a phase prior to the light-emitting adjustment phase, a potential of the first scan signal terminal Gate1 is high. The voltage of the fourth node N4 is pulled up by the voltage of the first scan signal terminal Gate1, so that the voltage of the fourth node N4 may be greater than the voltage of the first node N1.

In this case, the voltage of the second node N2 is adjusted by using the reference voltage signal received at the first reference voltage signal terminal Vinit3. Since a gate-source capacitance exists between the gate and the source of the driving transistor of the driving sub-circuit 10, when the voltage of the second node N2 changes, the voltage of the first node N1 changes synchronously due to the coupling effect of the gate-source capacitance, so as to compensate the influence of the fourth node N4 on the voltage of the first node N1. In the light-emitting adjustment phase, the voltage of the first node N1 is in dynamic balance, and the potential stability of the first node N1 is improved, so that the brightness holding ratio of the light-emitting device O in the frame is high, and it may be possible to ameliorate brightness variation in a next light-emitting phase and ameliorate the flicker phenomenon of the light-emitting device O and the display panel 200.

In a second situation, with continued reference to FIG. 5, the reference voltage signal received at the first reference voltage signal terminal Vinit3 is transmitted to the third node N3.

The adjustment sub-circuit 40 is provided, and the adjustment sub-circuit is coupled to the second scan signal terminal Gate2 and the first reference voltage signal terminal Vinit3. In the light-emitting adjustment phase, the adjustment sub-circuit 40 transmits the reference voltage signal received at the first reference voltage signal terminal Vinit3 to the third node N3 under the control of the scan signal transmitted by the second scan signal terminal Gate2. Since data is not refreshed in the phase prior to the light-emitting adjustment phase, the potential of the first scan signal terminal Gate1 is high. The voltage of the fourth node N4 is pulled up by the voltage of the first scan signal terminal Gate1, so that the voltage of the fourth node N4 may be greater than the voltage of the first node N1.

In this case, the voltage of the third node N3 is adjusted by using the reference voltage signal received at the first reference voltage signal terminal Vinit3. Since the gate-drain capacitance exists between the gate and the drain of the driving transistor of the driving sub-circuit 10, when the voltage of the third node N3 changes, the voltage of the first node N1 changes synchronously due to the coupling effect of the gate-drain capacitance, so as to compensate the influence of the fourth node N4 on the voltage of the first node N1. In the light-emitting adjustment phase, the voltage of the first node N1 is in dynamic balance, so that the potential stability of the first node N1 is improved, the brightness holding ratio of the light-emitting device O in the frame is high, and it may be possible to ameliorate the brightness variation in the next light-emitting phase and ameliorate the flicker phenomenon of the light-emitting device O and the display panel 200.

In a third situation, referring to FIG. 6, the reference voltage signal received at the first reference voltage signal terminal Vinit3 is transmitted to the second node N2 and the third node N3.

The adjustment sub-circuit 40 is provided, and the adjustment sub-circuit is coupled to the second scan signal terminal Gate2 and the first reference voltage signal terminal Vinit3. In the light-emitting adjustment phase, the adjustment sub-circuit 40 transmits the reference voltage signal received at the first reference voltage signal terminal Vinit3 to the second node N2 and the third node N3 under the control of the scan signal transmitted by the second scan signal terminal Gate2.

In this case, the voltage of the second node N2 and the voltage of the third node N3 are adjusted by using the reference voltage signal received at the first reference voltage signal terminal Vinit3. Since the gate-drain capacitance exists between the gate and the drain of the driving transistor of the driving sub-circuit 10 and the gate-source capacitance exists between the gate and the source of the driving transistor of the driving sub-circuit 10, when the voltage of the second node N2 and the voltage of the third node N3 change, the voltage of the first node N1 changes synchronously due to the coupling effect of the gate-source capacitance and the gate-drain capacitance, so as to compensate the influence of the fourth node N4 on the voltage of the first node N1. In the light-emitting adjustment phase, the voltage of the first node N1 is in dynamic balance, the potential stability of the first node N1 is improved, and the brightness holding ratio of the light-emitting device O in the frame is high. Therefore, it may be possible to ameliorate the brightness variation in the next light-emitting phase and ameliorate the flicker phenomenon of the light-emitting device O and the display panel 200.

Therefore, in the pixel driving circuit 100 provided in the embodiments of the present disclosure, the adjustment sub-circuit is coupled to the second scan signal terminal Gate2 and the first reference voltage signal terminal Vinit3; and the adjustment sub-circuit transmits the reference voltage signal received at the first reference voltage signal terminal Vinit3 to the second node N2 and/or the third node N3 under the control of the scan signal transmitted by the second scan signal terminal Gate2. Therefore, the voltage of the second node N2 and the voltage of the third node N3 are adjusted by using the reference voltage signal received at the first reference voltage signal terminal Vinit3. Since the capacitance exists between the gate and the drain of the driving transistor of the driving sub-circuit 10 and the capacitance exists between the gate and the source of the driving transistor of the driving sub-circuit 10, when a voltage at a gate-source position of the driving transistor changes, the voltage of the gate may be adjusted synchronously due to the capacitive coupling effect, that is, the voltage of the first node N1 is synchronously adjusted. Therefore, it may be possible to compensate the influence of the fourth node N4 on the voltage of the first node N1. As a result, the voltage of the first node N1 is in dynamic balance, the potential stability of the first node N1 is improved, the brightness holding ratio of the light-emitting device O in the frame is high, and it may be possible to ameliorate the flicker phenomenon of the light-emitting device O and the display panel 200.

Figure 7:
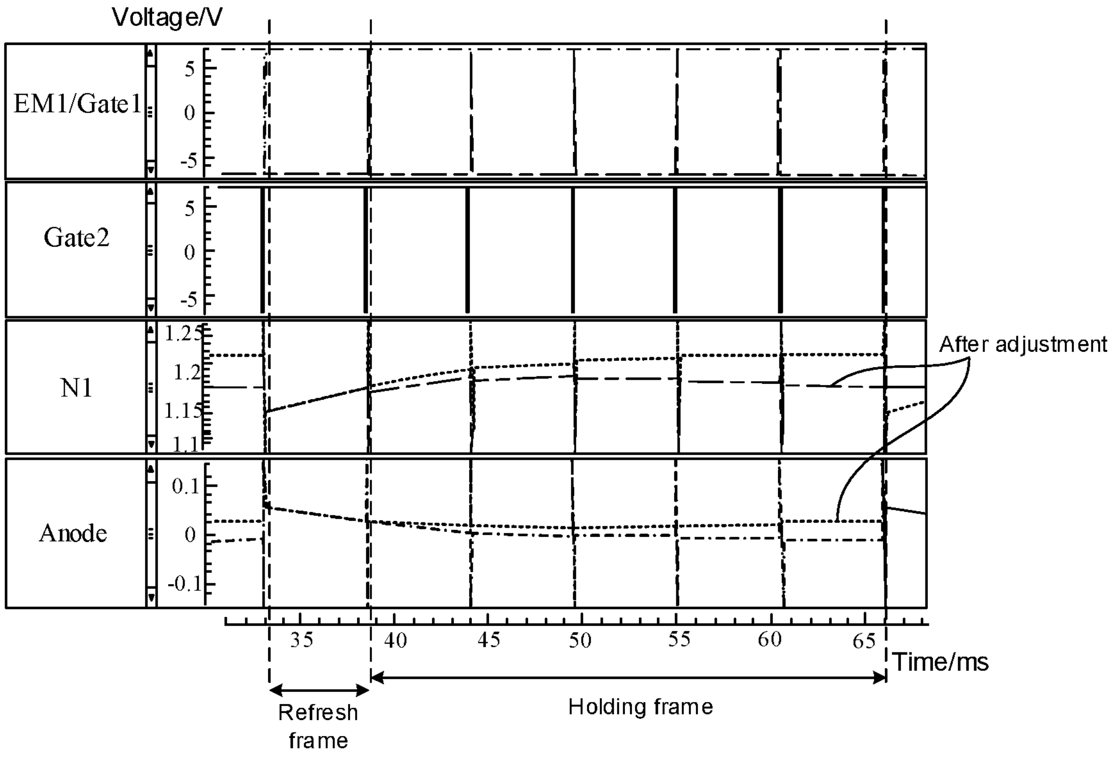
FIG. 7 is a simulation diagram of a voltage variation of a voltage of a first node and a voltage of an anode of a light-emitting device of a pixel driving circuit in a high grayscale state, in accordance with some embodiments of the present disclosure.
Figure 8:
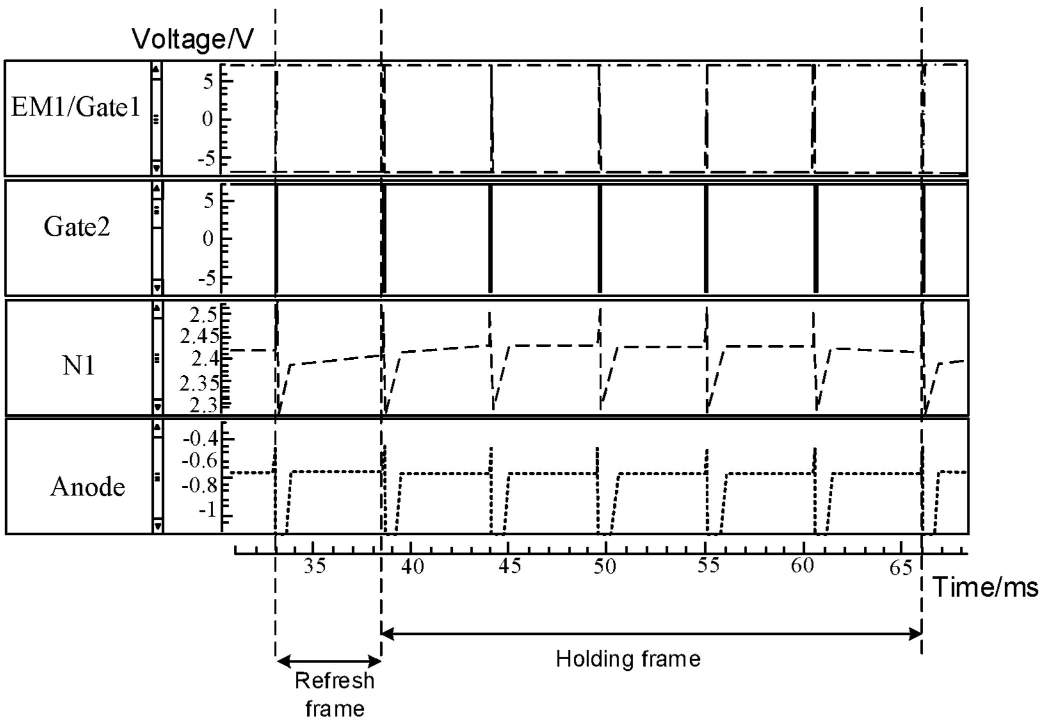
FIG. 8 is a simulation diagram of a voltage variation of a voltage of a first node and a voltage of an anode of a light-emitting device of a pixel driving circuit in a low grayscale state, in accordance with some embodiments of the present disclosure.

FIG. 7 is a simulation diagram of a voltage variation of a voltage of a first node and a voltage of an anode of a light-emitting device of a pixel driving circuit in a high grayscale state, in accordance with some embodiments of the present disclosure. FIG. 8 is a simulation diagram of a voltage variation of a voltage of a first node and a voltage of an anode of a light-emitting device of a pixel driving circuit in a low grayscale state, in accordance with some embodiments of the present disclosure.

For example, the display panel 200 has a low grayscale (e.g., 0 grayscale, 15 grayscale, or 30 grayscale) state and a high grayscale (e.g., 110 grayscale, 220 grayscale, or 255 grayscale) state. The voltage of the first node N1 of the pixel driving circuit 100 in the low grayscale state is greater than the voltage of the first node N1 of the pixel driving circuit 100 in the high grayscale state.

In some embodiments of the present disclosure, for the high grayscale state, in a case where the pixel driving circuit 100 includes the adjustment sub-circuit 40, the voltage of the first node N1 and the voltage of the anode of the light-emitting device O are verified through simulation; and for the high grayscale state, in a case where the pixel driving circuit 100 does not include the adjustment sub-circuit 40, the voltage of the first node N1 and the voltage of the anode of the light-emitting device O are verified through simulation, the obtained calculation results are shown in FIG. 7. In some embodiments of the present disclosure, for the low grayscale state, in a case where the pixel driving circuit 100 includes the adjustment sub-circuit 40, the voltage of the first node N1 and the voltage of the anode of the light-emitting device O are verified through simulation; and for the low grayscale state, in a case where the pixel driving circuit 100 does not include the adjustment sub-circuit 40, the voltage of the first node N1 and the voltage of the anode of the light-emitting device O are verified through simulation, the obtained calculation results are shown in FIG. 8. Referring to FIGS. 7 and 8, obviously, compared with the low grayscale state, in the high grayscale state, the voltage of the first node N1 is low, and the voltage of the anode of the light-emitting device O has obvious change.

In some embodiments, with continued reference to FIG. 3, a value of the reference voltage signal received at the first reference voltage signal terminal Vinit3 is in a range from −5 V to 5 V.

The voltage of the second node N2 is adjusted by using the reference voltage signal received at the first reference voltage signal terminal Vinit3, and the voltage of the first node N1 is adjusted due to the capacitive coupling. Therefore, the potential stability of the first node N1 is improved, the brightness holding ratio of the light-emitting device O in the frame is high, and the flicker phenomenon of the light-emitting device O and the display panel 200 is ameliorated.

In some examples, as for the high grayscale state, in order to meet the requirement of the display panel 200 in the high grayscale state, a voltage of the first node N1 in the pixel driving circuit 100 needs to be set to be low, so as to adjust the opening condition of the driving sub-circuit 10. However, in a case where the voltage of the first node N1 is low and the voltage of the fourth node N4 increases, there is a greater difference between the voltage of the first node N1 and the voltage of the fourth node N4 is, so that the brightness holding ratio of the light-emitting device in the frame is low. In light of this, the value of the reference voltage signal received at the first reference voltage signal terminal Vinit3 is set to be in a range from −5 V to 5 V, the reference voltage signal is written into the second node N2, and the voltage of the first node N1 is adjusted by using the variation of the voltage of the second node N2, so as to compensate for the influence of the fourth node on the voltage of the first node N1. Therefore, the first node N1 is in a state of dynamic balance, the potential stability of the first node N1 is improved, the brightness holding ratio of the light-emitting device O in the frame is high, and the flicker phenomenon of the light-emitting device O and the display panel 200 is ameliorated.

For example, for the high grayscale state, in a case where the value of the reference voltage signal received at the first reference voltage signal terminal Vinit3 is 4 V, the voltage of the first node N1 and the voltage of the anode of the light-emitting device O are verified through simulation in the present disclosure, and the obtained calculation results are shown in Table 2. The term "before improvement" indicates that the pixel driving circuit 100 does not include the adjustment sub-circuit 40. The term "after improvement" indicates that the pixel driving circuit 100 includes the adjustment sub-circuit 40.

As shown in Table 2, in a case where the reference voltage signal received at the first reference voltage signal terminal Vinit3 is 4 V and the pixel driving circuit 100 does not include the adjustment sub-circuit 40, the variation of the voltage of the first node N1 is 0.0713 V, and the variation of the voltage of the anode of the light-emitting device O is 0.064 V. In a case where the pixel driving circuit 100 includes the adjustment sub-circuit 40, the variation of the voltage of the first node N1 may be reduced to 0.047 V, and the voltage variation is reduced by 0.0243 V; the variation of the voltage of the light-emitting device O may be reduced to 0.047 V, and the voltage variation is reduced by 0.025 V. Therefore, it may be possible to stabilize the voltage of the first node N1 relatively, improve the brightness holding ratio of the light-emitting device O, and ameliorate the flicker phenomenon of the display panel 200.

TABLE 2 is a first table showing variation of the voltage of the first node N1 and the voltage of the anode of the light-emitting device O in the high grayscale state.

| High grayscale | One light-emitting period | First refresh frame | Last holding frame | Voltage variation in one frame |
|---|---|---|---|---|
| Before improvement | Voltage of the node N1 (V) | 1.149 | 1.220 | 0.0713 |
| | Voltage of the anode of the light-emitting device O (V) | 0.050 | −0.014 | 0.064 |
| After improvement | Voltage of the node N1 (V) | 1.149 | 1.196 | 0.047 |
| | Voltage of the anode of the light-emitting device O (V) | 0.050 | 0.011 | 0.039 |

In some examples, for the low grayscale state, in order to meet the requirement of the display panel 200 in the low grayscale state, the voltage of the first node N1 of the pixel driving circuit 100 needs to be set to be high, so as to adjust the opening condition of the driving sub-circuit 10. In a case where the voltage of the first node N1 is relatively high, the increase of the voltage of the fourth node N4 does not result in a greater difference between the voltage of the first node N1 and the voltage of the fourth node N4. That is, the flicker phenomenon of the display panel 200 in the low grayscale state is not obvious. Based on this, the value of the reference voltage signal received at the first reference voltage signal terminal Vinit3 is set to be in a range from −5 V to 5 V. The reference voltage signal is written into the second node N2, and the voltage difference between the second node N2 and the first node N1 is small, so that the potential of the first node N1 will not be affected significantly, that is, the holding ratio of the voltage of the first node N1 will not be affected significantly.

For example, the value of the reference voltage signal received at the first reference voltage signal terminal Vinit3 is −5 V, −3 V, −1 V, 1 V, 3 V, or 5 V. It will be understood that, in some other embodiments, the reference voltage signal received at the first reference voltage signal terminal Vinit3 may be other value in the range from −5 V to 5 V.

For example, for the low grayscale state, in a case where the value of the reference voltage signal received at the first reference voltage signal terminal Vinit3 is 4 V, the voltage of the first node N1 and the voltage of the anode of the light-emitting device O are verified through simulation in the present disclosure, and the obtained calculation results are shown in Table 3. The term "before improvement" indicates that the pixel driving circuit 100 does not include the adjustment sub-circuit 40. The term "after improvement" indicates that the pixel driving circuit 100 includes the adjustment sub-circuit 40.

TABLE 3 is a first table showing variation of the voltage of the first node N1 and the voltage of the anode of the light-emitting device O in the low grayscale state.

| Low grayscale | One light-emitting period | First refresh frame | Last holding frame | Voltage variation in one frame |
|---|---|---|---|---|
| Before improvement | Voltage of the node N1 (V) | 2.402 | 2.419 | 0.017 |
| | Voltage of the anode of the light-emitting device O (V) | −0.692 | −0.697 | 0.005 |
| After improvement | Voltage of the node N1 (V) | 2.402 | 2.419 | 0.017 |
| | Voltage of the anode of the light-emitting device O (V) | −0.692 | −0.697 | 0.005 |

As shown in Table 3, in the case where the reference voltage signal received at the first reference voltage signal terminal Vinit3 is 4 V and the pixel driving circuit 100 does not include the adjustment sub-circuit 40, the variation of the voltage of the first node N1 is 0.017 V, and the variation of the voltage of the anode of the light-emitting device O is 0.005 V. In the case where the pixel driving circuit 100 includes the adjustment sub-circuit 40, the voltage variations are maintained. Therefore, in the case where the pixel driving circuit 100 includes the adjustment sub-circuit 40, it may be possible to maintain the stability of the first node N1, and to improve the brightness holding ratio of the light-emitting device O.

Therefore, in the pixel driving circuit 100 provided in the embodiments of the present disclosure, by providing the adjustment sub-circuit 40, and setting the value of the reference voltage signal received at the first reference voltage signal terminal Vinit3 to be in a range from −5 V to 5 V, it may be possible to effectively improve the stability of the first node N1 of the pixel driving circuit 100 in the high grayscale state, and to maintain the stability of the first node N1 in the pixel driving circuit 100 in the low grayscale state.

As a result, the flicker phenomenon may be effectively ameliorated regardless of the state of the display panel 200.

In some embodiments, with continued reference to FIG. 3, the value of the reference voltage signal received at the first reference voltage signal terminal Vinit3 is approximately 2 V.

It will be understood that, the voltage of the reference voltage signal received at the first reference voltage signal terminal Vinit3 may be of a certain deviation. For example, the deviation value may be +1 V, +0.5 V.

In a case where the value of the reference voltage signal received at the first reference voltage signal terminal Vinit3 in the high grayscale state is 2 V, the voltage of the first node N1 and the voltage of the anode of the light-emitting device O are verified through simulation in the present disclosure, and the obtained calculation results are shown in Table 4. The term "before improvement" indicates that the pixel driving circuit 100 does not include the adjustment sub-circuit 40. The term "after improvement" indicates that the pixel driving circuit 100 includes the adjustment sub-circuit 40.

As shown in Table 4, in the case where the value of the reference voltage signal received at the first reference voltage signal terminal Vinit3 in the high grayscale state is 2 V and the pixel driving circuit 100 does not include the adjustment sub-circuit 40, the variation of the voltage of the first node N1 is 0.0713 V, and the variation of the voltage of the anode of the light-emitting device O is 0.064 V. In the case where the pixel driving circuit 100 includes the adjustment sub-circuit 40, the variation of the voltage of the first node N1 may be reduced to 0.0298 V, and the voltage variation is reduced by 0.0415 V; the variation of the voltage of the light-emitting device O is reduced to 0.027 V, and the voltage variation is reduced by 0.037 V. By setting the value of the reference voltage signal to be 2 V, it may be possible to effectively reduce the variation of the voltage of the first node N1 and the voltage of the anode of the light-emitting device O, so that the flicker phenomenon of the display panel 200 may be ameliorated to a great extent.

TABLE 4 is a second table showing variation of the voltage of the first node N1 and the voltage of the anode of the light-emitting device O in the high grayscale state.

| High grayscale | One light-emitting period | First refresh frame | Last holding frame | Voltage variation in one frame |
|---|---|---|---|---|
| Before improvement | Voltage of the node N1 (V) | 1.149 | 1.220 | 0.0713 |
| | Voltage of the anode of the light-emitting device O (V) | 0.050 | −0.014 | 0.064 |
| After improvement | Voltage of the node N1 (V) | 1.149 | 1.179 | 0.0298 |
| | Voltage of the anode of the light-emitting device O (V) | 0.050 | 0.023 | 0.027 |

The above description is illustrated by taking an example in which the value of the reference voltage signal received at the first reference voltage signal terminal Vinit3 is only 2 V or 4 V. In some other embodiments, the value of the reference voltage signal received at the first reference voltage signal terminal Vinit3 may be other value in the range from −5 V to 5 V.

In some embodiments, with continued reference to FIG. 3, the adjustment sub-circuit 40 is further configured to: in the reset phase, transmit the reference voltage signal received at the first reference voltage signal terminal Vinit3 to the second node N2 under the control of the scan signal transmitted from the second scan signal terminal Gate2, so as to reset the second node N2.

In this way, in the reset phase, the adjustment sub-circuit 40 may be turned on under the control of the scan signal transmitted by the second scan signal terminal Gate2, so as to transmit the reference voltage signal received at the first reference voltage signal terminal Vinit3 to the second node N2 to reset the second node N2. Therefore, it may be possible to counteract the magnetic hysteresis effect of the driving transistor in the driving sub-circuit 10, to improve the brightness holding ratio in one frame, and further to ameliorate the flicker phenomenon of the display panel 200 at the low frequency.

Figure 9:
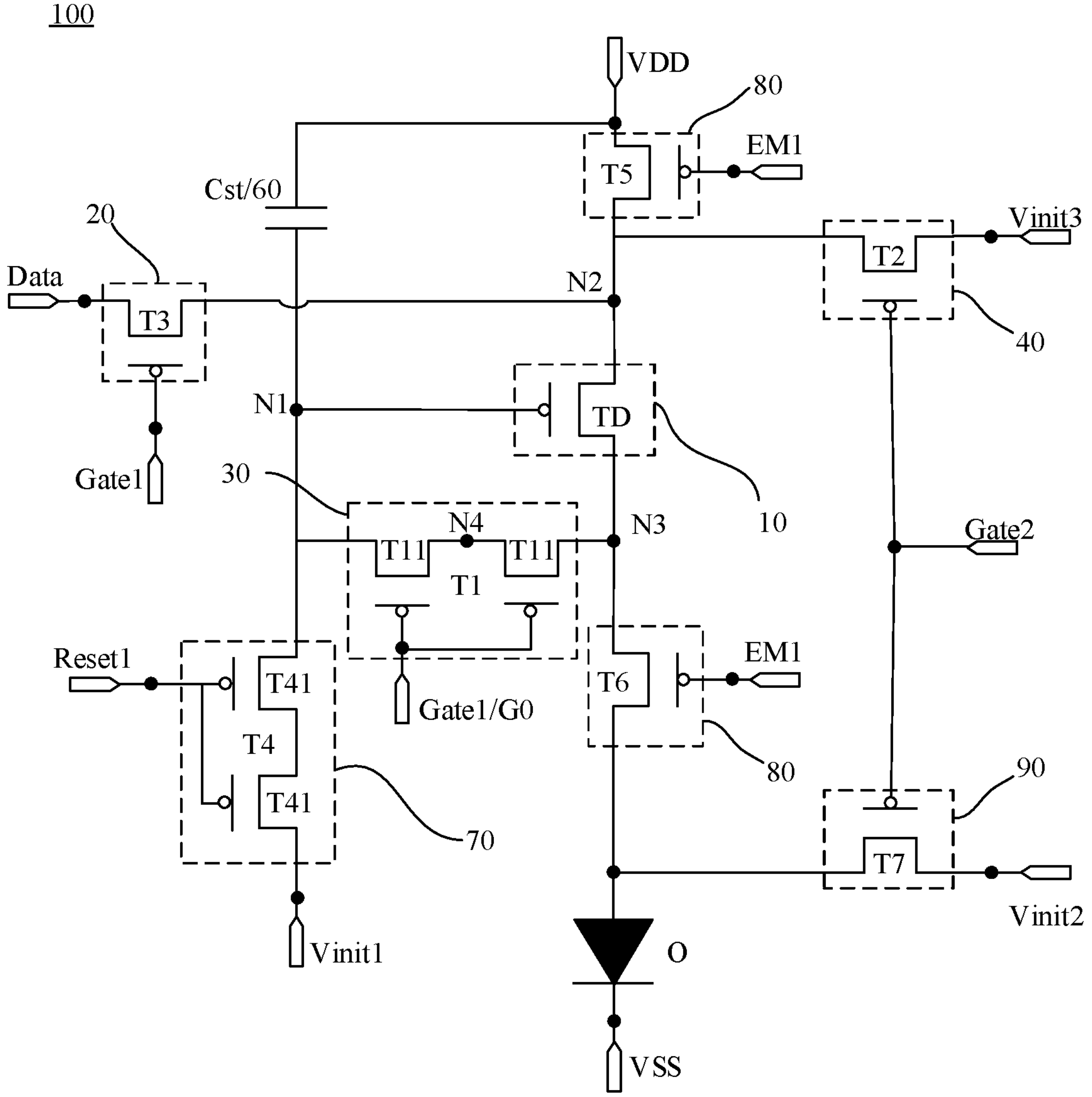
FIG. 9 is a structural diagram of yet another pixel driving circuit, in accordance with some embodiments of the present disclosure.

FIG. 9 is a structural diagram of yet another pixel driving circuit, in accordance with some embodiments of the present disclosure. In some embodiments, referring to FIG. 9, the adjustment sub-circuit 40 includes a second transistor T2.

A gate of the second transistor T2 is coupled to the second scan signal terminal Gate2, a first electrode of the second transistor T2 is coupled to the second node N2, and a second electrode of the second transistor T2 is coupled to the first reference voltage signal terminal Vinit3.

For example, in the reset phase, the scan signal transmitted by the second scan signal terminal Gate2 is a low level (active level) signal, the second transistor T2 included in the adjustment sub-circuit 40 is turned on under the control of the low-level signal transmitted by the second scan signal terminal Gate2. In this case, the reference voltage signal received at the first reference voltage signal terminal Vinit3 is transmitted to the second node N2 to reset the second node N2. Therefore, it may be possible to counteract the magnetic hysteresis effect of the driving transistor in the driving sub-circuit 10, to improve the brightness holding ratio in the frame, and further to ameliorate the flicker phenomenon of the display panel 200 in the low frequency.

In some embodiments, with continued reference to FIG. 9, the driving sub-circuit 10 includes the driving transistor TD.

The gate of the driving transistor TD is coupled to the first node N1, a first electrode of the driving transistor DT is coupled to the second node N2, and a second electrode of the driving transistor DT is coupled to the third node N3.

For example, in a case where the voltage of the first node N1 is at an active level, the driving transistor TD may be turned on under the control of the voltage of the first node N1, so as to transmit an electrical signal (e.g., a data signal) from the second node N2 to the third node N3.

It will be noted that, the term "active level" in the present disclosure refers to a level which causes the transistor to be turned on. In a case where the transistor is an N-type transistor, the "active level" is a high level. In a case where the transistor is a P-type transistor, the "active level" is a low level. The following embodiments are the same as those described here, and details will not be repeated herein.

In some embodiments, with continued reference to FIG. 9, the writing sub-circuit 20 includes a third transistor T3.

A gate of the third transistor T3 is coupled to the first scan signal terminal Gate1, a first electrode of the third transistor T3 is coupled to the data signal terminal Data, and a second electrode of the third transistor T3 is coupled to the second node N2.

For example, the scan signal transmitted by the first scan signal terminal Gate1 is a low level (active level) signal, the third transistor T3 included in the writing sub-circuit 20 is turned on under the control of the low-level signal transmitted by the first scan signal terminal Gate1. In this case, the data signal received at the data signal terminal Data is transmitted to the second node N2. In addition, the data signal passes through the driving sub-circuit 10 to obtain a compensation signal, and the compensation signal is transmitted to the first node N1 through the compensation sub-circuit 30. That is, the writing of the compensation signal is completed, and compensation of the threshold voltage Vth is also achieved. Therefore, it may be possible to ameliorate the brightness holding ratio in the frame, and further ameliorate the flicker phenomenon of the display panel 200 at a low frequency.

In some embodiments, with continued reference to FIG. 9, the first scan signal terminal Gate1 is configured to control the third transistor T3 to be turned on at least once before the first electrode of the third transistor T3 is controlled to receive the data signal of the data signal terminal Data.

The first electrode of the third transistor T3 is reset at least once before the first electrode of the third transistor T3 is controlled to receive the data signal of the data signal terminal Data, which is conducive to improving the stability of the driving transistor TD included in the driving sub-circuit 10.

In some embodiments, the first scan signal terminal Gate1 is configured to control the third transistor T3 to be turned on at least once before the first electrode of the third transistor T3 is controlled to receive the data signal of the data signal terminal Data. It will be understood that, in some other embodiments, the first scan signal terminal Gate1 is configured to control the third transistor T3 to be turned on twice or more times before the first electrode of the third transistor T3 is controlled to receive the data signal of the data signal terminal Data.

In some embodiments, with continued reference to FIG. 9, the pixel driving circuit 100 further includes a second storage sub-circuit 60.

For example, the second storage sub-circuit 60 includes a second capacitor Cst.

A first electrode plate of the second capacitor Cst is coupled to a first voltage terminal VDD, and a second electrode plate of the second capacitor Cst is coupled to the first node N1.

For example, the third transistor T3 included in the writing sub-circuit 20 is turned on under the control of the low-level signal transmitted by the first scan signal terminal Gate1. In this case, the data signal received at the data signal terminal Data is transmitted to the second node N2, and at the same time the data signal received at the data signal terminal Data is also transmitted to the second capacitor Cst to charge the second capacitor Cst. The first transistor group T1 included in the compensation sub-circuit 30 is turned on under the control of the low-level signal transmitted by the first scan signal terminal Gate1. In this case, the data signal received at the second node N2 is transmitted to the first node N1 to compensate the first node N1; and the potential of the first node N1 gradually rises to (Vdata+Vth), Vdata is a voltage of the data signal provided by the data signal terminal Data, and Vth is a threshold voltage of the driving transistor TD in the driving sub-circuit 10. When the potential of the first node N1 is (Vdata+Vth), the charging process is completed. Subsequently, the driving transistor TD included in the driving sub-circuit 10 is continuously turned on due to the discharge of the second capacitor Cst, thereby ensuring that the light-emitting device O emits light.

Figure 10:
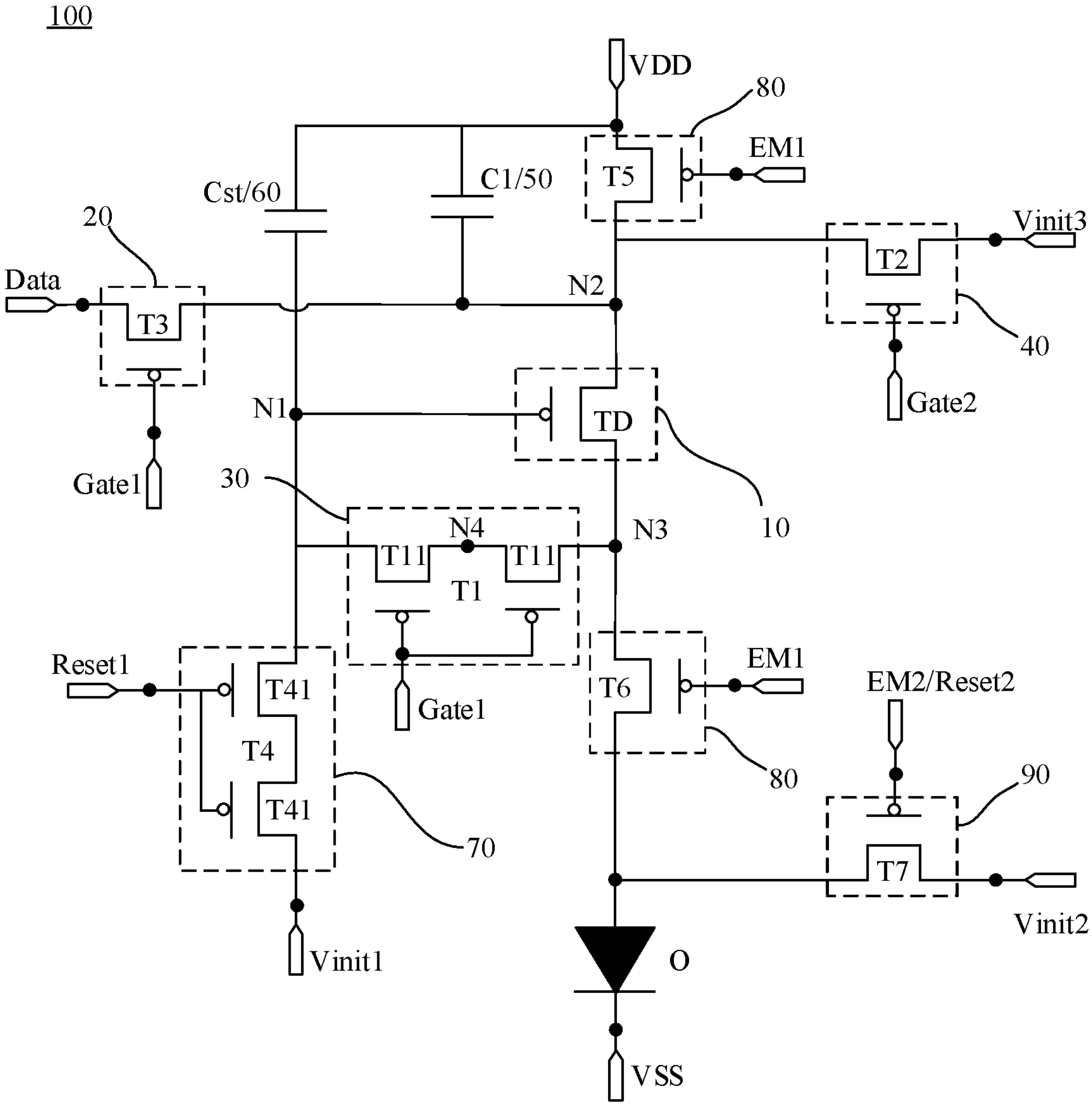
FIG. 10 is a structural diagram of yet another pixel driving circuit, in accordance with some embodiments of the present disclosure.

FIG. 10 is a structural diagram of yet another pixel driving circuit, in accordance with some embodiments of the present disclosure. In some embodiments, referring to FIG. 10, the pixel driving circuit 100 further includes a first storage sub-circuit 50. The first storage sub-circuit 50 is coupled to the first voltage terminal VDD and the second node N2. The first storage sub-circuit 50 is configured to store the voltage of the second node N2, and to maintain the voltage of the second node N2.

For example, the third transistor T3 included in the writing sub-circuit 20 is turned on under the control of the low-level signal transmitted by the first scan signal terminal Gate1; and the data signal received at the data signal terminal Data is transmitted to the second node N2, and the first storage sub-circuit 50 is charged at the same time. In the first light-emitting phase, the first storage sub-circuit 50 may maintain the voltage of the second node N2, so as to ensure the stability of the driving transistor TD included in the driving sub-circuit 10.

The first storage sub-circuit 50 includes a first capacitor C1, a first electrode plate of the first capacitor C1 is coupled to the first voltage terminal VDD, and a second electrode plate of the first capacitor C1 is coupled to the second node N2.

For example, the third transistor T3 included in the writing sub-circuit 20 is turned on under the control of the low-level signal transmitted by the first scan signal terminal Gate1; and in this case, the data signal received at the data signal terminal Data is transmitted to the second node N2, and the data signal received at the data signal terminal Data is also transmitted to the first capacitor C1 to charge the first capacitor C1 at the same time. When the adjustment sub-circuit 40 is turned on under the control of the low-level signal transmitted from the second scan signal terminal Gate2, the reference voltage signal received at the first reference voltage signal terminal Vinit3 is transmitted to the second node N2. When the adjustment sub-circuit 40 is turned off under the control of the high-level signal transmitted from the second scan signal terminal Gate2, the first capacitor C1 may maintain the voltage of the second node N2, thereby ensuring the stability of the voltage of the first node N1.

In some embodiments, referring to FIG. 10, the pixel driving circuit 100 includes the first capacitor C1 and the second capacitor Cst, and C1 is greater than or equal to one fifth of Cst and is less than or equal to a half of Cst (i.e., $$\frac{1}{5}Cst \le C1 \le \frac{1}{2}Cst$$

where C1 represents a capacitance value of the first capacitor C1, and Cst represents a capacitance value of the second capacitor Cst.

When the capacitance value C1 of the first capacitor C1 is equal to or close to ⅕Cst, the first capacitor C1 may maintain the voltage of the second node N2, and it May also prevent the first capacitor C1 from affecting the second capacitor Cst, so as to ensure the stability of the first node N1. When the capacitance value C1 of the first capacitor C1 is equal to or close to ½Cst, it may be possible to prevent the first capacitor C1 from affecting the second capacitor Cst, and the voltage of the second node N2 may be stably maintained, so as to stabilize the voltage of the first node N1.

For example, $$C1 = \frac{1}{2}Cst,\ C1 = \frac{1}{3}Cst,\ C1 = \frac{1}{4}Cst, \text{ or } C1 = \frac{1}{5}Cst.$$

In some embodiments, referring to FIG. 10, the pixel driving circuit 100 further includes a first reset sub-circuit 70.

The first reset sub-circuit 70 is coupled to the first node N1, a first reset signal terminal Reset1, and a first initialization signal terminal Vinit1. The first reset sub-circuit 70 is configured to: in the reset phase, transmit an initialization signal received at the first initialization signal terminal Vinit1 to the first node N1 under control of a reset signal received from the first reset signal terminal Reset1, so as to reset the first node N1.

For example, in the reset phase, the first reset sub-circuit 70 transmits the initialization signal received at the first initialization signal terminal Vinit1 to the first node N1 under the control of the reset signal received from the first reset signal terminal Reset1, so as to reset the first node N1. Therefore, it is conducive to improving the stability of the driving transistor TD included in the driving sub-circuit 10.

For example, in the reset phase, the first node N1 is reset by using the first reset sub-circuit 70, and the second node N2 is reset by using the adjustment sub-circuit 40. In this way, an initial state of the driving transistor TD before the writing phase is stable, so that the driving transistor TD is in a stable state in the writing phase, and the hysteresis effect of the driving transistor TD is ameliorated to a great extent.

In some embodiments, with continued reference to FIG. 10, the first reset sub-circuit 70 includes a fourth transistor group T4, and the fourth transistor group T4 includes at least two fourth transistors T41 that are connected in series.

FIG. 10 shows an example in which the fourth transistor group T4 includes two fourth transistors T41 connected in series. A first fourth transistor T41 is T41A, and a second (last) fourth transistor T41 is T41B. It will be understood that, in some other embodiments, the fourth transistor group T4 may include other number of fourth transistors T41 connected in series.

Gates of all fourth transistors T41 in the fourth transistor group T4 are coupled to the first reset signal terminal Reset1, a first electrode of the first fourth transistor T41A in the fourth transistor group T4 is coupled to the first node N1, and a second electrode of the last fourth transistor T41B in the fourth transistor group T4 is coupled to the first initialization signal terminal Vinit1.

For example, the fourth transistors T41 included in the first reset sub-circuit 70 are turned on under the control of a low-level signal (an active signal) received by the first reset signal terminal Reset1, receive the initialization signal received at the first initialization signal terminal Vinit1, and transmit the initialization signal received from the first initialization signal terminal Vinit1 to the first node N1, so as to reset the first node N1.

The first reset signal terminal is configured to control at least one fourth transistor T41 to be turned on at least once before a second electrode of the at least one fourth transistor T41 is controlled to receive the first initialization signal of the first initialization signal terminal Vinit1. Since the fourth transistor(s) T41 are turned on at least once, it is conducive to resetting gates of the fourth transistor(s) T41, and improving the stability of the fourth transistors T41 included in the first reset sub-circuit 70.

It will be noted that, in a case where the fourth transistor group T4 includes the at least two fourth transistors T41 connected in series, it may be possible to reduce a risk that the first node N1 leaks electricity from the fourth transistor T41, and to ensure the stability of the voltage of the first node N1.

In some embodiments, with continued reference to FIG. 10, the pixel driving circuit 100 further includes a light-emitting control sub-circuit 80.

The light-emitting control sub-circuit 80 is coupled to the first voltage terminal VDD, an enable signal terminal EM1, the second node N2, the third node N3 and the light-emitting device O. The light-emitting control sub-circuit 80 is configured to cooperate with the driving sub-circuit 10 to transmit the driving signal to the light-emitting device O under control of an enable signal from the enable signal terminal EM1.

For example, the light-emitting control sub-circuit 80 is configured to cooperate with the driving sub-circuit 10 under the control of a low-level (active-level) signal from the enable signal terminal EM1, so that the electrical signal provided by the first voltage terminal VDD is transmitted to the second node N2, the electrical signal of is transmitted from the second node N2 to the third node N3, and the electrical signal continues to be transmitted from the third node N3 to the light-emitting device O. The electrical signal may cooperate with an electrical signal provided by a second voltage terminal VSS that is coupled to the light-emitting device O, so as to drive the light-emitting device O to emit light normally to realize display.

In some embodiments, with continued reference to FIG. 10, the light-emitting control sub-circuit 80 includes a fifth transistor T5 and a sixth transistor T6.

A gate of the fifth transistor T5 is coupled to the enable signal terminal EM1, a first electrode of the fifth transistor T5 is coupled to the first voltage terminal VDD, and a second electrode of the fifth transistor T5 is coupled to the second node.

A gate of the sixth transistor T6 is coupled to the enable signal terminal EM1, a first electrode of the sixth transistor T6 is coupled to the third node N3, and a second electrode of the sixth transistor T6 is coupled to the light-emitting device O.

For example, in a case where the fifth transistor T5 and the sixth transistor T6 included in the light-emitting control sub-circuit 80 are turned on under the control of the low-level (active-level) signal from the enable signal terminal EM1, and the driving transistor TD included in the driving sub-circuit 10 is turned on, the voltage signal provided by the first voltage terminal VDD may be transmitted to the light-emitting device O through the second node N2, the driving transistor TD, and the third node N3 in sequence. The electrical signal may cooperate with the electrical signal provided by the second voltage terminal VSS that is coupled to the light-emitting device O, so as to drive the light-emitting device O to emit light normally to realize display.

In some embodiments, with continued reference to FIG. 10, the pixel driving circuit 100 further includes a second reset sub-circuit 90.

The second reset sub-circuit 90 is coupled to a second reset signal terminal Reset2, a second initialization signal terminal Vinit2, and the light-emitting device O, the second reset sub-circuit is configured to transmit an initialization signal received at the second initialization signal terminal Vinit2 to the light-emitting device O under control of a reset signal received from the second reset signal terminal Reset2.

For example, the second reset sub-circuit 90 transmits the initialization signal received at the second initialization signal terminal Vinit2 to the light-emitting device O under the control of the reset signal received from the second reset signal terminal Reset2, so as to reset the anode of the light-emitting device O. Therefore, the stability of the light-emitting device O is improved.

In some embodiments, with continued reference to FIG. 10, the second reset sub-circuit 90 includes a seventh transistor T7.

A gate of the seventh transistor T7 is coupled to the second reset signal terminal Reset2, a first electrode of the seventh transistor T7 is coupled to the light-emitting device O, and a second electrode of the seventh transistor T7 is coupled to the second initialization signal terminal Vinit2.

For example, the seventh transistor T7 included in the second reset sub-circuit 90 is turned on under the control of a low-level (active-level) signal received from the second reset signal terminal Reset2, so as to transmit the initialization signal received at the second initialization signal terminal Vinit2 to the light-emitting device O. The initialization signal received at the second initialization signal terminal Vinit2 may be a low-level signal. Therefore, it is conducive to resetting the anode of the light-emitting device O by using the initialization signal, and improving the stability of the light-emitting device O.

Figure 11:
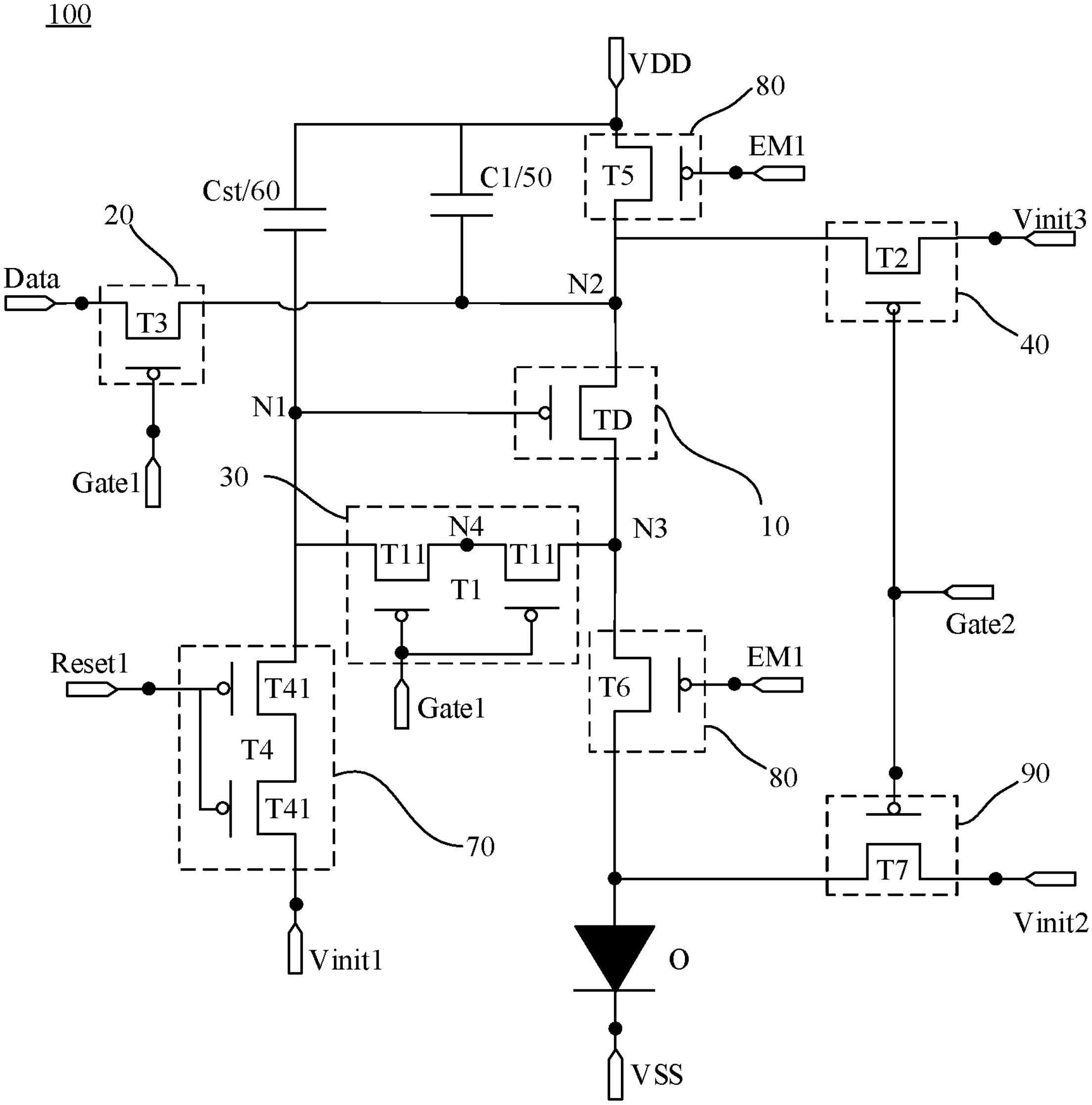
FIG. 11 is a structural diagram of yet another pixel driving circuit, in accordance with some embodiments of the present disclosure.

FIG. 11 is a structural diagram of yet another pixel driving circuit, in accordance with some embodiments of the present disclosure. In some embodiments, referring to FIG. 11, the second reset signal terminal Reset2 and the second scan signal terminal Gate2 are controlled in response to a same control signal.

For example, FIG. 11 shows an example in which the second scan signal terminal Gate2 is also used as the second reset signal terminal Reset2. The second scan signal terminal Gate2 is also used as the second reset signal terminal Reset2, so as to simplify the structure of the pixel driving circuit 100 and reduce the layout difficulty in the display panel 200. In addition, since the second reset signal terminal Reset2 and the second scan signal terminal Gate2 are controlled in response to the same control signal, the anode of the light-emitting device O may be reset repeatedly through the second reset signal terminal Reset2 in one frame, thereby further improving the stability of the light-emitting device O.

In some embodiments, with continued reference to FIG. 10, the reset signal received by the second reset signal terminal Reset2 and the enable signal received by the enable signal terminal EM1 are inverted.

For example, the reset signal received by the second reset signal terminal Reset2 and the enable signal received by the enable signal terminal EM1 are inverted. It will be understood that, the reset signal received by the second reset signal terminal Reset2 and the enable signal received by the enable signal terminal EM1 are alternately provided. For example, when the reset signal received by the second reset signal terminal Reset2 is a low-level signal, the enable signal received by the enable signal terminal EM1 is a high-level signal. Alternatively, when the reset signal received at the second reset signal terminal Reset2 is a high-level signal, the enable signal received at the enable signal terminal EM1 is a low-level signal. Therefore, it may be possible to ensure that the anode of the light-emitting device O is reset before the light-emitting control sub-circuit 80 is controlled to be turned on by the enable signal received at the enable signal terminal EM1, and the stability of the light-emitting device O is improved.

For example, the second reset signal terminal Reset2 may be a signal terminal EM2 that receives an inverted signal of the enable signal received by the enable signal terminal EM1. In this case, the signal terminal EM2 and the second reset signal terminal Reset2 are a same signal terminal. In this case, an internal structure of the display panel 200 will be described in detail below. In this way, the structure of the pixel driving circuit 100 may be simplified, and it is conducive to reducing the layout difficulty in the display panel 200.

Some embodiments of the present disclosure further provide a driving method of a pixel driving circuit, and the driving method is applied to the pixel driving circuit 100 in any one of the above embodiments.

Figure 12:
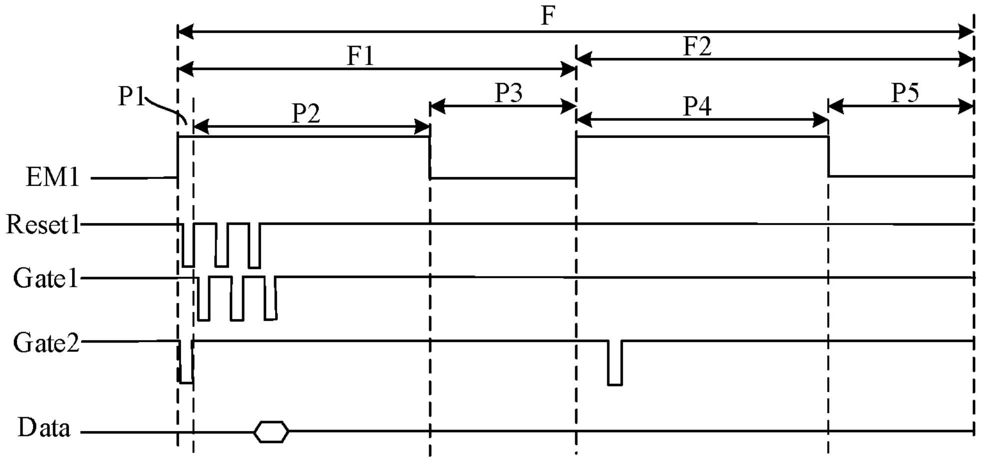
FIG. 12 is a timing diagram of a pixel driving circuit, in accordance with some embodiments of the present disclosure.

FIG. 12 is a timing diagram of a pixel driving circuit, in accordance with some embodiments of the present disclosure. Some embodiments are described with reference to FIGS. 9 and 12.

The pixel driving circuit 100 includes the driving sub-circuit 10, the writing sub-circuit 20, the compensation sub-circuit 30, the light-emitting control sub-circuit and the adjustment sub-circuit 40. The driving sub-circuit 10 is coupled to the first node N1, the second node N2, and the third node N3. The writing sub-circuit 20 is coupled to the second node N2, the first scan signal terminal Gate1, and the data signal terminal Data. The compensation sub-circuit 30 is coupled to the first node N1, the third node N3, and the compensation control terminal G0. The light-emitting control sub-circuit 80 is coupled to the first voltage terminal VDD, the enable signal terminal EM1, the second node N2, the third node N3, and the light-emitting device O. The adjustment sub-circuit 40 is coupled to the second node N2 and/or the third node N3, and is further coupled to the second scan signal terminal Gate2 and the first reference voltage signal terminal Vinit3.

The driving method includes a plurality of light-emitting cycles F. A light-emitting cycle F (a frame) includes a refresh frame F1 and at least one holding frame F2. A light-emitting cycle (a frame) is a display frame, i.e., a display image. The refresh frame F1 includes a reset phase P1, a writing phase P2, and a first light-emitting phase P3. The holding frame F2 includes a light-emitting adjustment phase P4 and a second light-emitting phase P5.

In the writing phase P2, the writing sub-circuit 20 transmits the data signal received at the data signal terminal Data to the second node N2 under the control of the gate scan signal received from the first scan signal terminal Gate1; the driving sub-circuit 10 transmits the data signal from the second node N2 to the third node N3; and the compensation sub-circuit 30 transmits the voltage of the third node N3 to the first node N1.

For example, in the writing phase P2, the active signal of the gate scan signal received by the first scan signal terminal Gate1 and the active signal of the compensation signal received by the compensation control terminal G0 at least partially overlap. For example, the active signal of the gate scan signal received by the first scan signal terminal Gate1 coincides with the active signal of the compensation signal received by the compensation control terminal G0. For example, the gate scan signal received by the first scan signal terminal Gate1 is also used as the compensation signal received by the compensation control terminal G0.

In the first light-emitting phase P3, under the control of the enable signal from the enable signal terminal EM1, the light-emitting control sub-circuit 80 cooperates with the driving sub-circuit 10 to transmit the driving signal to the light-emitting device O. That is, the voltage signal provided by the first voltage terminal VDD is transmitted to the light-emitting device O to drive the light-emitting device O to emit light.

In the light-emitting adjustment phase P4, the adjustment sub-circuit 40 transmits the reference voltage signal received at the first reference voltage signal terminal Vinit3 to the second node N2 and/or the third node N3 under the control of the scan signal transmitted by the second scan signal terminal Gate2.

For example, the adjustment sub-circuit 40 transmits the reference voltage signal received at the first reference voltage signal terminal Vinit3 to the second node N2 under the control of the scan signal transmitted by the second scan signal terminal Gate2.

For example, the adjustment sub-circuit 40 transmits the reference voltage signal received at the first reference voltage signal terminal Vinit3 to the third node N3 under the control of the scan signal transmitted by the second scan signal terminal Gate2.

For example, the adjustment sub-circuit 40 transmits the reference voltage signal received at the first reference voltage signal terminal Vinit3 to the second node N2 and the third node N3 under the control of the scan signal transmitted by the second scan signal terminal Gate2.

In the second light-emitting phase P5, under control of the signal from the enable signal terminal EM1 and the first node N1, the light-emitting control sub-circuit 80 and the driving sub-circuit 10 cooperate to transmit the voltage signal provided by the first voltage terminal to the light-emitting device O, so as to drive the light-emitting device O to emit light.

In the pixel driving circuit 100 provided in the embodiments of the present disclosure, during the light-emitting adjustment phase P4, the adjustment sub-circuit 40 is turned on under the control of the low-level (active-level) signal transmitted by the second scan signal terminal Gate2, and transmits the reference voltage signal received at the first reference voltage signal terminal Vinit3 to the second node N2 and/or the third node N3. Data is not refreshed in the first light-emitting phase P3, the potential of the first scan signal terminal Gate1 is high, and the voltage of the fourth node N4 is pulled up by the voltage of the first scan signal terminal Gate1, so that the voltage of the fourth node N4 may be greater than the voltage of the first node N1.

Therefore, the reference voltage signal received at the first reference voltage signal terminal Vinit3 is used to adjust the voltage of the second node N2 and/or the voltage of the third node N3. Since there are a capacitance between the gate and the drain of the driving transistor of the driving sub-circuit 10 and a capacitance between the gate and the source of the driving transistor of the driving sub-circuit 10, when the voltage of the second node N2 and/or the voltage of the third node N3 changes, the voltage of the first node N1 changes synchronously due to the capacitive coupling effect, so as to compensate the influence of the fourth node N4 on the voltage of the first node N1. In the light-emitting adjustment phase P4, the voltage of the first node N1 is in dynamic balance, and the potential stability of the first node N1 is improved, the brightness holding ratio of the light-emitting device O in the frame is high. Thus, it may be possible to ameliorate the brightness variation in the second light-emitting phase P5, and ameliorate the flicker phenomenon of the light-emitting device O and the display panel 200.

One light-emitting period F (one frame) includes one refresh frame F1 and at least one holding frame F2. FIG. 12 shows an example in which one light-emitting period F includes one holding frame F2. In a case where one light-emitting period F includes a plurality of holding frames F2, the timing of the holding frame F2 is the same as the timing of the holding frame F2 in FIG. 12. For example, in a case where one light-emitting period F includes one refresh frame F1 and three holding frames F2, the timing of the three holding frames F2 may be understood as the holding frame F2 in FIG. 12 being repeated three times. In some other embodiments, one light-emitting period F may include other number of holding frames F2, and a specific number of holding frames F2 may be set according to the driving state of the display panel 200. For example, the number of holding frames F2 in one light-emitting period F when the display panel 200 is driven at a low frequency is greater than the number of holding frames F2 in one light-emitting period F when the display panel 200 is driven at a high frequency. Based on this, when the display panel 200 is driven at the low frequency, the number of the holding frames F2 is relatively large, so that the flicker phenomenon is easy to occur during the display of the display panel.

In some embodiments, with continued reference to FIG. 12, in the reset phase P1, the adjustment sub-circuit 40 transmits the reference voltage signal received at the first reference voltage signal terminal Vinit3 to the second node N2, so as to reset the second node N2 at least once.

For example, FIG. 12 shows an example in which the adjustment sub-circuit 40 resets the second node N2 once in the reset phase P1. In the reset phase P1, the adjustment sub-circuit 40 is turned on under the control of the low-level (active-level) signal transmitted by the second scan signal terminal Gate2, and transmits the reference voltage signal received at the first reference voltage signal terminal Vinit3 to the second node N2. In this way, the initial state of the driving transistor TD before the writing phase is stable, so that the driving transistor TD is in a stable state in the writing phase, and the hysteresis effect of the driving transistor TD is ameliorated to a great extent.

Therefore, in the pixel driving method provided in the embodiments of the present disclosure, the reference voltage signal received at the first reference voltage signal terminal Vinit3 may be transmitted to the second node N2 through the adjustment sub-circuit 40 in the light-emitting adjustment phase P4. Due to the capacitive coupling, the voltage variation of the first node N1 is compensated by using the voltage variation of the second node N2. Therefore, the voltage of the first node N1 is in dynamic balance, the potential stability of the first node N1 is improved, the brightness holding ratio of the light-emitting device O in the frame is high, and the flicker phenomenon of the light-emitting device O and the display panel 200 is ameliorated. In addition, the second node N2 may be reset by the adjustment sub-circuit 40 in the reset phase P1, so that the initial state of the driving transistor TD before the writing phase is stable. Therefore, the driving transistor TD is in a stable state in the writing phase, and the hysteresis effect of the driving transistor TD is ameliorated to a great extent.

It will be noted that, the writing phase P2 includes a process of resetting the voltage of the first node N1 repeatedly and a process of writing the data signal into the first node N1, so that the driving transistor TD may be more stable, and the hysteresis effect may be ameliorated to a great extent.

Figure 13:
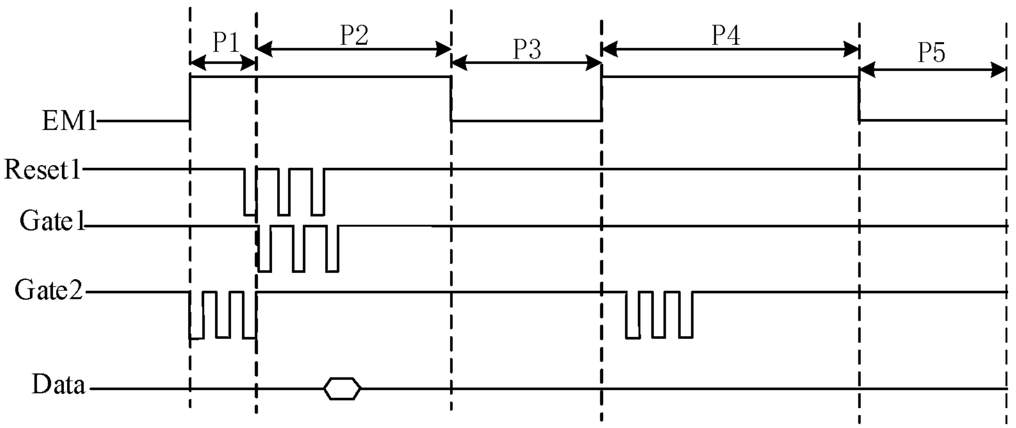
FIG. 13 is a timing diagram of another pixel driving circuit, in accordance with some embodiments of the present disclosure.

FIG. 13 is a timing diagram of another pixel driving circuit, in accordance with some embodiments of the present disclosure. In some examples, referring to FIG. 13, in the reset phase P1, the second node N2 is reset a plurality of times.

In the reset phase P1, the second node N2 is reset repeatedly by the adjustment sub-circuit 40, so that the second node N2 may be reset thoroughly. Moreover, the driving transistor TD may be more stable in the writing phase, and the hysteresis effect of the driving transistor TD may be ameliorated to a great extent.

For example, with continued reference to FIG. 13, in the reset phase P1, the second node N2 is reset 2 to 4 times. FIG. 13 shows an example in which the second node N2 is reset 3 times in the reset phase P1.

In a case where the number of times of resetting the second node N2 in the reset phase P1 is equal to or close to 2, the second node N2 may be reset, and it may also be possible to avoid the affect of the display effect caused by resetting the second node N2 too many times. In a case where the number of times of resetting the second node N2 in the reset phase P1 is equal to or close to 4, the second node N2 may be reset more thoroughly without affecting a duty ratio.

For example, the number of times of resetting the second node N2 in the reset phase P1 may be 2, 3, or 4.

Figure 14:
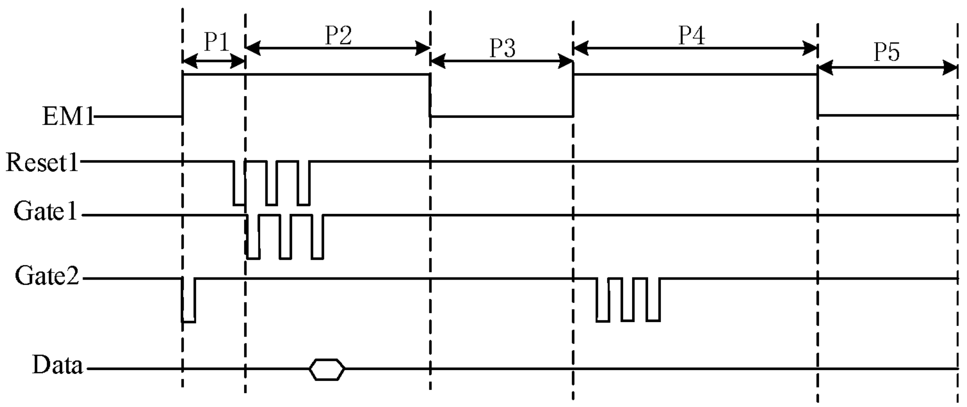
FIG. 14 is a timing diagram of yet another pixel driving circuit, in accordance with some embodiments of the present disclosure.

FIG. 14 is a timing diagram of yet another pixel driving circuit, in accordance with some embodiments of the present disclosure. In some embodiments, referring to FIG. 14, in the reset phase P1, after the adjustment sub-circuit 40 resets the second node N2, the first reset sub-circuit 70 transmits the initialization signal received at the first initialization signal terminal Vinit1 to the first node N1 under the control of the first reset signal received from the first reset signal terminal Reset1.

For example, in the reset phase P1, the low-level (active-level) signal received by the second scan signal terminal Gate2 is earlier than the low-level (active-level) signal received by the first reset signal terminal Reset1, so that the adjustment sub-circuit 40 is turned on earlier than the first reset sub-circuit 70. That is, the second node N2 is reset by the adjustment sub-circuit 40, and then the first node N1 is reset by the first reset sub-circuit 70. Compared with a case in which the first node N1 and the second node N2 are reset simultaneously as shown in FIG. 12, duration in which the driving transistor TD is reset may be longer, so that the hysteresis effect may be ameliorated more thoroughly.

Figure 15:
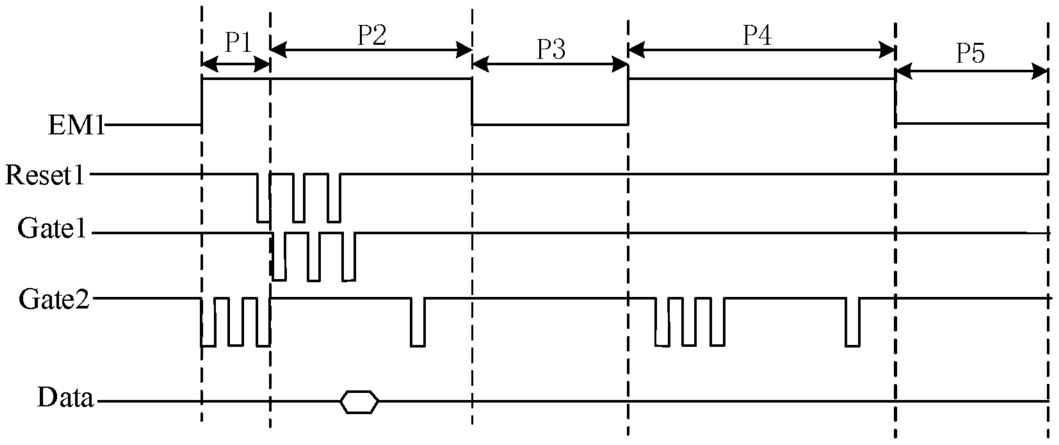
FIG. 15 is a timing diagram of yet another pixel driving circuit, in accordance with some embodiments of the present disclosure.

FIG. 15 is a timing diagram of yet another pixel driving circuit, in accordance with some embodiments of the present disclosure. In some embodiments, referring to FIG. 15, in the writing phase P2, after the data signal received at the data signal terminal Data is transmitted to the first node N1, the adjustment sub-circuit 40 transmits the reference voltage signal received at the first reference voltage signal terminal Vinit3 to the second node N2 under the control of the scan signal transmitted by the second scan signal terminal Gate2, so as to reset the second node N2.

For example, in the writing phase P2, the third transistor T3 in the writing sub-circuit 20 is turned on and writes the data signal provided by the data signal terminal Data into the second node N2; the data signal of the second node N2 is written into the third node N3 through the driving transistor TD in the driving sub-circuit 10; and the data signal of the third node N3 compensates the first node N1 through the first transistor group T1 in the compensation sub-circuit 30. The potential of the first node N1 gradually rises to (Vdata+Vth), Vdata is the voltage of the data signal provided by the data signal terminal Data, and Vth is the threshold voltage of the driving transistor TD in the driving sub-circuit 10.

The voltage of the second node N2 is changed in the above writing process. In this case, the second node N2 is refreshed after the above process is completed, so that the driving transistor TD stores a same voltage each time, which is conducive to ameliorating the hysteresis effect of the driving transistor TD. Therefore, the display effect of the display panel is improved.

In some embodiments, with continued reference to FIGS. 10 and 12, the first storage sub-circuit 50 is charged during the writing phase P2. In the first light-emitting phase P3, the first storage sub-circuit 50 discharges electricity to the second node N2, so as to compensate the voltage of the second node N2.

For example, in the writing phase P2, the third transistor T3 included in the writing sub-circuit 20 is turned on under the control of the low-level signal transmitted by the first scan signal terminal Gate1; and in this case, the data signal received at the data signal terminal Data is transmitted to the second node N2, and the data signal received at the data signal terminal Data is also transmitted to the first capacitor C1 to charge the first capacitor C1 at the same time. When the adjustment sub-circuit 40 is turned on under the control of the low-level signal transmitted by the second scan signal terminal Gate2, the reference voltage signal received at the first reference voltage signal terminal Vinit3 is transmitted to the second node N2. When the adjustment sub-circuit 40 is turned off under the control of the high-level signal transmitted by the second scan signal terminal Gate2, the first capacitor C1 may maintain the voltage of the second node N2, thereby ensuring the stability of the voltage of the first node N1.

In some embodiments, with continued reference to FIGS. 11 and 12, in the reset phase P1 and the light-emitting adjustment phase P4, the adjustment sub-circuit 40 transmits the reference voltage signal received at the first reference voltage signal terminal Vinit3 to the second node N2 under the control of the scan signal transmitted by the second scan signal terminal Gate2; at the same time, the second reset sub-circuit 90 transmits the initialization signal received at the second initialization signal terminal Vinit2 to the light-emitting device O under the control of the second reset signal received at the second reset signal terminal Reset2.

For example, the circuit coupled to the second reset signal terminal Reset2 and the circuit coupled to the second scan signal terminal Gate2 are controlled to be turned on or turned off synchronously in response to a same control signal. For example, the second scan signal terminal Gate2 may also be used as the second reset signal terminal Reset2.

In the reset phase P1, the adjustment sub-circuit 40 and the second reset sub-circuit 90 are turned on simultaneously under the control of the low-level (active-level) signal provided by the second scan signal terminal Gate2. That is, the second node N2 and the light-emitting device O are reset at least once simultaneously. Therefore, the initial state of the driving transistor TD before the writing phase is stable, the driving transistor TD is in a stable state in the writing phase, the stability of the light-emitting device O is improved, and the flicker phenomenon of the display panel 200 is ameliorated.

In the light-emitting adjustment phase P4, the adjustment sub-circuit 40 and the second reset sub-circuit 90 are turned on simultaneously under the control of the low-level (active-level) signal provided by the second scan signal terminal Gate2. That is, the second node N2 and the light-emitting device O are refreshed simultaneously. The voltage variation of the first node N1 is compensated by using the voltage variation of the second node N2, so that the voltage of the first node N1 may be substantially in dynamic balance. At this time, the light-emitting device O may be refreshed again, and the brightness of the light-emitting device O may be more stabilized compared with a solution in which the light-emitting device O is only reset once in the reset phase P1.

Figure 16:
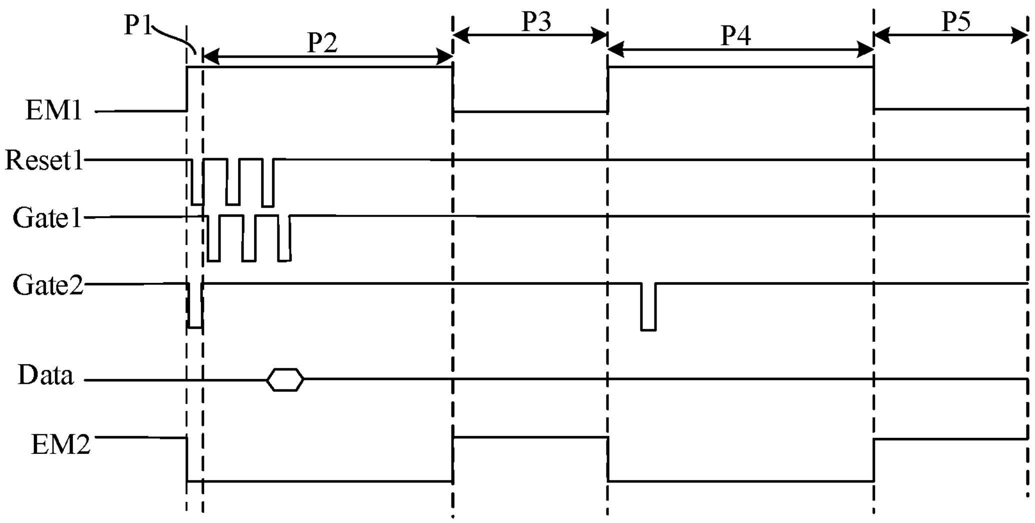
FIG. 16 is a timing diagram of yet another pixel driving circuit, in accordance with some embodiments of the present disclosure.

FIG. 16 is a timing diagram of yet another pixel driving circuit, in accordance with some embodiments of the present disclosure. In some embodiments, referring to FIGS. 9 and 16, in the first light-emitting stage P3, under the control of the enable signal from the enable signal terminal EM1, the light-emitting control sub-circuit 80 cooperates with the driving sub-circuit 10 and transmits the driving signal to the light-emitting device O.

In the reset phase P1 and the light-emitting adjustment phase P4, the second reset sub-circuit 90 transmits the initialization signal received from the second initialization signal terminal Vinit2 to the light-emitting device O under the control of the reset signal received at the second reset signal terminal Reset2.

It will be understood that, the reset signal received at the second reset signal terminal Reset2 and the enable signal received at the enable signal terminal EM1 are alternately provided. For example, the second reset signal terminal Reset2 is replaced with the control terminal EM2 that receives an inverted signal of the enable signal of the enable signal terminal EM1. For example, the enable signal terminal EM1 provides a low level, and the control terminal EM2 provides a high level; alternatively, the enable signal terminal EM1 provides a high level, and the control terminal EM2 provides a low level.

In this way, the light-emitting control sub-circuit 80 and the second reset sub-circuit 90 are alternately turned on.

In the reset phase P1, the enable signal terminal EM1 provides a high-level (inactive-level) signal, and the control terminal EM2 provides a low-level (active-level) signal. In this case, the light-emitting control sub-circuit 80 is turned off under the control of the high-level signal of the enable signal terminal EM1, the second reset sub-circuit 90 is turned on under the control of the low-level signal of the control terminal EM2, and the initialization signal received at the second initialization signal terminal Vinit2 is transmitted to the light-emitting device O to reset the anode of the light-emitting device O.

In the first light-emitting phase P3, the enable signal terminal EM1 provides a low-level (active-level) signal, and the control terminal EM2 provides a high-level (inactive-level) signal. In this case, the second reset sub-circuit 90 is turned off under the control of the high-level signal of the control terminal EM2, and the light-emitting control sub-circuit 80 is turned on under the control of the low-level signal of the enable signal terminal EM1, and cooperates with the driving sub-circuit to drive the light-emitting device O to emit light.

In the light-emitting adjustment phase P4, the enable signal terminal EM1 provides a high-level (inactive-level) signal, and the control terminal EM2 provides a low-level (active-level) signal. In this case, the light-emitting control sub-circuit 80 is turned off under the control of the high-level signal of the enable signal terminal EM1, the second reset sub-circuit 90 is turned on under the control of the low-level signal of the control terminal EM2, and the initialization signal received at the second initialization signal terminal Vinit2 is transmitted to the light-emitting device O, so as to refresh the potential of the anode of the light-emitting device O.

Figure 17:
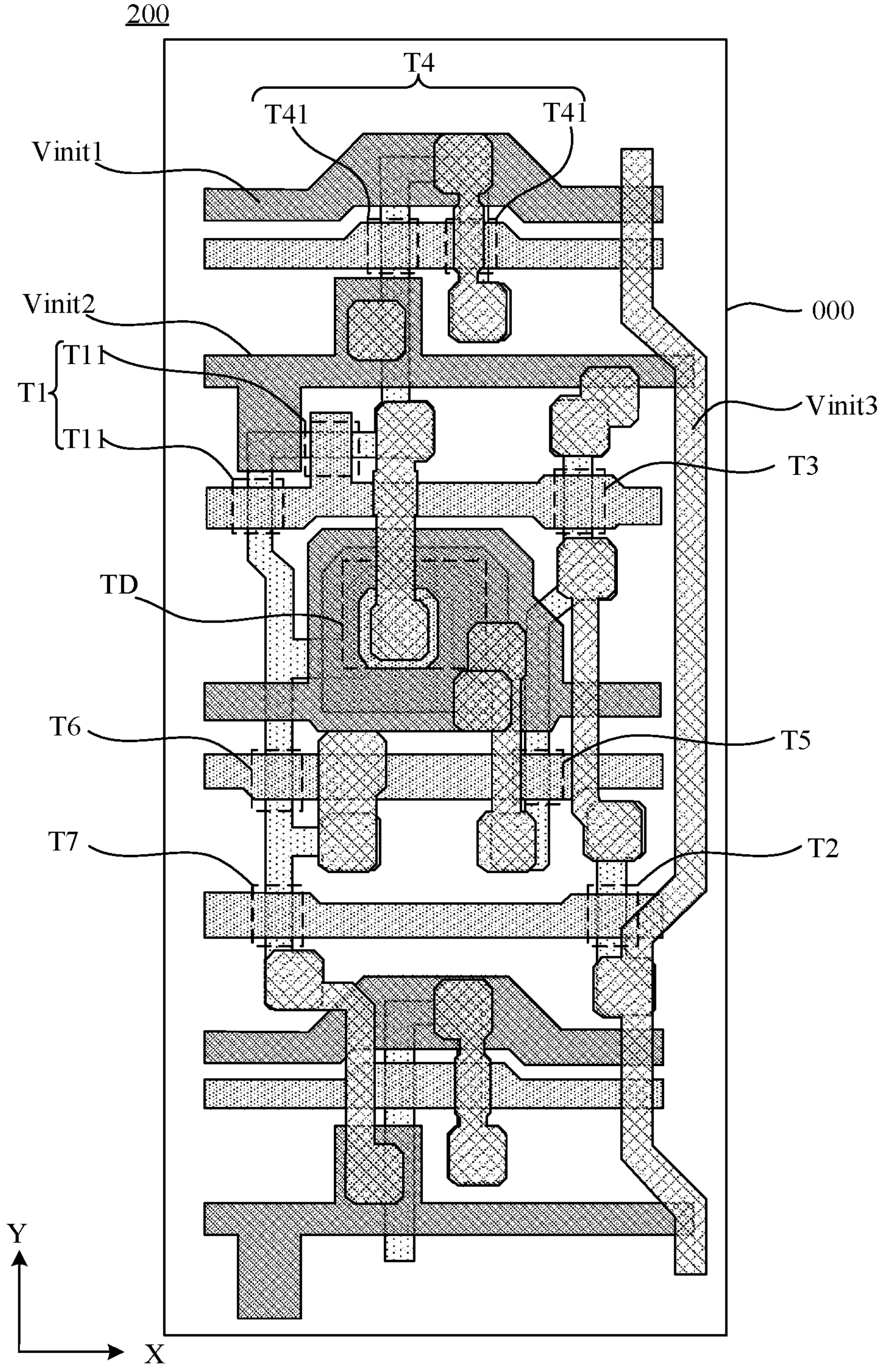
FIG. 17 is a structural diagram of film layers of a pixel driving circuit located in a sub-pixel in a display panel, in accordance with some embodiments of the present disclosure.
Figure 17A:
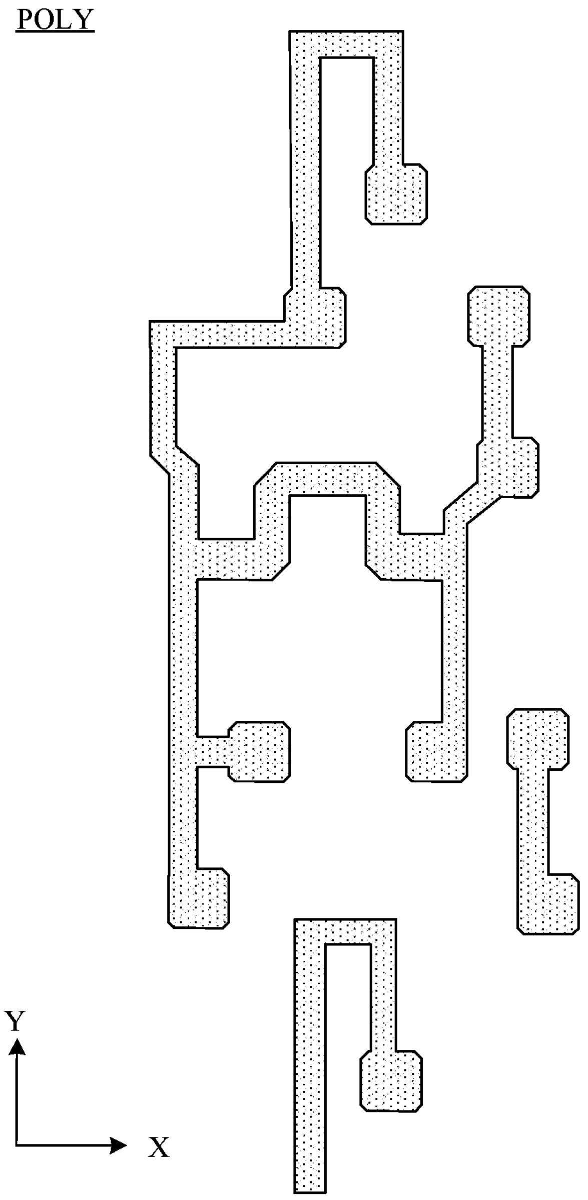
FIGS. 17A to 17D are structural diagrams of some film layers in FIG. 17.

FIG. 17 is a structural diagram of film layers of a pixel driving circuit located in a sub-pixel in a display panel, in accordance with some embodiments of the present disclosure. FIGS. 17A to 17D are structural diagrams of film layers in FIG. 17. It will be understood that, an equivalent circuit corresponding to the pixel driving circuit in FIG. 17 is as shown in FIG. 9.

Referring to FIG. 17, the display panel 200 includes the substrate 000 and a first gate conductive layer G1, and the first gate conductive layer G1 is located on a side of the substrate 000.

Figure 17B:
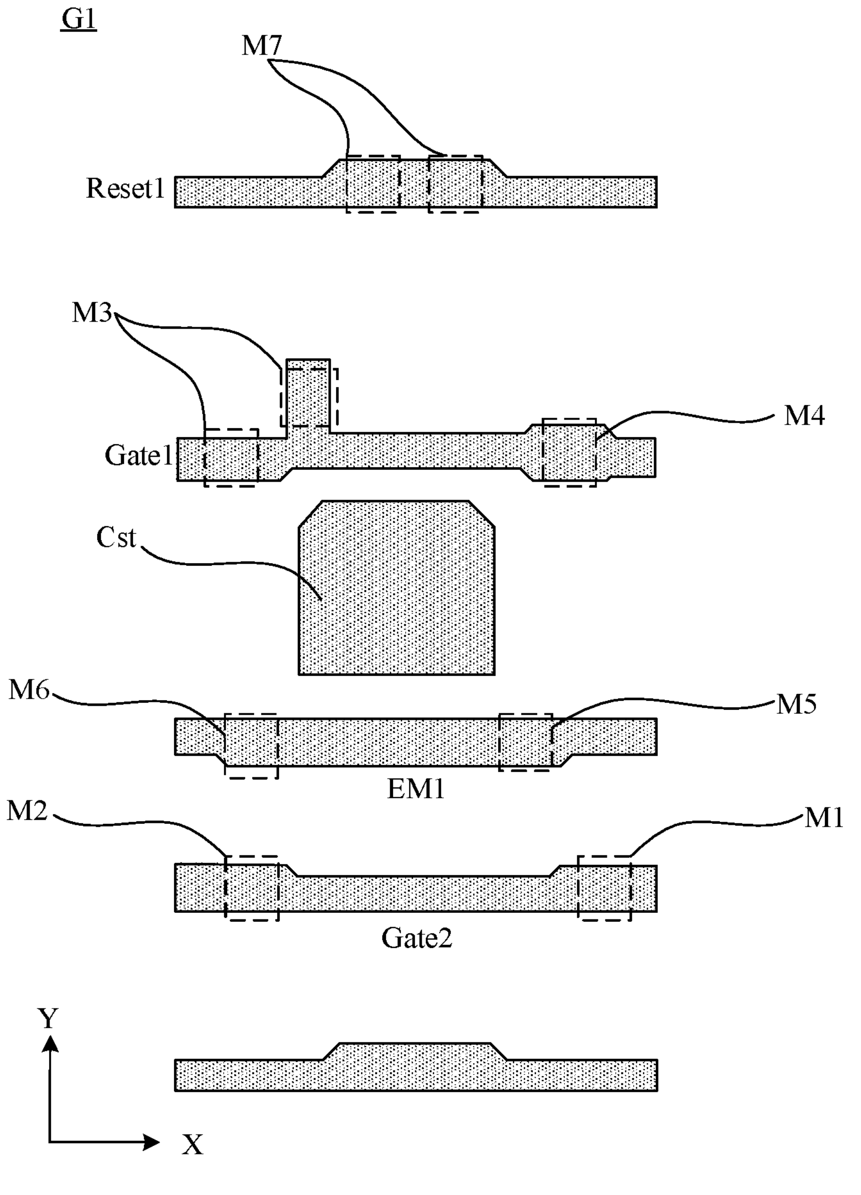
Figure 17C:
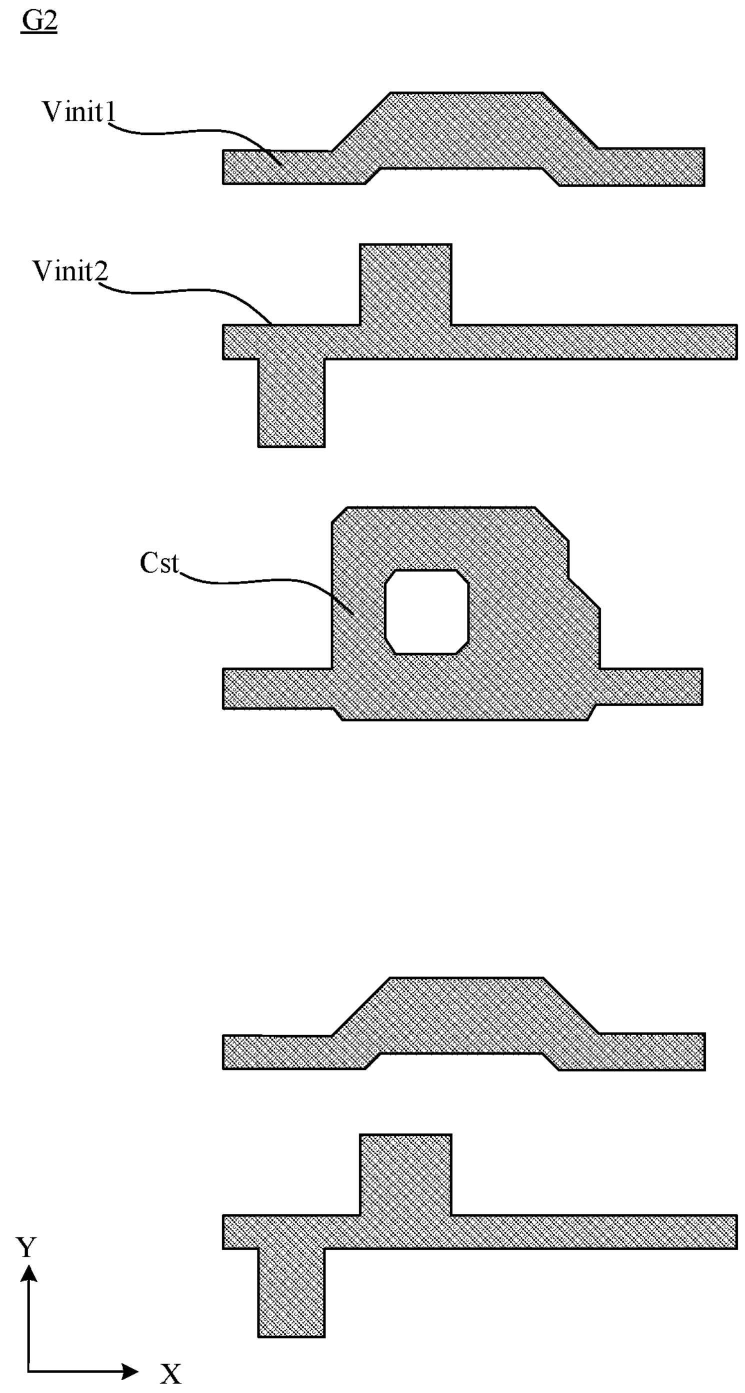

Referring to FIG. 17B, the first gate conductive layer G1 includes a second scan signal line Gate2, and the second scan signal line Gate2 extends in a first direction X.

The pixel driving circuit 100 includes the second transistor T2 and the seventh transistor T7.

The second scan signal line Gate2 includes a first portion M1 and a second portion M2, the first portion M1 is also used as the gate of the second transistor T2, and the second portion M2 is also used as the gate of the seventh transistor T7.

In this way, the gate of the second transistor T2 and the gate of the seventh transistor T7 are both electrically connected to the second scan signal line Gate2. The second scan signal line Gate2 that is connected to the gate of the second transistor T2 is also used as the second reset signal terminal Reset2 that is connected to the gate of the seventh transistor T7. Therefore, the gate of the second transistor T2 and the gate of the seventh transistor T7 may be driven by a gate driving circuit, and an electric signal provided by the gate driving circuit is transmitted to the gate of the second transistor T2 and the gate of the seventh transistor T7 through the second scan signal line Gate2, so as to control on/off states of the second transistor T2 and the seventh transistor T7. Therefore, one gate driving circuit may be omitted, which facilitates the layout of the display panel 200, so as to realize a narrow bezel of the display panel 200. In addition, the manufacturing process of the pixel driving circuit 100 may be simplified, thereby simplifying the manufacturing process of the display panel 200.

For example, with continued reference to FIG. 17B, the first gate conductive layer G1 further includes a first scan signal line Gate1, and the first scan signal line Gate1 extends in the first direction X.

The pixel driving circuit 100 includes the first transistors T11 and the third transistor T3.

The first scan signal line Gate1 includes third portions M3 and a fourth portion M4, the third portion M3 is also used as the gate of the first transistor T11, and the fourth portion M4 is also used as the gate of the third transistor T3.

For example, with continued reference to FIG. 17B, the first gate conductive layer G1 further includes an enable signal line EM1, and the enable signal line EM1 extends in the first direction X.

The pixel driving circuit 100 includes the fifth transistor T5 and the sixth transistor T6.

The enable signal line EM1 includes a fifth portion M5 and a sixth portion M6, the fifth portion M5 is also used as the gate of the fifth transistor T5, and the sixth portion M6 is also used as the gate of the sixth transistor T6.

For example, with continued reference to FIG. 17B, the first gate conductive layer G1 further includes a first reset signal line Reset1, and the first reset signal line Reset1 extends in the first direction X.

The pixel driving circuit 100 includes the fourth transistors T41.

The first reset signal line Reset1 includes seventh portions M7, and the seventh portion M7 is also used as the gate of the fourth transistor T41.

In this way, the manufacturing process of the pixel driving circuit 100 may be simplified, thereby simplifying the manufacturing process of the display panel 200.

For example, the above description is made by taking an example in which the first gate conductive layer G1 includes the first reset signal line Reset1, the first scan signal line Gate1, the enable signal line EM1, and the second scan signal line Gate2 that are arranged in a second direction Y. The second direction Y intersects the first direction X. For example, the second direction Y is perpendicular to the first direction X. In some other embodiments, the first gate conductive layer G1 may further include other lines according to the requirements of the display panel 200.

For example, the first gate conductive layer G1 may further include a bottom plate of the second capacitor Cst. The first gate conductive layer G1 may further include the gate of the driving transistor TD, and/or a portion of the bottom plate of the second capacitor Cst is also used as the gate of the driving transistor TD. In this way, the manufacturing process of the pixel driving circuit 100 may be simplified, thereby simplifying the manufacturing process of the display panel 200.

For example, a material of the first gate conductive layer G1 includes a conductive metal. The conductive metal may include at least one of aluminum, copper or molybdenum, and is not limited thereto in the present disclosure.

Figure 18:
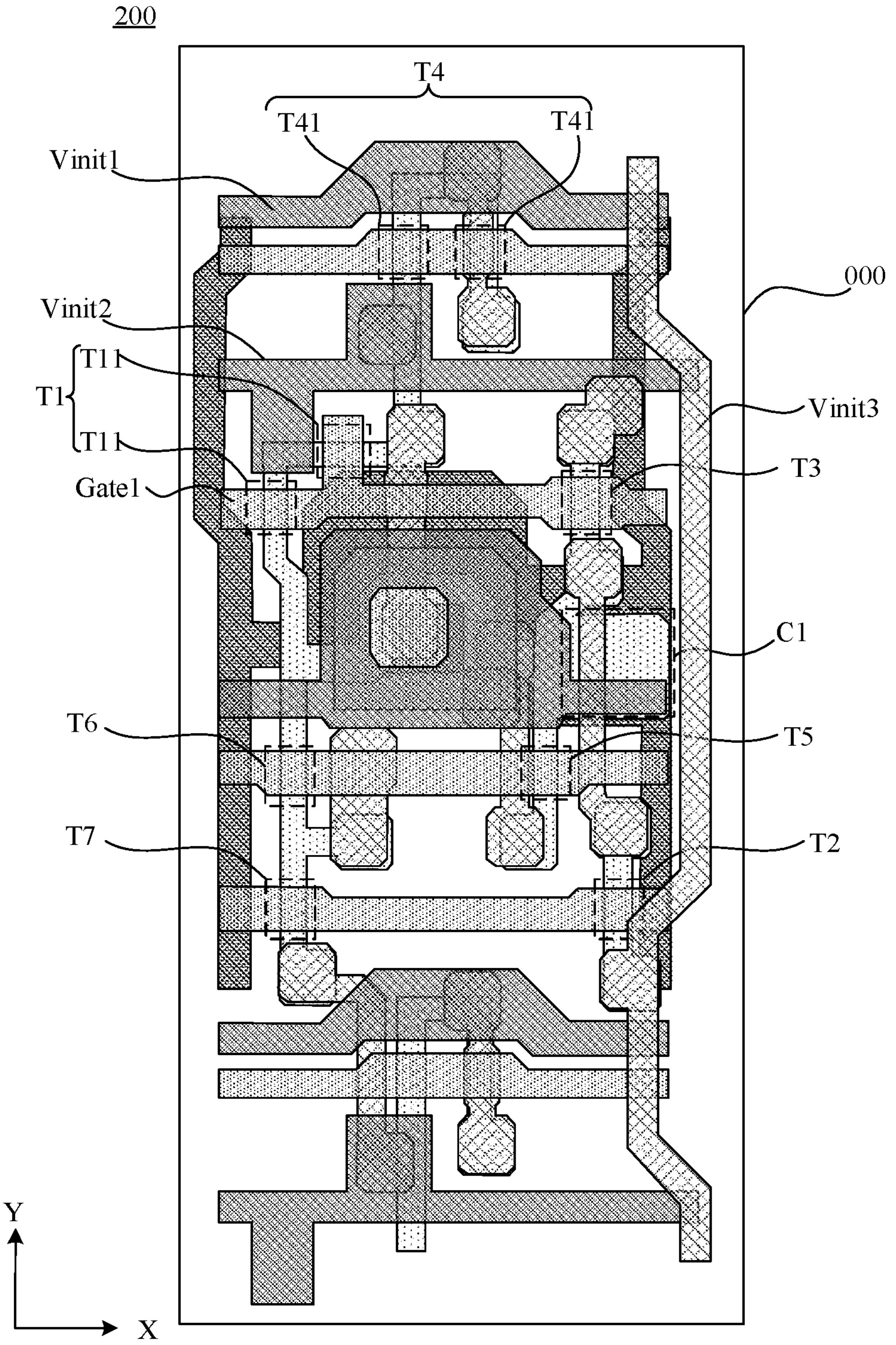
FIG. 18 is a structural diagram of film layers of a pixel driving circuit located in a sub-pixel in a display panel, in accordance with some other embodiments of the present disclosure.
Figure 19:
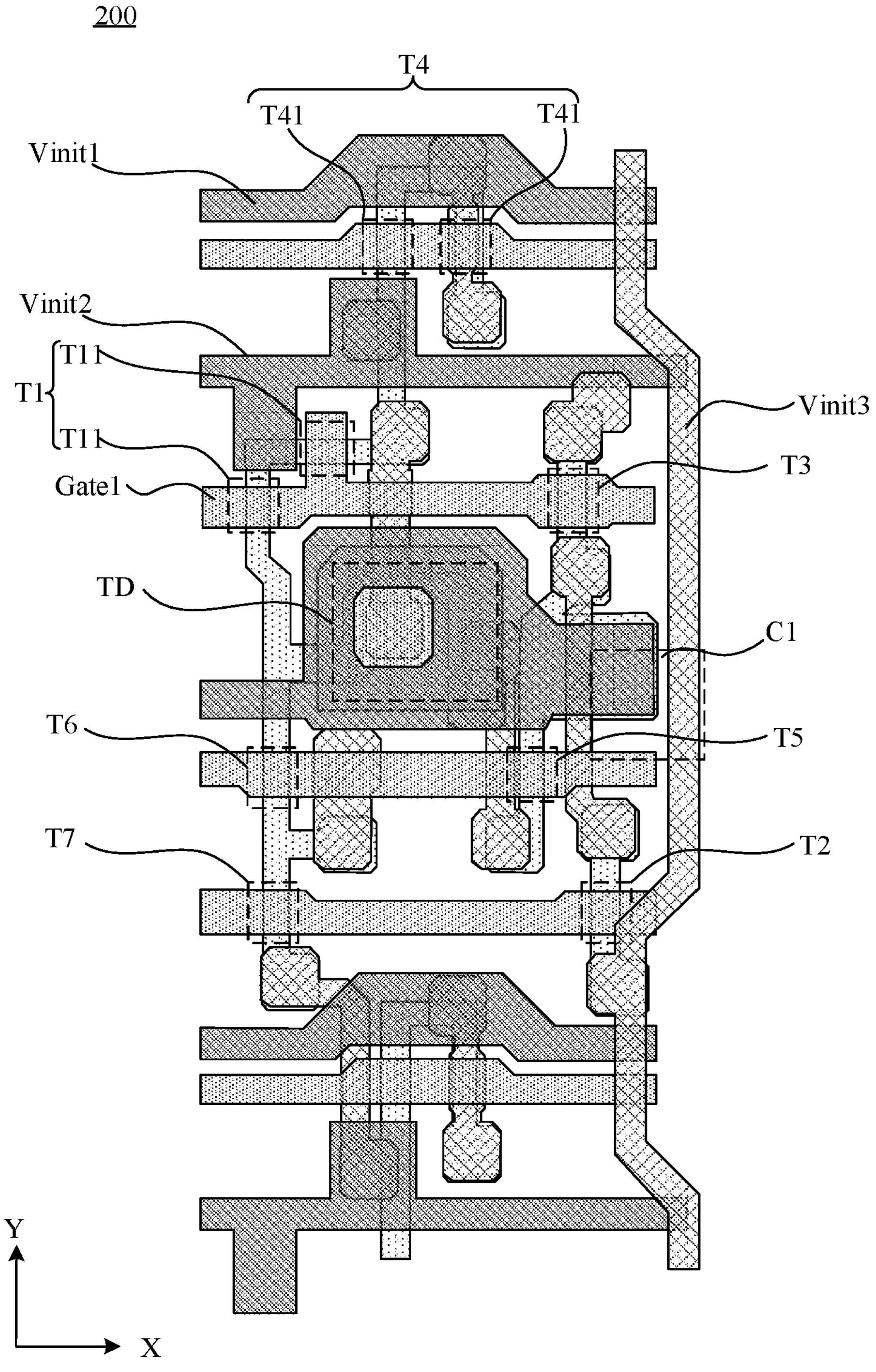
FIG. 19 is a structural diagram of film layers of a pixel driving circuit located in a sub-pixel in a display panel, in accordance with yet some embodiments other of the present disclosure.
Figure 20:
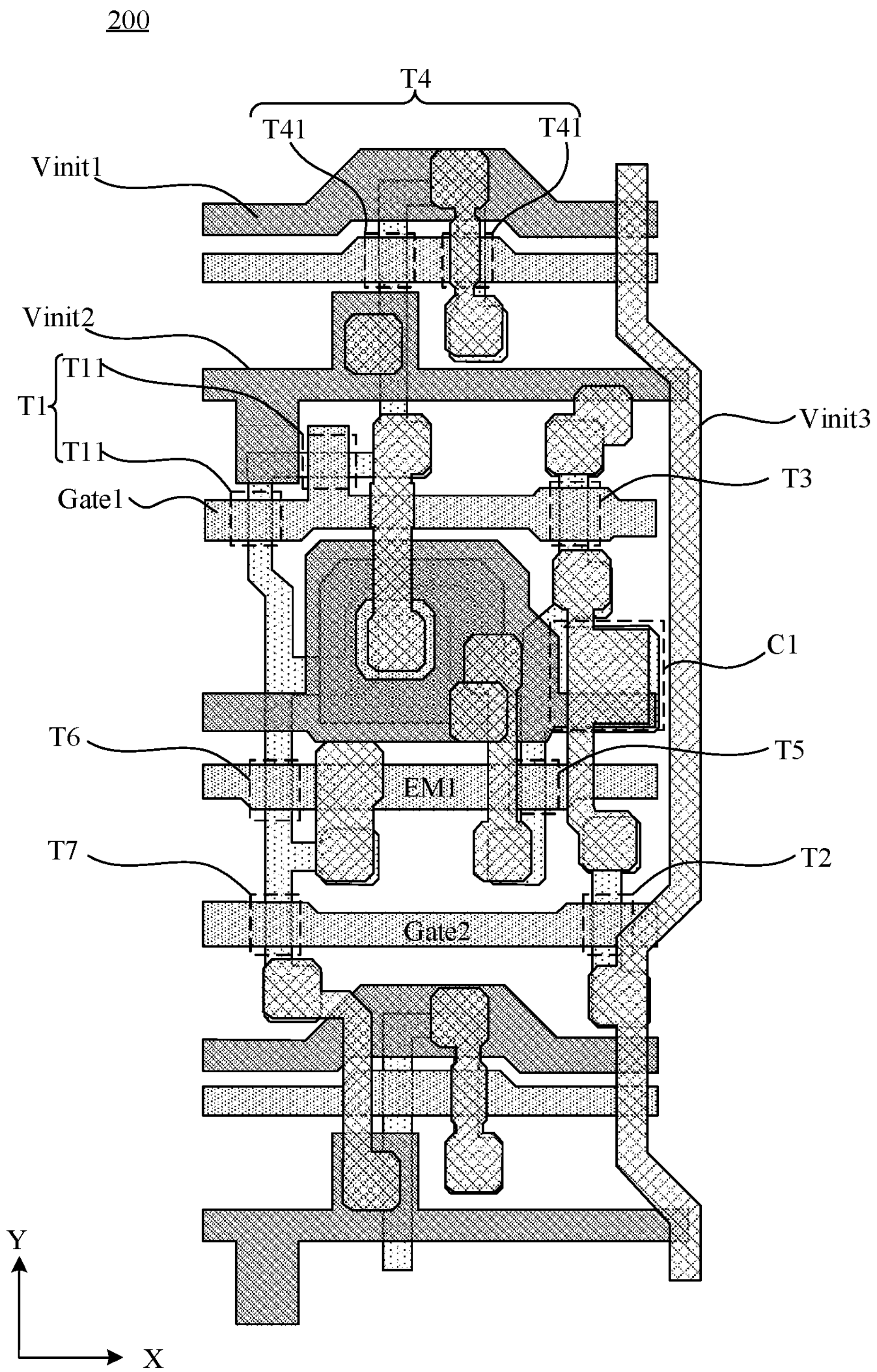
FIG. 20 is a structural diagram of film layers of a pixel driving circuit located in a sub-pixel in a display panel, in accordance with yet some other embodiments of the present disclosure.

FIG. 18 is a structural diagram of film layers of a pixel driving circuit located in a sub-pixel in a display panel, in accordance with some other embodiments of the present disclosure. FIG. 19 is a structural diagram of film layers of a pixel driving circuit located in a sub-pixel in a display panel, in accordance with yet some other embodiments of the present disclosure. FIG. 20 is a structural diagram of film layers of a pixel driving circuit located in a sub-pixel in a display panel, in accordance with yet some other embodiments of the present disclosure. It will be understood that, an equivalent circuit corresponding to the pixel driving circuits in FIGS. 18, 19, and 20 is as shown in FIG. 11. In some embodiments, referring to FIGS. 18, 19 and 20, the display panel 200 further includes an active layer POLY, a second gate conductive layer G2, and a first source-drain conductive layer SD1.

The active layer POLY is located between the substrate 000 and the first gate conductive layer G1.

For example, a material of the active layer Poly may include amorphous silicon, monocrystalline silicon, polycrystalline silicon, or a metal oxide semiconductor material.

For example, a first gate insulating layer is provided between the active layer Poly and the first gate conductive layer G1, and the first gate insulating layer electrically insulates the active layer Poly from the first gate conductive layer G1. For example, a material of the first gate insulating layer includes any one of inorganic insulating materials such as silicon nitride, silicon oxynitride and silicon oxide. The material of the first gate insulating layer may include silicon dioxide, and is not limited thereto in the present disclosure.

It will be noted that, an orthographic projection of the active layer Poly on the substrate overlaps with an orthographic projection of the first gate conductive layer G1 on the substrate. Portions of the active layer Poly that are covered by the first gate conductive layer G1 constitute active portions (channel portions) of all transistors, and a portion of the active layer Poly that is not covered by the first gate conductive layer G1 is a conductive portion, which constitutes a part of a first electrode or a second electrode of the transistor.

The second gate conductive layer G2 is located on a side of the first gate conductive layer G1 away from the active layer POLY.

For example, a material of the second gate conductive layer G2 may be the same as the material of the first gate conductive layer G1. It will be understood that, in some other embodiments, the material of the second gate conductive layer G2 may be different from the material of the first gate conductive layer G1, which is not limited in the embodiments of the present disclosure.

For example, a second gate insulating layer may be provided between the second gate conductive layer G2 and the first gate conductive layer G1. The second gate insulating layer electrically insulates the second gate conductive layer G2 from the first gate conductive layer G1. For example, a material of the second gate insulating layer includes any one of inorganic insulating materials such as silicon nitride, silicon oxynitride and silicon oxide. The material of the second gate insulating layer may include silicon dioxide, and is not limited thereto in the present disclosure.

The first source-drain conductive layer SD1 is located on a side of the second gate conductive layer G2 away from the active layer POLY.

For example, a third gate insulating layer is disposed between the second gate conductive layer G2 and the first source-drain conductive layer SD1, and the third insulating layer electrically insulates the second gate conductive layer G2 from the first source-drain conductive layer SD1. For example, a material of the third gate insulating layer includes any one of inorganic insulating materials such as silicon nitride, silicon oxynitride and silicon oxide. The material of the third gate insulating layer may include silicon dioxide, and is not limited thereto in the present disclosure.

For example, the display panel 200 may further include a shielding layer LS, and the shielding layer LS is located between the substrate 000 and the active layer POLY.

It will be noted that, the material of the active layer POLY is sensitive to light, and when the active layer POLY is exposed to light of different intensities, the electrical characteristics of the active layer POLY vary greatly. In order to avoid the problem that the active portions of the transistors in the active layer POLY are affected by light during use, the shielding layer LS is disposed between the substrate 000 and the active layer POLY, and an orthographic projection of the shielding layer LS on the substrate 000 overlaps with the orthographic projection of the active layer POLY on the substrate 000. The shielding layer LS may be used to prevent external light from affecting the active portions.

For example, during a continuous operation process of the active layer POLY, $H_2O$, fluoride (F) ions, and hydrogen (H) atoms of the gate are diffused when the gate is energized, which results in a negative bias of the threshold voltage (Vth) of the transistor. Therefore, the lifetime of the transistor is shortened, and grayscales of the display image displayed by the display panel 200 are uneven. In order to avoid the above problem, a constant voltage may be provided to the shielding layer LS at the channel portions, and the voltage may be used to ameliorate the negative bias of the threshold voltage (Vth), thereby alleviating the aging process. The constant voltage may be a voltage provided by the first voltage terminal VDD, or may be a voltage provided by the second voltage terminal VSS, or may be a voltage provided by the reference voltage signal terminal Vinit (Vinit1, Vinit2, or Vinit3). Alternatively, a variable voltage may be provided to the shielding layer LS at the channel portions, and the variable voltage may be input from a periphery of the display area of the display panel 200, or may be input through a via hole provided in the display area of the display panel 200 for electrical connection.

Based on the above arrangement, the pixel driving circuit 100 includes the first capacitor C1.

A first electrode plate of the first capacitor C1 and a second electrode plate of the first capacitor C1 are located in at least two of the shielding layer LS, the active layer POLY, the first gate conductive layer G1, the second gate conductive layer G2, and the first source-drain conductive layer SD1.

It will be understood that, the first electrode plate of the first capacitor C1 may be located in any one of the above layers, and the second electrode plate of the first capacitor C1 may be located in another layer other than the layer in which the first electrode plate is located. The structure of the first capacitor C1 will be described in detail below.

Figure 18A:
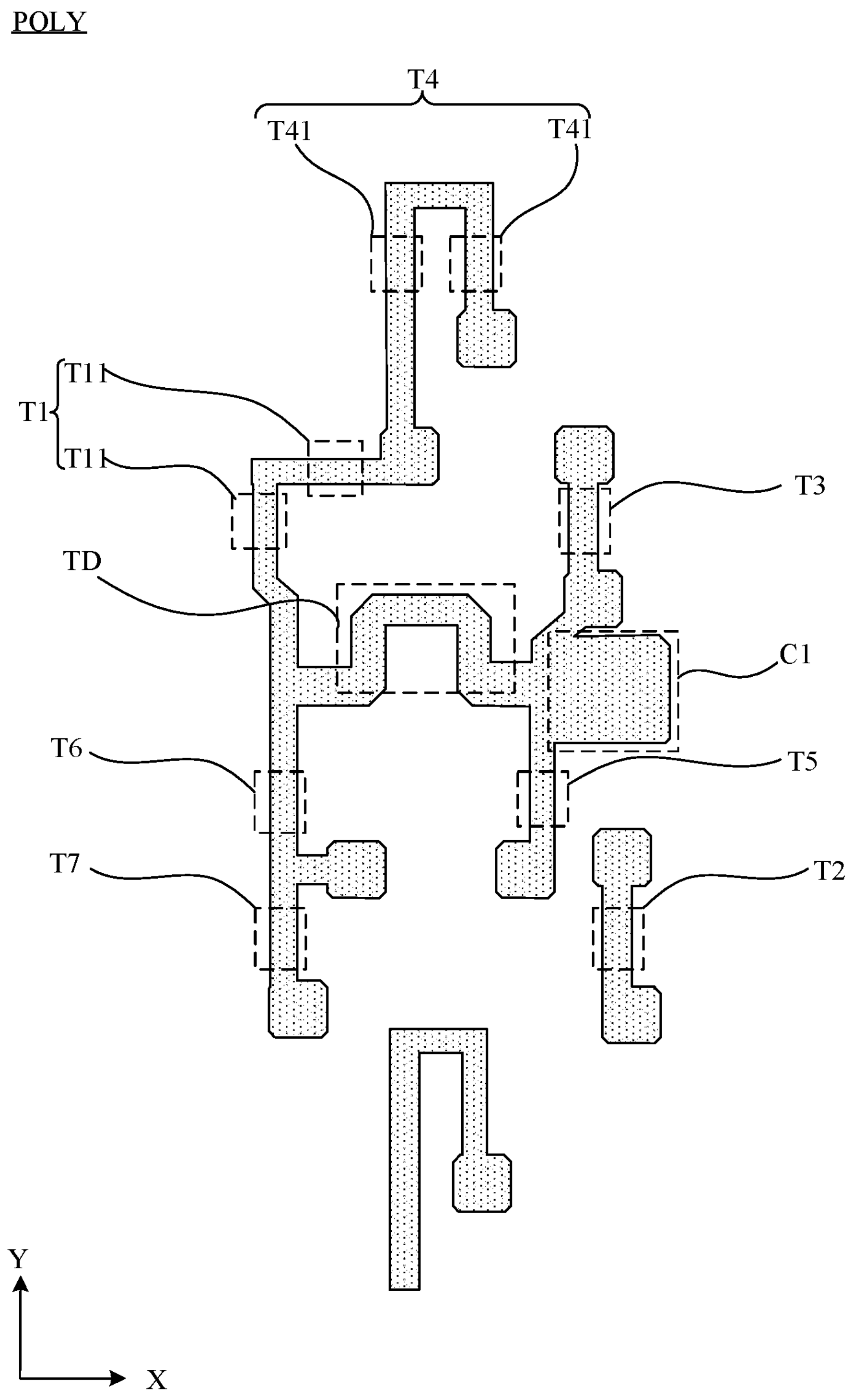
FIG. 18A is a structural diagram of an active layer in FIG. 18.
Figure 18B:
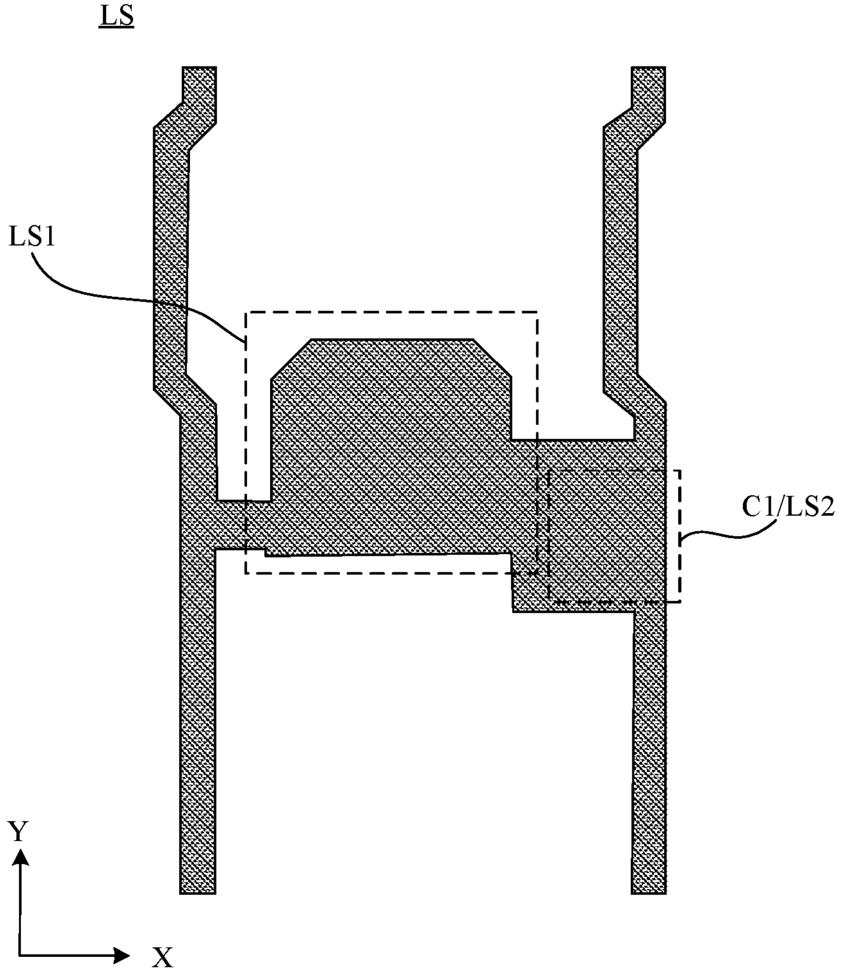
FIG. 18B is a structural diagram of a shielding layer in FIG. 18.

FIG. 18A is a structural diagram of the active layer in FIG. 18, and FIG. 18B is a structural diagram of the shielding layer in FIG. 18. For example, referring to FIGS. 18, 18A and 18B, the two electrode plates of the first capacitor C1 are located in the active layer POLY and the shielding layer LS, respectively.

The pixel driving circuit 100 includes the third transistor T3 and the fifth transistor T5.

With continued reference to FIG. 18A, the active layer POLY includes an active portion of the third transistor T3, an active portion of the fifth transistor T5, and the first electrode plate of the first capacitor C1; and the first electrode plate of the first capacitor C1 is located between the active portion of the third transistor T3 and the active portion of the fifth transistor T5.

With continued reference to FIG. 18B, the shielding layer LS includes a first portion LS1 and a second portion LS2. An orthographic projection of the first portion LS1 on the substrate 000 overlaps with an orthographic projection of the active portion of the driving transistor TD on the substrate 000. Thus, the stability of the driving transistor TD is ensured. Based on this, an orthographic projection of the second portion LS2 on the substrate 000 overlaps with the orthographic projection of the active layer POLY on the substrate 000. In this case, the second portion LS2 is also used as the second electrode plate of the first capacitor C1.

In this way, the number of film layers between the active layer POLY and the shielding layer LS is small, and there may be even a case where only one insulating layer is provided between the active layer POLY and the shielding layer LS. The two electrode plates of the first capacitor C1 are respectively disposed in the active layer POLY and the shielding layer LS, which is conducive to increasing the capacitance of the first capacitor C1. In addition, the second portion LS2 and the first portion LS1 of the shielding layer LS may be formed through one patterning process by using a same mask, which is conducive to simplifying the manufacturing process of the display panel 200.

The pixel driving circuit 100 in the display panel 200 shown in FIG. 18 improves the shielding layer LS and the active layer POLY. As for the structures of the first gate conductive layer G1, the second gate conductive layer G2, and the first source-drain conductive layer SD1, reference may be made to the film layer structures shown in FIGS. 17A to 17D.

Figure 19A:
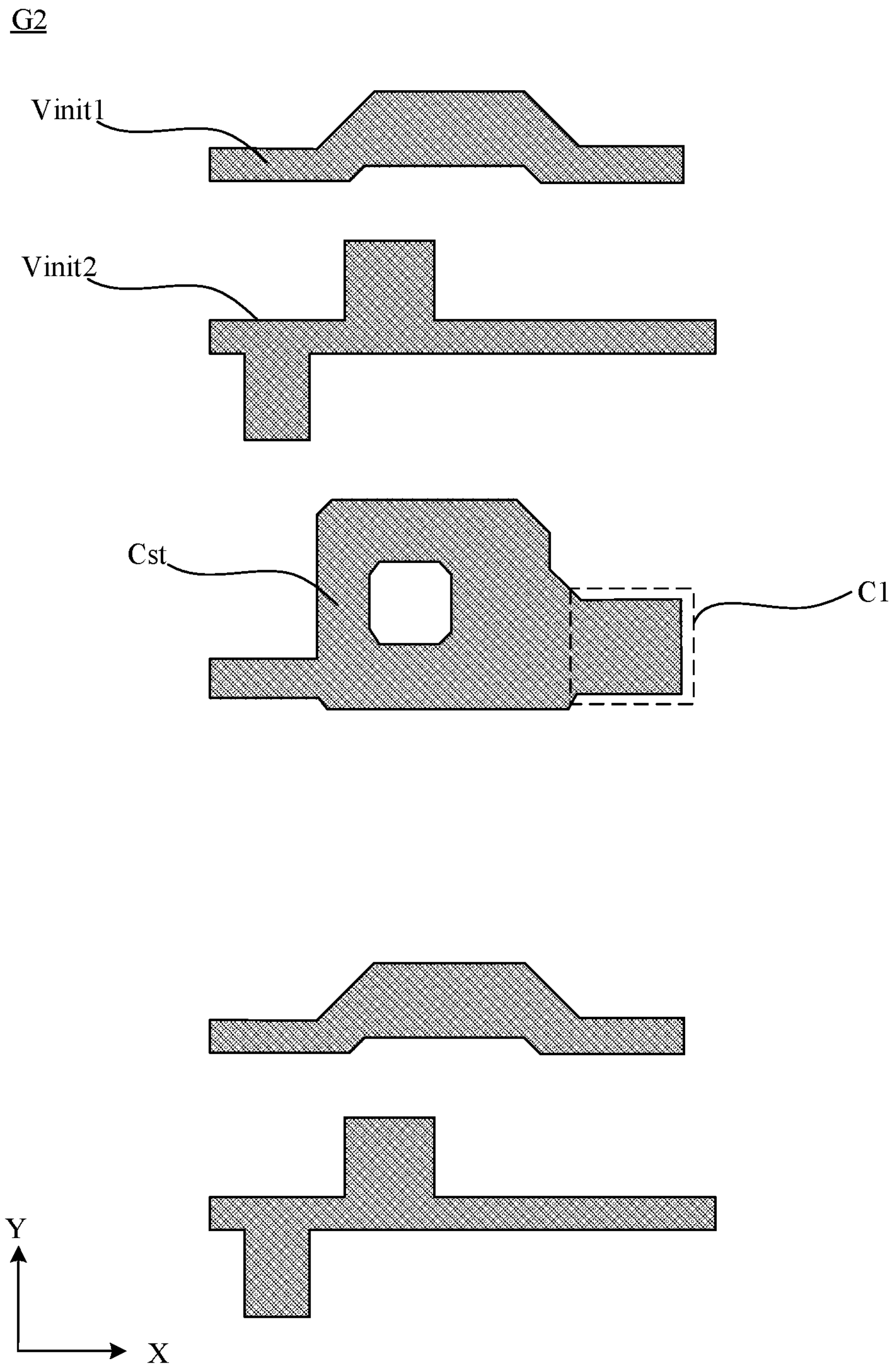
FIG. 19A is a structural diagram of a second gate conductive layer in FIG. 19.

FIG. 19A is a structural diagram of the second gate conductive layer in FIG. 19. For example, referring to FIGS. 19 and 19A, the two electrode plates of the first capacitor C1 are respectively located in the active layer POLY and the second gate conductive layer G2.

The pixel driving circuit 100 includes the second capacitor Cst, the third transistor T3 and the fifth transistor T5.

The structure of the active layer POLY in the display panel 200 shown in FIG. 19 is the same as the structure of the active layer POLY in the display panel 200 shown in FIG. 18. Therefore, the structure of the active layer POLY may be referred to FIG. 18A; the active layer POLY includes the active portion of the third transistor T3, the active portion of the fifth transistor T5, and the first electrode plate of the first capacitor C1; and the first electrode plate of the first capacitor C1 is located between the active portion of the third transistor T3 and the active portion of the fifth transistor T5.

With continued reference to FIG. 19A, the second gate conductive layer G2 includes the first electrode plate of the second capacitor Cst, and the second electrode plate of the first capacitor C1 and the first electrode plate of the second capacitor Cst are located in a same layer and electrically connected to each other.

In this way, the second electrode plate of the first capacitor C1 and the first electrode plate of the second capacitor Cst are located in a same layer and electrically connected to each other. The second electrode plate of the first capacitor C1 and the first electrode plate of the second capacitor Cst may be formed by a film layer for forming specific pattern(s) that is formed through a same film forming process, or may be layer structures formed by performing one patterning process by using a same mask. Therefore, the manufacturing process of the display panel 200 may be simplified.

For example, the second gate conductive layer G2 may further include a first initialization signal line Vinit1 and a second initialization signal line Vinit2.

Figure 17D:
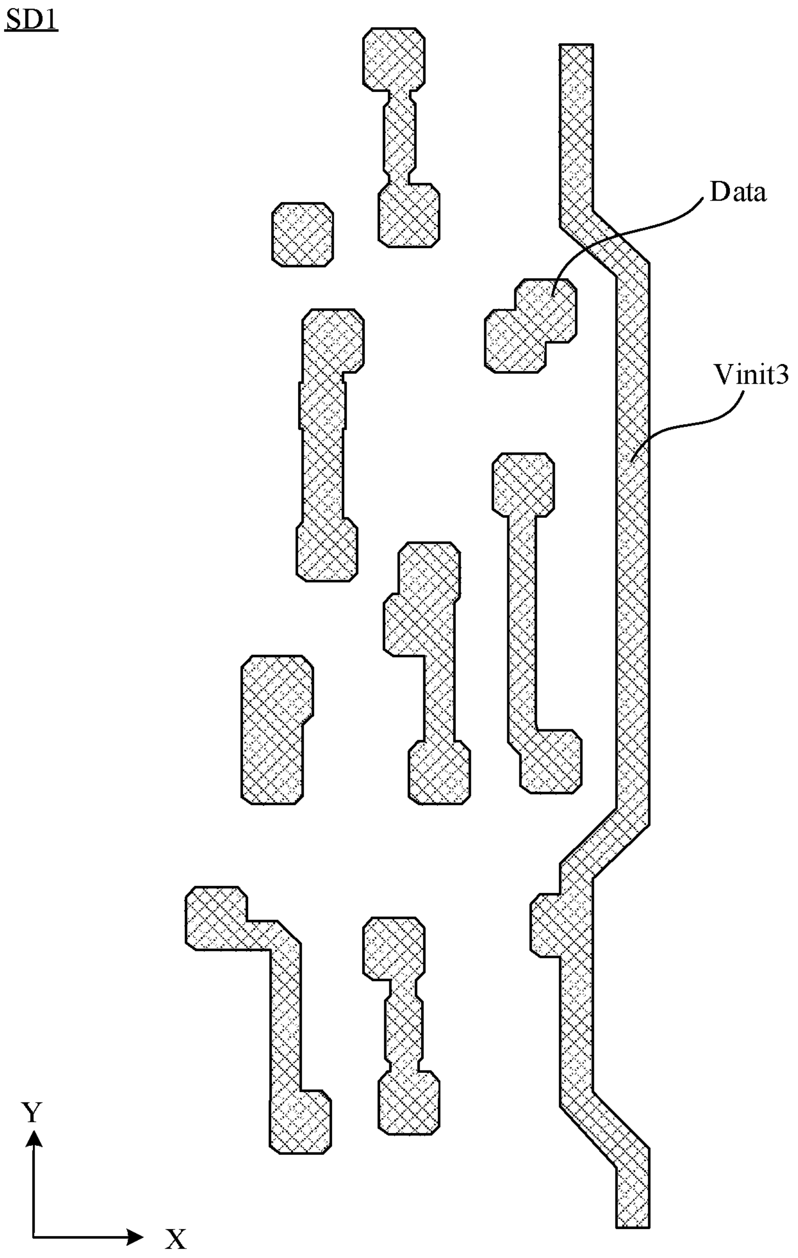

As for the structures of the first gate conductive layer G1 and the first source-drain conductive layer SD1 in the display panel 200 shown in FIG. 19, reference may be made to the film layer structures shown in FIGS. 17B and 17D.

Figure 20A:
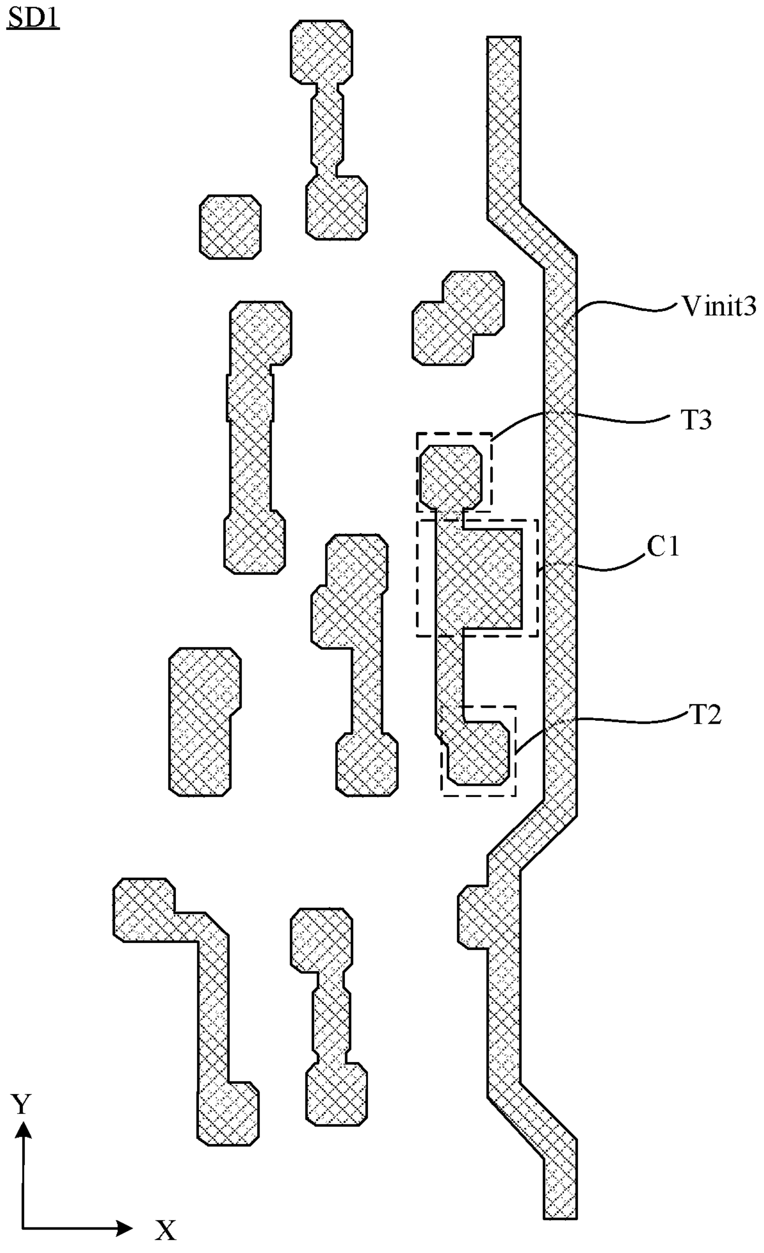
FIG. 20A is a structural diagram of a first gate-source conductive layer in FIG. 20.

FIG. 20A is a structural diagram of the first gate-source conductive layer in FIG. 20. For example, referring to FIGS. 20A and 18A, the two electrode plates of the first capacitor C1 are respectively located in the active layer POLY and the first source-drain conductive layer SD1.

The pixel driving circuit 100 includes the second transistor T2, the third transistor T3, and the fifth transistor T5.

The structure of the active layer POLY in the display panel 200 shown in FIG. 20 is the same as the structure of the active layer POLY in the display panel 200 shown in FIG. 18. Therefore, the structure of the active layer POLY may be referred to FIG. 18A; the active layer POLY includes the active portion of the third transistor T3, the active portion of the fifth transistor T5, and the first electrode plate of the first capacitor C1; and the first electrode plate of the first capacitor C1 is located between the active portion of the third transistor T3 and the active portion of the fifth transistor T5.

With continued reference to FIG. 20A, the first source-drain conductive layer SD1 includes the first electrode of the second transistor T2, the second electrode of the third transistor T3, and the second electrode plate of the first capacitor C1; and the second electrode plate of the first capacitor C1 is located between the first electrode of the second transistor T2 and the second electrode of the third transistor T3.

In this way, the second electrode plate of the first capacitor C1 is located between the first electrode of the second transistor T2 and the second electrode of the third transistor T3. The first electrode of the second transistor T2 needs to be electrically connected to the second electrode of the third transistor T3, and a conductive portion is required to be provided between the first electrode of the second transistor T2 and the second electrode of the third transistor T3. In this case, an area of the conductive portion may be increased, so that the second electrode plate of the first capacitor C1 is formed. The second electrode plate of the first capacitor C1, the first electrode of the second transistor T2, and the second electrode of the third transistor T3 may be formed by a film layer for forming specific pattern(s) that is formed through a same film forming process, or may be layer structures formed by performing one patterning process by using a same mask. Therefore, the manufacturing process of the display panel 200 may be simplified.

Figure 21:
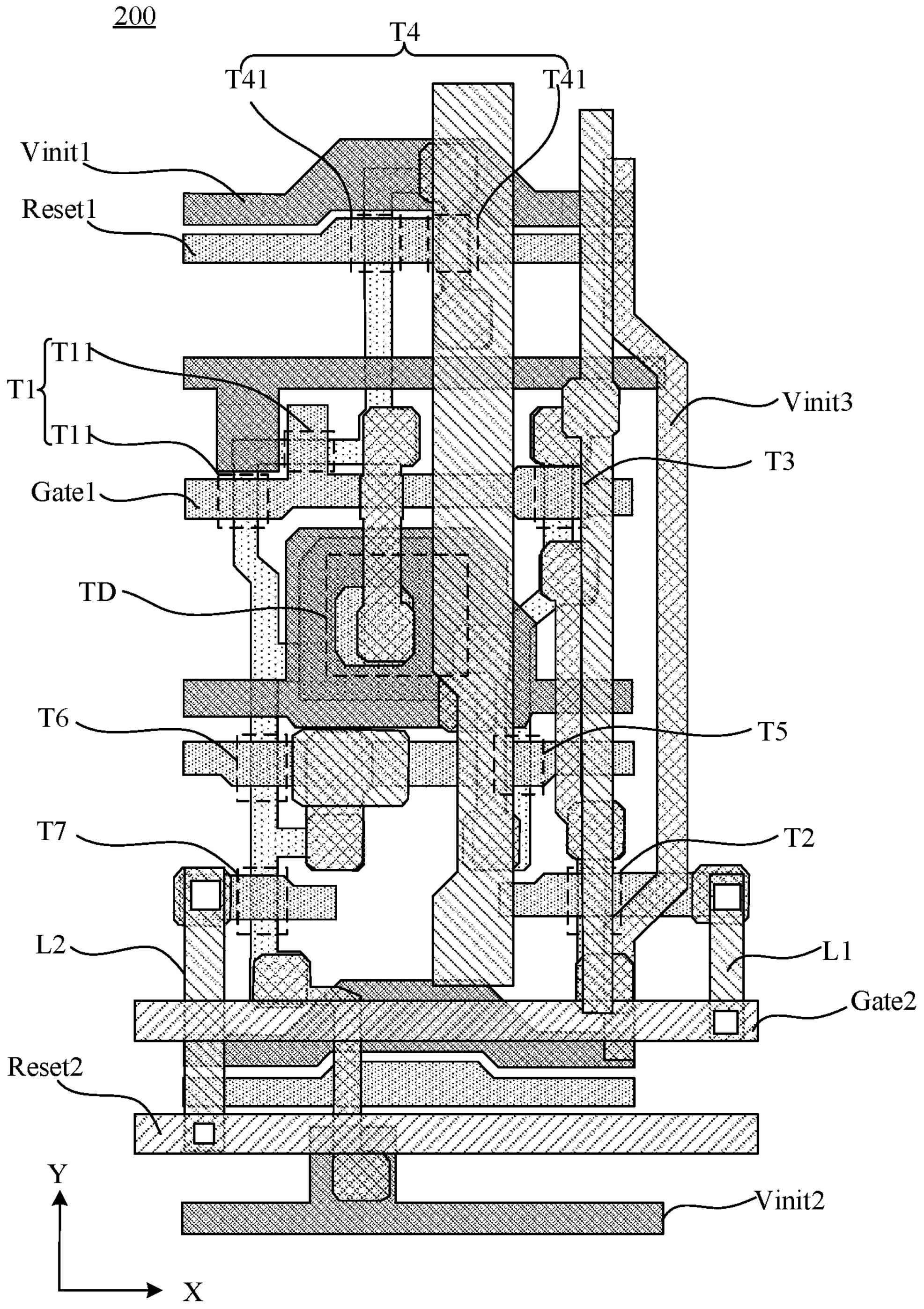
FIG. 21 is a structural diagram of film layers of a pixel driving circuit located in a sub-pixel in a display panel, in accordance with yet some other embodiments of the present disclosure.
Figure 21A:
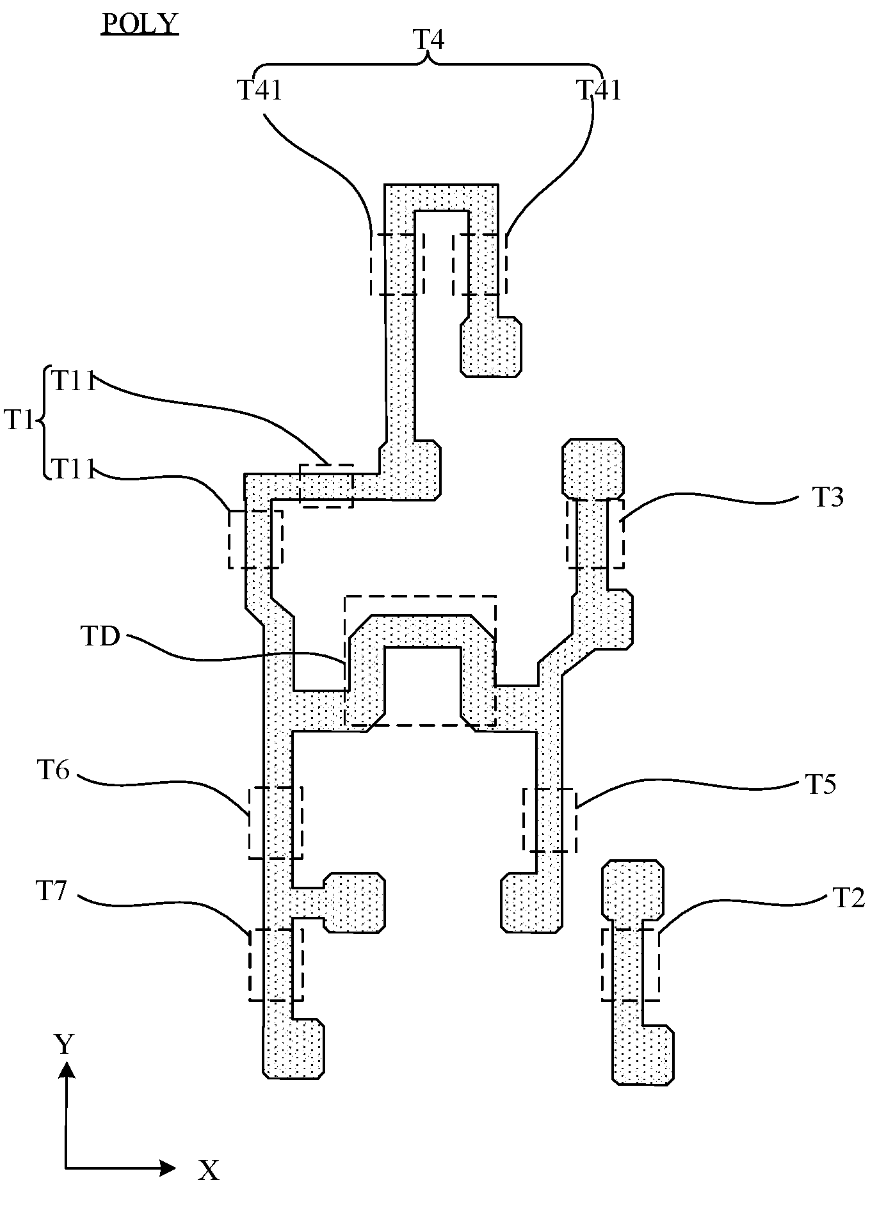
FIGS. 21A to 21F are structural diagrams of some film layers in FIG. 21.
Figure 21B:
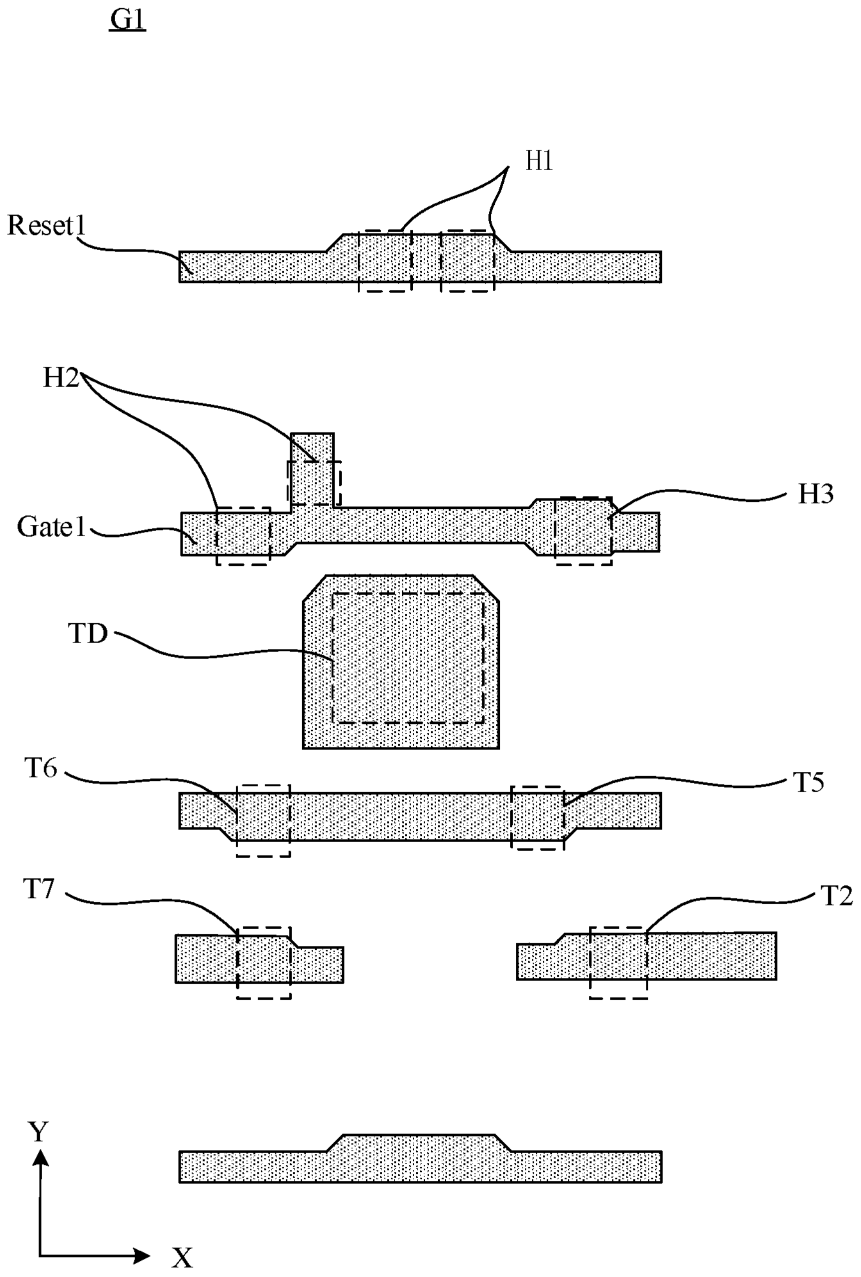
Figure 21C:
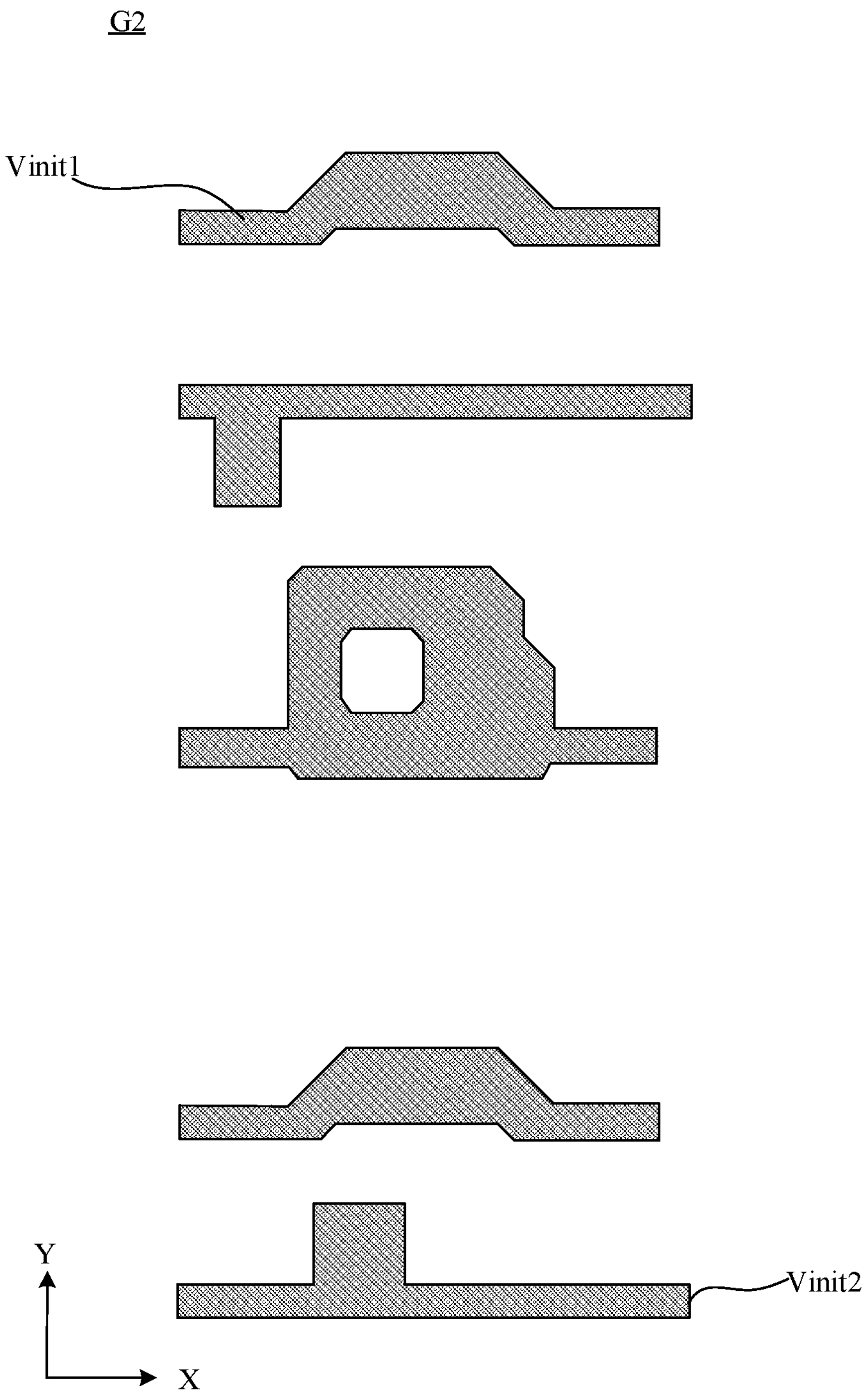
Figure 21D:
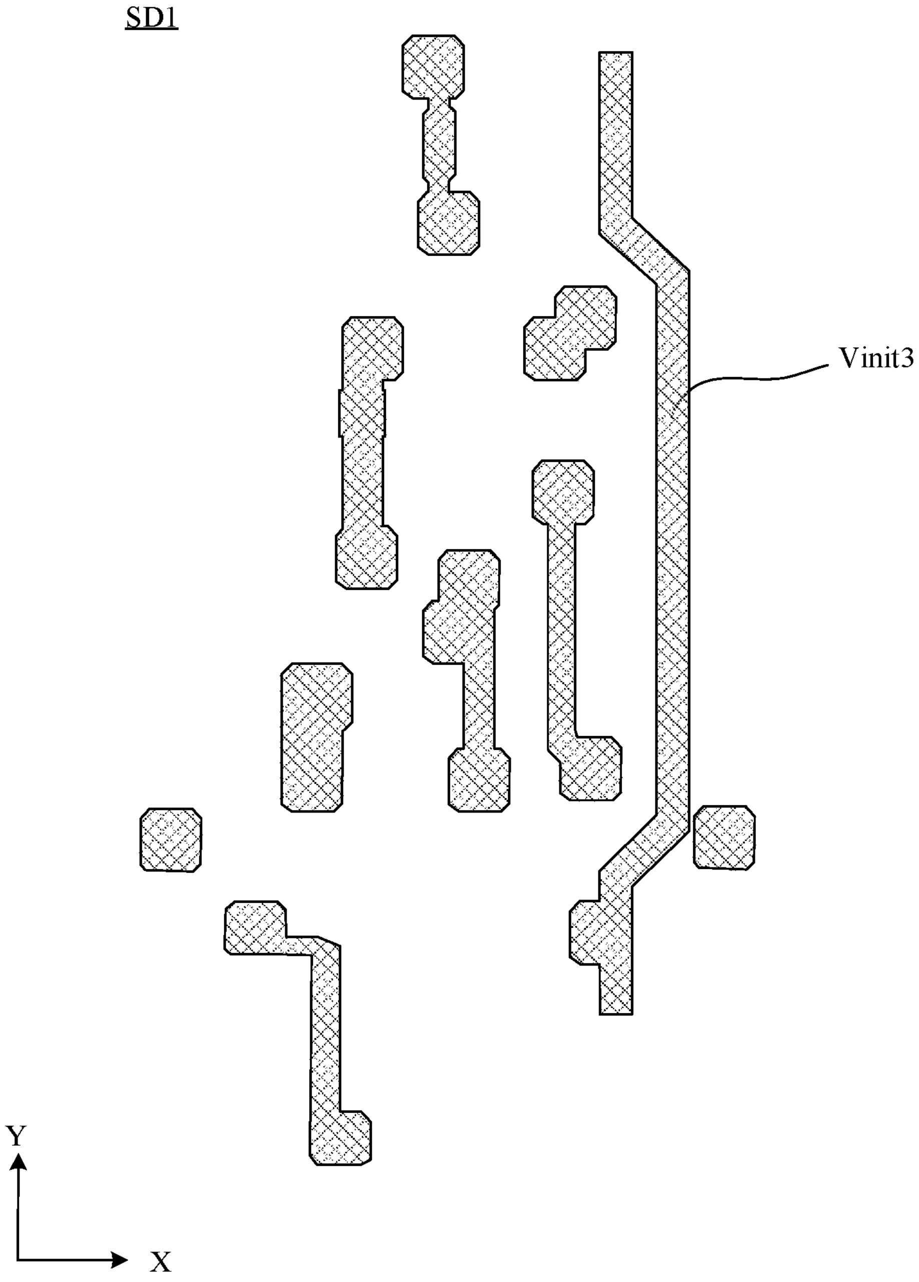

FIG. 21 is a structural diagram of film layers of a pixel driving circuit located in a sub-pixel in a display panel, in accordance with yet some other embodiments of the present disclosure. FIGS. 21A to 21F are structural diagrams of some film layers in FIG. 21. It will be understood that, an equivalent circuit corresponding to the pixel driving circuit in FIG. 21 is as shown in FIG. 9.

In some embodiments, referring to FIGS. 9 and 21, the pixel driving circuit 100 includes the second transistor T2 and the seventh transistor T7.

The display panel 200 includes a substrate 000, an active layer POLY, a first gate conductive layer Gate1, a second gate conductive layer Gate2, a first source-drain conductive layer SD1, a second source-drain conductive layer SD2, and a third source-drain conductive layer SD3.

The pixel driving circuit 100 includes the second transistor T2 and the seventh transistor T7.

Figure 21E:
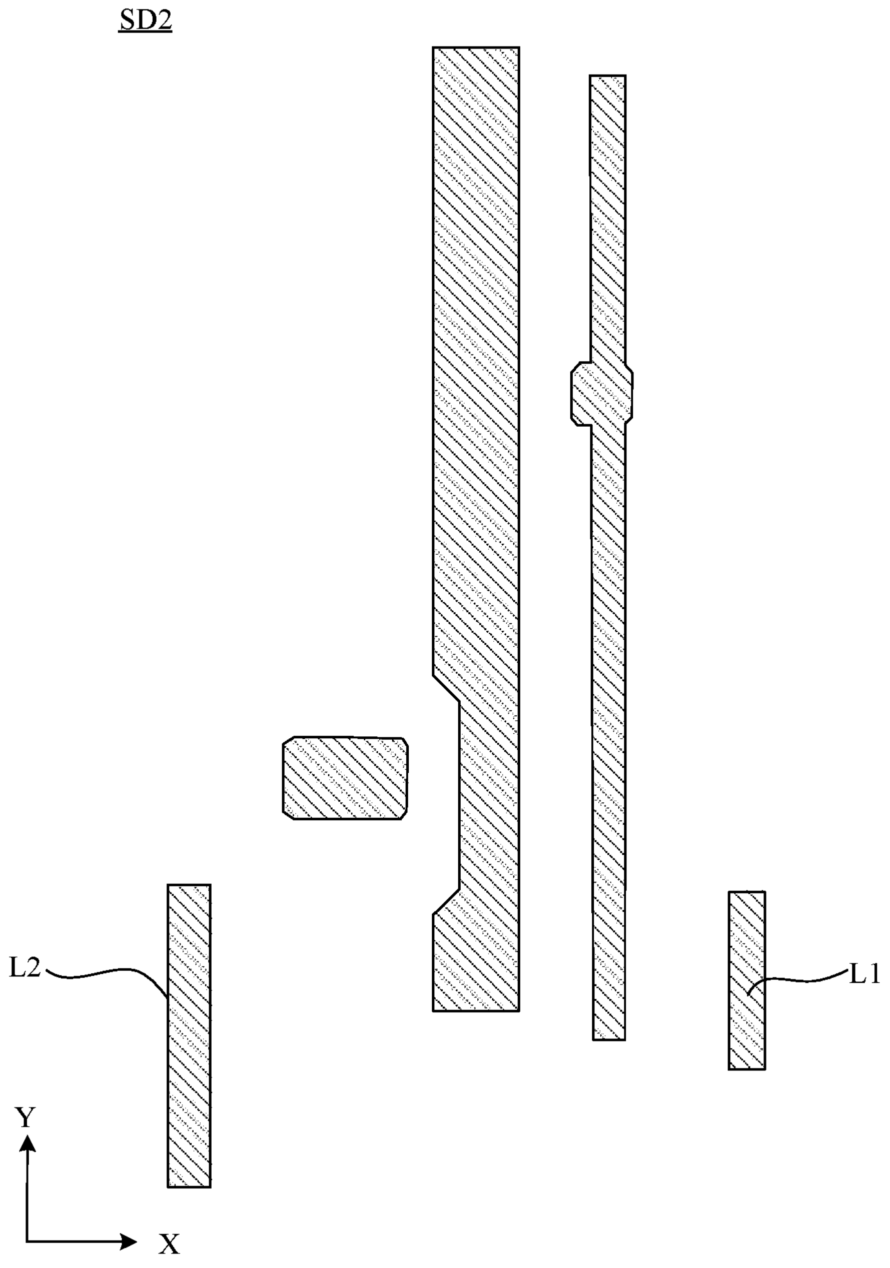
Figure 21F:
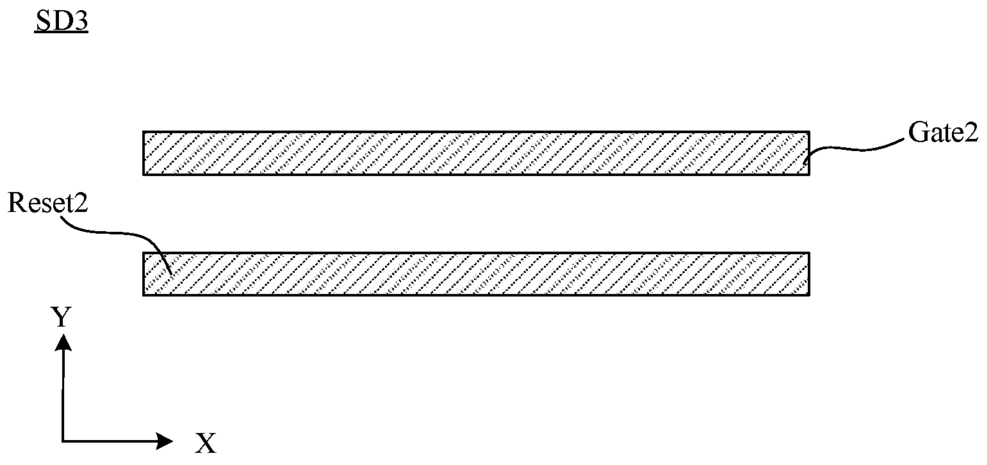

With continued reference to FIGS. 21 and 21F, the third source-drain conductive layer SD3 includes a second scan signal line Gate2 and a second reset signal line Reset2. The second scan signal line Gate2 and the second reset signal line Reset2 extend in the first direction X, and are arranged in the second direction Y. The second scan signal line Gate2 is located on a side of the second reset signal line Reset2 proximate to the second transistor T2 and the seventh transistor T7.

With continued reference to FIGS. 21 and 21E, the second source-drain conductive layer SD2 further includes a first connection portion L1 and a second connection portion L2. An end of the first connection portion L1 is connected to the gate of the second transistor T2 through a via hole, and another end of the first connection portion L1 is connected to the second scan signal line Gate2 through a via hole, so that the gate of the second transistor T2 is coupled to the second scan signal line Gate2 through the first connection portion L1. The first connection portion L1 is used to transmit the scan signal received at the second scan signal line Gate2 to the gate of the second transistor T2, so that the second transistor T2 is controlled to be turned on or off. An end of the second connection portion L2 is connected to the gate of the seventh transistor T7 through a via hole, and another end of the second connection portion L2 is connected to the second reset signal line Reset2 through a via hole, so that the seventh transistor T7 is coupled to the second reset signal line Reset2. The second connection portion L2 is used to transmit the reset signal received at the second reset signal line Reset2 to the gate of the seventh transistor T7, so that the seventh transistor T7 is controlled to be turned on or off.

For example, the pixel driving circuit 100 includes the first transistors T11, the third transistor T3, and the fourth transistors T41. The first gate conductive layer G1 includes a first reset signal line Reset1 and a first scan signal line Gate1. The first reset signal line Reset1 extends in the first direction X. The first reset signal line Reset1 includes first sub-portions H1, and the first sub-portion H1 is also used as the gate of the fourth transistor T41. The first scan signal line Gate1 includes second sub-portions H2 and a third sub-portion H3, the second sub-portion H2 is also used as the gate of the first transistor T11, and the third sub-portion H3 is also used as the gate of the third transistor T3.

In this way, the manufacturing process of the pixel driving circuit 100 may be simplified, thereby simplifying the manufacturing process of the display panel 200.

Figure 22:
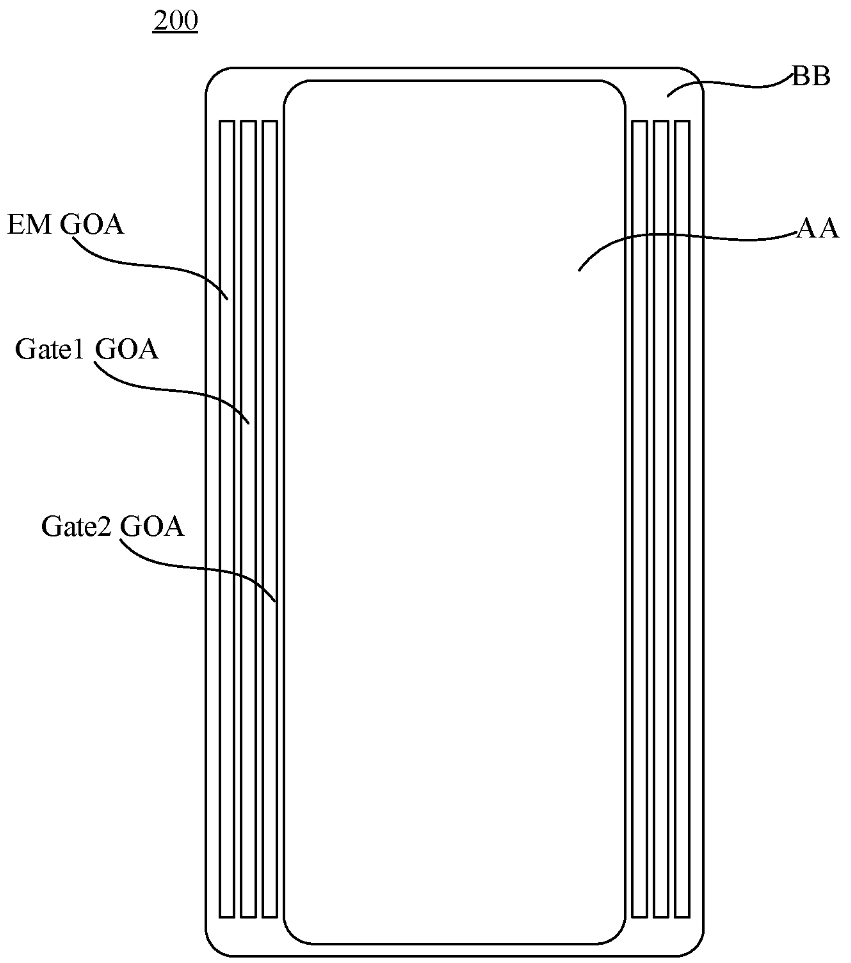
FIG. 22 is a structural diagram of another display panel, in accordance with some embodiments of the present disclosure.

FIG. 22 is a structural diagram of another display panel, in accordance with some embodiments of the present disclosure. In some embodiments, referring to FIG. 22, the display panel 200 has a display area AA and a peripheral area BB, and at least part of the peripheral area BB surrounds the display area AA.

The pixel driving circuits 100 and the light-emitting devices O as described in any one of the above embodiments may be disposed in the display area AA.

Gate driving circuits for driving the pixel driving circuits 100 may be disposed in the peripheral area BB. For example, the gate driving circuits GOA may include a first gate driving circuit Gate1 GOA, a second gate driving circuit Gate2 GOA, and a third gate driving circuit EM1 GOA.

The first gate driving circuit Gate1 GOA is used for providing a scan signal for the first gate signal terminal Gate1, and the first gate signal terminal Gate1 transmits the scan signal to the gates of the first transistors T11 and the gate of the third transistor T3, so as to control on/off states of the first transistors T11 and the third transistor T3.

The second gate driving circuit Gate2 GOA is used for providing a scan signal for the second gate signal terminal Gate2, the second gate signal terminal Gate2 transmits the scan signal to the gate of the second transistor T2, so as to control on/off states of the second transistor T2. Alternatively, the second gate signal terminal Gate2 transmits the scan signal to the gate of the second transistor T2 and the gate of the seventh transistor T7, so as to control on/off states of the second transistor T2 and the seventh transistor T7.

The third gate driving circuit EM GOA is used for providing an enable signal for the enable signal terminal EM1, the enable signal terminal EM1 transmits the enable signal to the gate of the fifth transistor T5 and the gate of the sixth transistor T6, so as to control on/off states of the fifth transistor T5 and the sixth transistor T6.

Figure 23:
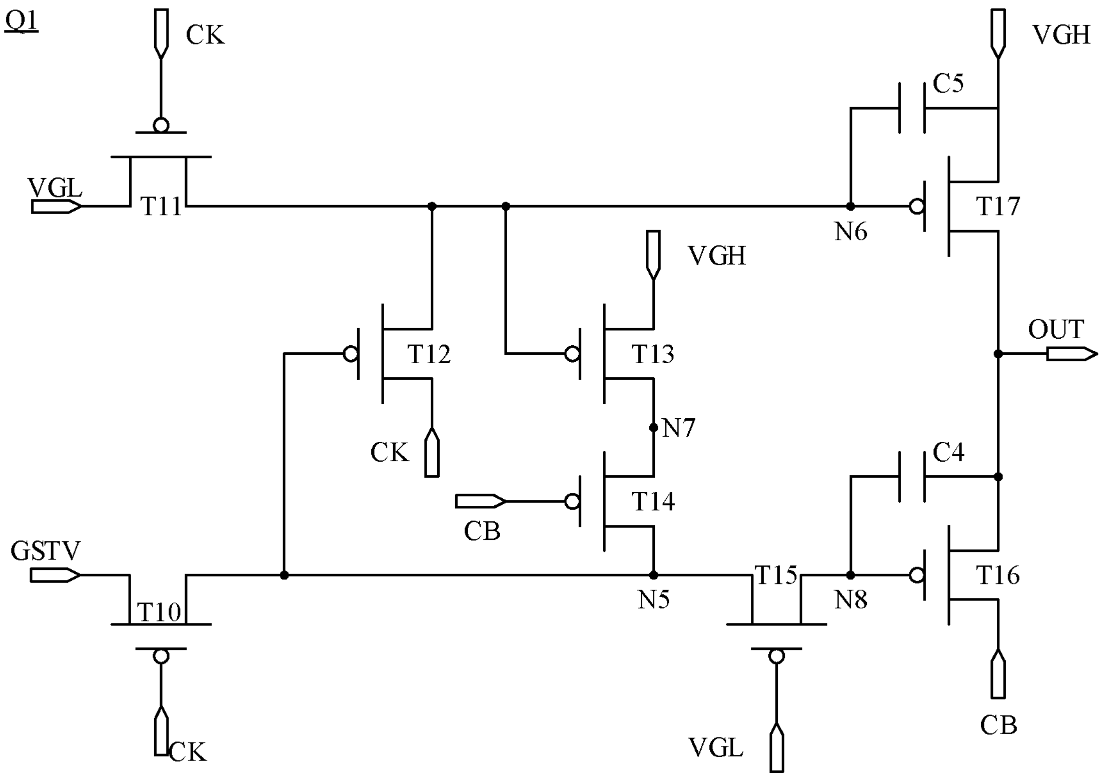
FIG. 23 is a diagram showing a circuit structure of a shift register, in accordance with some embodiments of the present disclosure.
Figure 24:
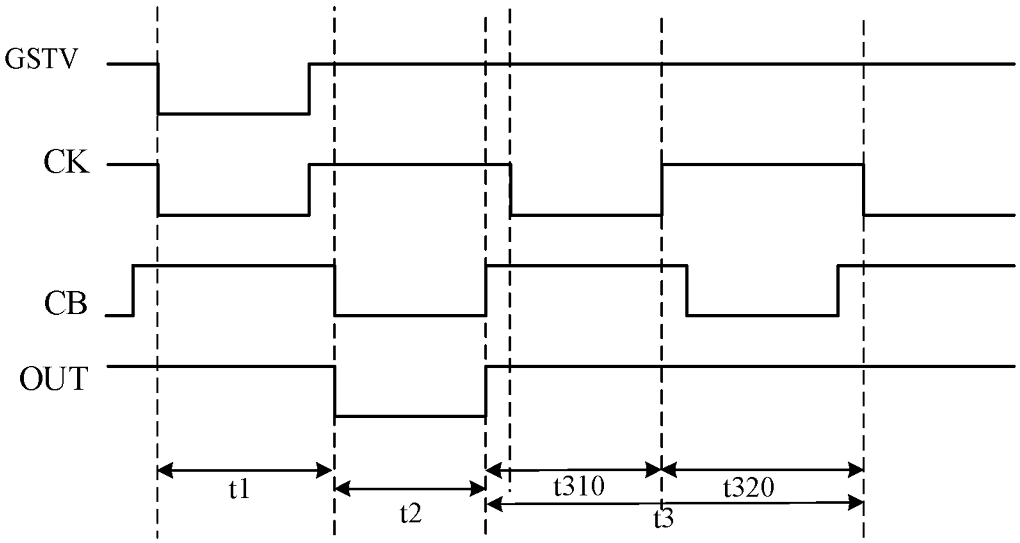
FIG. 24 is a timing diagram of the shift register in FIG. 23.

FIG. 23 is a diagram showing a circuit structure of a shift register, in accordance with some embodiments of the present disclosure. FIG. 24 is a timing diagram of the shift register in FIG. 23. Some embodiments of the present disclosure provide a gate driving circuit, referring to FIGS. 23 and 24, the gate driving circuit includes a plurality of shift registers Q1 that are connected in cascade.

The shift register Q1 includes a transistor T10, a transistor T11, a transistor T12, a transistor T13, a transistor T14, a transistor T15, a transistor T16, a transistor T17, a capacitor C4, and a capacitor C5.

In a charging phase t1, a clock signal received at a clock signal terminal CK is at a low level, so that the transistor T10 is turned on. The transistor T10 transmits a previous-stage initial scan signal GSTV to a fifth node N5, and the previous-stage initial scan signal GSTV is at a low level, so that the fifth node N5 is at a low level. The transistor T11 is turned on under control of the clock signal received at the clock signal terminal CK, and the transistor T11 transmits a voltage signal provided by a voltage signal terminal VGL to a sixth node N6. The transistor T12 is turned on under control of the fifth node N5, and the transistor T12 transmits the clock signal received at the clock signal terminal CK to the sixth node N6. The voltage signal provided by the voltage signal terminal VGL is at a low level, the clock signal terminal is at a low level in the charging phase t1, and thus the sixth node N6 is at a low level.

The transistor T13 is turned on under control of the sixth node N6, the transistor T13 transmits a voltage signal provided by a voltage signal terminal VGH to the seventh node N7, the voltage signal provided by the voltage signal terminal VGH is at a high level, so that the seventh node N7 is at a high level. A clock signal provided by a clock signal terminal CB is at a high level, and the transistor T14 is turned off under control of the clock signal provided by the clock signal terminal CB, so that the high level of the seventh node N7 cannot be written into the fifth node N5.

Since the voltage signal provided by the voltage signal terminal VGL is at a low level, the transistor T15 is controlled to be turned on. A signal of the fifth node N5 may be written into an eighth node N8, so that the eighth node N8 is at a low level.

Since the sixth node N6 is at a low level, the transistor T17 is controlled turned on. The transistor T17 transmits the voltage signal provided by the voltage signal terminal VGH to an initial scan signal output terminal OUT. The transistor T16 is controlled to be turned on due to the low level of the eighth node N8, and the transistor T16 transmits the clock signal provided by the clock signal terminal CB to the initial scan signal output terminal OUT.

In an output phase t2, the clock signal received at the clock signal terminal CK is at a high level, so that the transistor T10 is controlled to be turned off. Thus, the previous-stage initial scan signal GSTV cannot be transmitted to the fifth node N5, and the fifth node N5 is kept at a low level.

The clock signal received at the clock signal terminal CK is at a high level, so that the transistor T11 is controlled to be turned off, and the voltage signal received at the voltage signal terminal VGL cannot be transmitted to the sixth node N6. Since fifth node N5 is kept at a low level, the transistor T12 is turned on. The transistor T12 transmits the clock signal received at the clock signal terminal CK to the sixth node N6. Since the clock signal received at the clock signal terminal CK is at a high level in the output phase, the sixth node N6 is at a high level. Thus, the transistor T17 is controlled to be turned off, and the voltage signal received at the voltage signal terminal VGH cannot be transmitted to the initial scan signal output terminal OUT.

Since the sixth node N6 is at a high level, the transistor T13 is turned off, and the voltage signal received at the voltage signal terminal VGH cannot be transmitted to a seventh node N7. The clock signal received at the clock signal terminal CB is at a low level, so that the control transistor T14 is controlled to be turned on, and the transistor T14 writes the low level of the fifth node N5 into the seventh node N7.

Since the fifth node N5 is at a low level and the transistor T15 is turned on, the low level of the fifth node N5 may be written into the eighth node N8. The eighth node N8 is at a low level, so that the transistor T16 is controlled to be turned on, and the transistor T16 transmits the clock signal received at the clock signal terminal CB to the initial scan signal output terminal OUT. The clock signal received at the clock signal terminal CB is at a low level in the output phase t2, so that the initial scan signal OUT is at a low level in the output phase t2. Since the initial scan signal output terminal OUT changes from a high level to a low level, the level of the eighth node N8 is further decreased under control of the capacitor C4. Thus, the transistor T16 is turned on.

In a first pull-up stage t310, the clock signal received at the clock signal terminal CK is at a low level, so that the transistor T10 is controlled to be turned on. The transistor T10 transmits the previous-stage initial scan signal GSTV to the fifth node N5, and the previous-stage initial scan signal GSTV is at a high level, so that the fifth node N5 is at a high level. The transistor T15 is turned on, and writes the high level of the fifth node N5 into the eighth node N8. The eighth node N8 is at a high level, so that the transistor T16 is controlled to be turned off.

The fifth node N5 is at a high level, so that the transistor T12 is controlled to be turned off. The clock signal received at the clock signal terminal CB is at a high level, so that the transistor T14 is controlled to be turned off. The sixth node N6 is at a low level, so that the transistor T13 is controlled to be turned on. The transistor T13 transmits the voltage signal received at the voltage signal terminal VGH to the seventh node N7, and the seventh node N7 is at a high level.

The clock signal received at the clock signal terminal CK is at a low level, so that the transistor T11 is controlled to be turned on. The transistor T11 transmits the voltage signal received at the voltage signal terminal VGL to the sixth node N6. The voltage signal received at the voltage signal terminal VGL is at a low level, so that the sixth node N6 is at a low level. Therefore, the control transistor T17 is turned on, the transistor T17 transmits the voltage signal received at the voltage signal terminal VGL to the initial scan signal output terminal OUT, and the voltage signal received at the voltage signal terminal VGL is at a high level.

In a second pull-up phase t320, the clock signal received at the clock signal terminal CK is at a high level, so that the transistor T10 is turned off, and the previous-stage initial scan signal GSTV cannot be transmitted to the fifth node N5. The sixth node N6 is at a low level, so that the transistor T13 is controlled to be turned on. Since the clock signal received at the clock signal terminal CB is at a low level, the transistor T14 is turned on. Therefore, the voltage signal received at the voltage signal terminal VGH is written into the fifth node N5 through the transistor T13 and the transistor T14 in sequence. Since the voltage signal received at the voltage signal terminal VGH is at a high level, the fifth node N5 is at a high level. The transistor T15 is turned on, the level of the fifth node N5 is written into the eighth node N8, so that the eighth node N8 is at a high level, and the transistor T16 is controlled to be turned off. Thus, the clock signal received at the clock signal terminal CB cannot be written into the initial scan signal output terminal OUT.

The clock signal received at the clock signal terminal CK is at a high level, so that the transistor T11 is turned off, and the voltage signal received at the voltage signal terminal VGL cannot be transmitted to the sixth node N6. The fifth node N5 is at a high level, so that the transistor T12 is controlled to be turned off. The sixth node N6 is kept at a low level, so that the transistor T17 is turned on, and the transistor T17 transmits the voltage signal received at the voltage signal terminal VGH to the initial scan signal output terminal OUT. Since the voltage signal received at the voltage signal terminal VGH is at a high level, the initial scan signal OUT is at a high level in the second pull-up phase t320.

For example, the first gate driving circuit Gate1 GOA in the display panel 200 may adopt the structure of the gate driving circuit as described above. For example, the initial scan signal output terminal OUT may be connected to the first gate signal terminal Gate1, which provides the scan signal for the first gate signal terminal Gate1.

For example, the second gate driving circuit Gate2 GOA in the display panel 200 may adopt the structure of the gate driving circuit as described above. For example, the initial scan signal output terminal OUT may be connected to the second gate signal terminal Gate2, which provides the scan signal for the second gate signal terminal Gate2.

It will be noted that, FIG. 23 shows an example in which the circuit of the shift register includes only eight transistors and two capacitors. In some other embodiments, other gate driver on array (GOA) circuits that can implement the same or similar functions may be applied to the gate driving circuit (e.g., the first gate driving circuit Gate1 GOA or the second gate driving circuit Gate2 GOA), which is not limited in the present disclosure.

Figure 25:
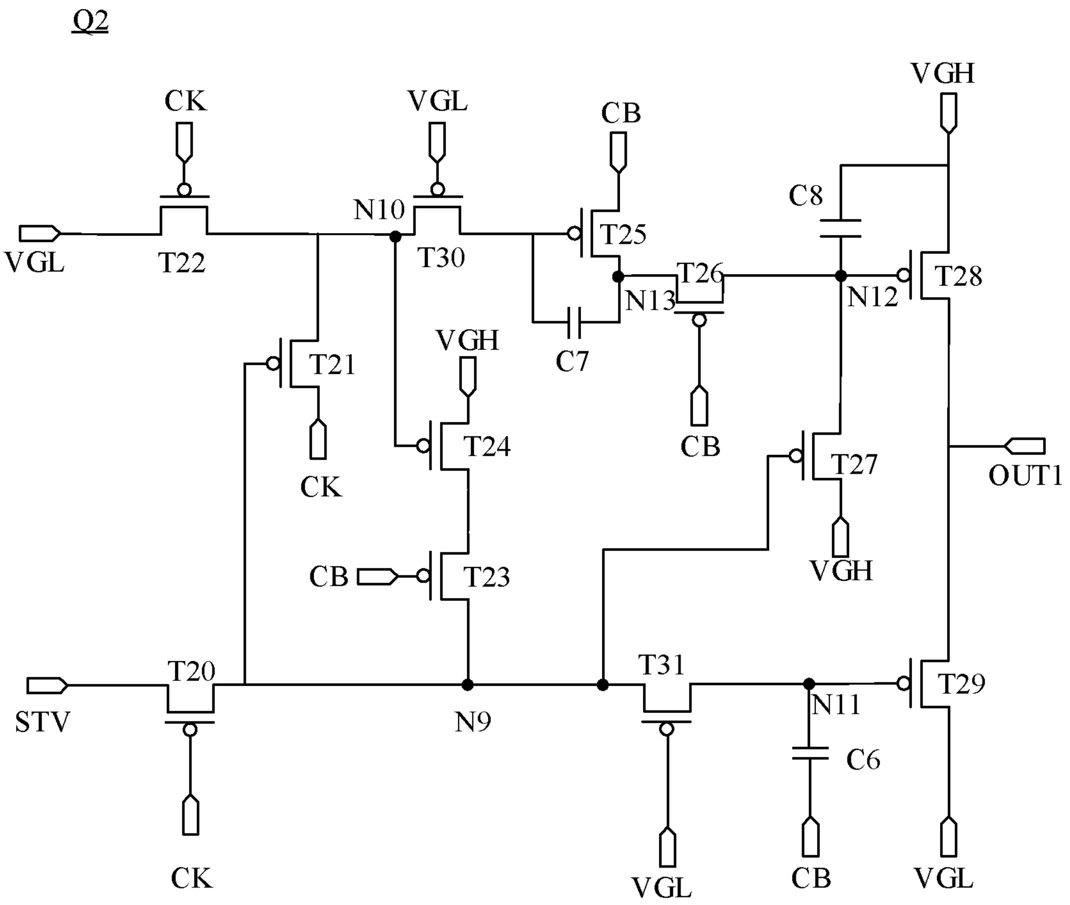
FIG. 25 is a diagram showing a circuit structure of another shift register, in accordance with some embodiments of the present disclosure.
Figure 26:
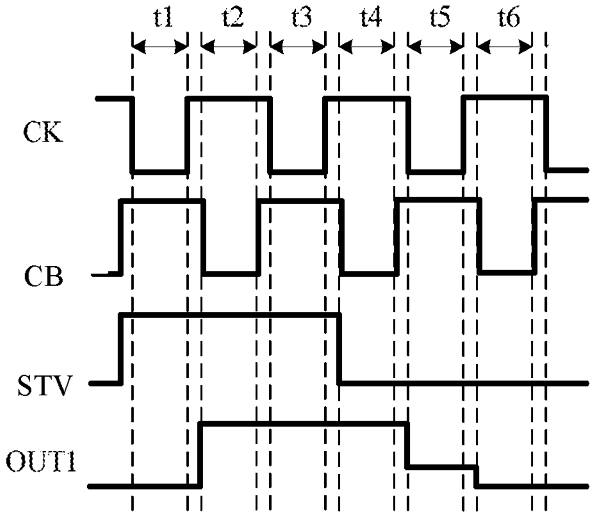
FIG. 26 is a timing diagram of the shift register in FIG. 25.

FIG. 25 is a diagram showing a circuit structure of another shift register, in accordance with some embodiments of the present disclosure. FIG. 26 is a timing diagram of the shift register in FIG. 25. Some embodiments of the present disclosure provide a gate driving circuit, referring to FIGS. 25 and 26, the gate driving circuit includes a plurality of shift registers Q2 that are connected in cascade.

For example, the third gate driving circuit EM GOA includes a plurality of shift registers Q2 that are connected in cascade.

The shift register Q2 includes a transistor T20, a transistor T21, a transistor T22, a transistor T23, a transistor T24, a transistor T25, a transistor T26, a transistor T27, a transistor T28, a transistor T29, a transistor T30, a transistor T31, a capacitor C6, a capacitor C7, and a capacitor C8.

In a first phase t1, the transistor T20 is turned on under control of a low-level signal received at a clock signal terminal CK. A high-level signal provided by a signal input terminal STV is written into a ninth node N9 through the transistor T20, the ninth node N9 is in a high-level state, so that the transistor T21 and the transistor T27 are turned off. At the same time, the transistor T31 is turned on under control of a low-level signal provided by a voltage signal terminal VGL, the high-level signal of the ninth node N9 is written into an eleventh node N11, the eleventh node N11 is in a high-level state, and the transistor T29 is turned off. The transistor T22 is turned on under control of the low-level signal received at the clock signal terminal CK, a low-level signal provided by a voltage signal terminal VGL is written into a tenth node N10, the tenth node N10 is in a low-level state, and the transistor T24 is turned on. At the same time, the transistor T30 is turned on under control of the low-level signal provided by the voltage signal terminal VGL, the low-level signal of the tenth node N10 is written into the gate of the transistor T25, and the transistor T25 is turned on. The transistor T26 is turned off under control of a high-level signal received at a clock signal terminal CB, a twelfth node N12 is in a floating state, and the twelfth node N12 is kept at a high-level state of a previous phase (a last phase of a previous cycle), so that the transistor T28 is turned off. Therefore, a signal output terminal OUT1 is in a floating state, and the signal output terminal OUT1 is kept at a low-level state of the previous phase (the last phase of the previous cycle). That is, the signal output terminal OUT1 outputs a low-level signal.

In a second phase t2, the transistor T23 is turned on under control of a low-level signal received at the clock signal terminal CB, and the transistor T24 is turned on under control of the low-level signal of the tenth node N10, so that a high-level signal provided by a voltage signal terminal VGH is written into the ninth node N9 and the eleventh node N11, and the capacitor C6 is charged. Since the ninth node N9 is in a high-level state, the transistor T21 will be immediately switched to a turned-off state. The eleventh node N11 is in a high-level state, so that the transistor T29 is turned off. At the same time, the transistor T26 is turned on under the control of the low-level signal received at the clock signal terminal CB, and the low-level signal received at the clock signal terminal CB is written into a thirteenth node N13 through the transistor T25. A voltage of the tenth node N10 is pulled down to a lower level due to the bootstrap effect of the capacitor C7. Since the transistor T25 and the transistor T26 are turned on, the low-level signal received at the clock signal terminal CB is written into the twelfth node N12 through the transistor T25 and the transistor T26, and the transistor T28 is turned on. The high-level signal provided by the voltage signal terminal VGH is written into the signal output terminal OUT1 through the transistor T28, that is, the signal output terminal OUT1 outputs a high-level signal.

In a third phase t3, since the ninth node N9 is in a high-level state, the transistor T27 is turned off. Since the eleventh node N11 is in a high-level state, the transistor T29 is turned off. Since the tenth node N10 is in a low-level state, the transistor T25 is turned on. A high-level signal received at the clock signal terminal CB is written into the twelfth node N12 through the transistor T25 and the transistor T26, and the transistor T28 is turned off. Since the transistor T28 and the transistor T29 are both turned-off, the signal output terminal OUT1 is in a floating state. The signal output terminal OUT1 remains in a high-level state of the previous phase (the last phase of the previous cycle), that is, the signal output terminal OUT1 outputs a high-level signal.

In a fourth stage t4, since the ninth node and the eleventh node N11 are in a high-level state, the transistor T27 and the transistor T29 are turned off. At the same time, the transistor T23 and the transistor T26 are turned on under control of a low-level signal received at the clock signal terminal CB. Since the tenth node N10 is in a low-level state, the transistor T25 is turned on. The low-level signal received at the clock signal terminal CB is written into the twelfth node N12 through the transistor T25 and the transistor T26, so that the transistor T28 is turned on. Therefore, the high-level signal provided by the voltage signal line VGH is written into the signal output terminal OUT1 through the transistor T28, that is, the signal output terminal OUT1 outputs a high-level signal.

In a fifth phase t5, the transistor T20 is turned on under control of a low-level signal received at the clock signal terminal CK. A low-level signal provided by the signal input terminal STV is written into the ninth node N9 through the transistor T20, so that the ninth node N9 is in a low-level state, and the transistor T21 is turned on. At the same time, the transistor T22 is turned on under the control of the low-level signal received at the clock signal terminal CK, the low-level signal provided by the voltage signal terminal VGL is written into the tenth node N10, the tenth node N10 is in a low-level state, so that the transistor T24 is turned on, and the transistor T25 is turned on. In this case, a high-level signal received at the clock signal terminal CB is written into the twelfth node N12 through the transistor T25 and the transistor T26, and the transistor T28 is turned off. At the same time, the eleventh node N11 is in a low-level state, and the transistor T27 and the transistor T29 are turned on. The low-level signal provided by the voltage signal terminal VGL is transmitted to the signal output terminal OUT1, that is, the signal output terminal OUT1 outputs a low-level signal.

In a sixth phase t6, under control of a low-level signal received at the clock signal terminal CB, the voltage of the eleventh node N11 is pulled down due to the bootstrap effect of the capacitor C6. Therefore, the ninth node N9 and the eleventh node N11 are each in a low-level state, and the transistor T21 is turned on. A high-level signal provided by the clock signal terminal CK is written into the tenth node N10 through the transistor T21, so that the transistor T24 is turned off, and the transistor T25 is turned off. Since the ninth node N9 is in a low-level state, the transistor T27 is turned on. The high-level signal provided by the voltage signal terminal VGH is written to the twelfth node N12, and the transistor T28 is turned off. The eleventh node N11 is in a low-level state, and the transistor T29 is turned on. Therefore, the low-level signal provided by the voltage signal terminal VGL is transmitted to the signal output terminal OUT1, that is, the signal output terminal OUT1 outputs a low-level signal.

For example, the signal output unit OUT1 of the shift register Q2 in the third gate driving circuit EM GOA may be connected to the enable signal terminal EM1, so as to provide the enable signal for the enable signal terminal EM1.

It will be noted that, FIG. 25 shows an example in which the circuit of the shift register includes only ten transistors and three capacitors. In some other embodiments, other GOA circuits that can implement the same or similar functions may be applied to the gate driving circuit, which is not limited in the present disclosure.

Figure 27:
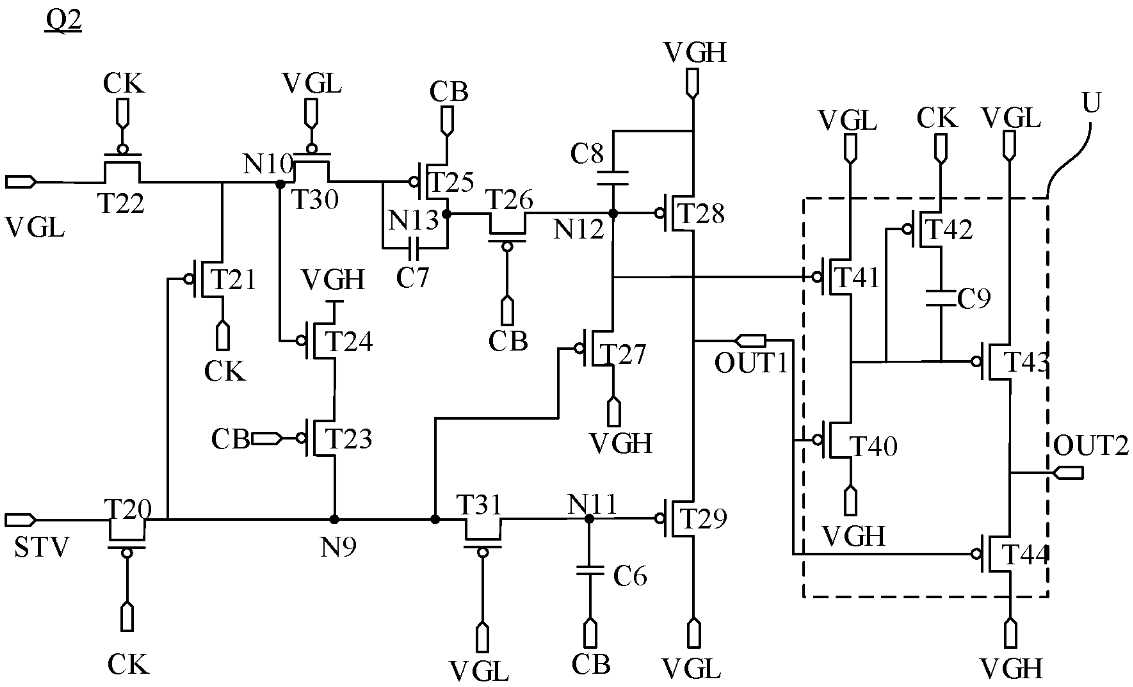
FIG. 27 is a diagram showing a circuit structure of yet another shift register, in accordance with some embodiments of the present disclosure.

FIG. 27 is a diagram showing a circuit structure of a shift register, in accordance with some embodiments of the present disclosure. Referring to FIG. 27, the output terminal OUT1 of the shift register Q2 shown in FIG. 25 may be connected in series with an output control sub-circuit U. The output control sub-circuit U inverts the signal output by the output terminal OUT1, and then transmits the inverted signal through an output terminal OUT2. The output control sub-circuit U includes a transistor T40, a transistor T41, a transistor T42, a transistor T43, a transistor T44, and a capacitor C9. The circuit of the shift register Q2 shown in FIG. 27 may be driven according to the timing shown in FIG. 26.

With continued reference to the pixel driving circuit 100 shown in FIG. 10, the second reset signal terminal Reset2 may be the signal terminal EM2. The signal terminal EM2 and the enable signal terminal EM1 are inverted. Based on this, the output terminal OUT1 of the shift register Q2 shown in FIG. 27 may be coupled to the signal terminal EM1, the output terminal OUT2 may be coupled to the signal terminal EM2. In this case, the output terminal OUT1 of the shift register Q2 may be used for providing the signal for the signal terminal EM1, and the inverted signal may be transmitted to the signal terminal EM2 through the output terminal OUT2. Therefore, there is no need to provide a gate driving circuit that is used for providing the control signal for the signal terminal EM2, which may facilitate the internal layout of the display panel 200 and the narrow bezel of the display panel 200.

Alternatively, the output terminal OUT1 may be coupled to the signal terminal EM2, and the output terminal OUT2 may be coupled to the enable signal terminal.

It will be noted that, the present disclosure is described by taking the output control sub-circuit U shown in FIG. 27 as an example, in some other embodiments, other circuits that can implement the inversion effect may be adopted, which is not limited in the present disclosure.

The foregoing descriptions are merely specific implementation manners of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A pixel driving circuit, comprising: a driving sub-circuit, a writing sub-circuit, a compensation sub-circuit, an adjustment sub-circuit, and a first storage sub-circuit, wherein the driving sub-circuit is coupled to a first node, a second node, and a third node; the driving sub-circuit is configured to transmit a voltage from the second node to the third node under control of a voltage of the first node;

the writing sub-circuit is coupled to the second node, a first scan signal terminal and a data signal terminal; the writing sub-circuit is configured to, in a writing phase, transmit a data signal received at the data signal terminal to the second node under control of a gate scan signal received from the first scan signal terminal;

the compensation sub-circuit is coupled to the first node, the third node and a compensation control terminal; the compensation sub-circuit is configured to, in the writing phase, transmit a voltage of the third node to the first node under control of a compensation signal received from the compensation control terminal;

the adjustment sub-circuit is coupled to at least one of the second node and the third node, and is further coupled to a second scan signal terminal and a first reference voltage signal terminal; and the adjustment sub-circuit is configured to, in a light-emitting adjustment phase, transmit a reference voltage signal received at the first reference voltage signal terminal to the at least one of the second node and the third node under control of a scan signal transmitted by the second scan signal terminal; and the first storage sub-circuit is coupled to a first voltage terminal and the second node, wherein the first storage sub-circuit includes a first capacitor, a first electrode plate of the first capacitor is coupled to the first voltage terminal, and a second electrode plate of the first capacitor is coupled to the second node.

2. The pixel driving circuit according to claim 1, wherein the adjustment sub-circuit is further configured to, in a reset phase, transmit the reference voltage signal received at the first reference voltage signal terminal to the second node under the control of the scan signal transmitted by the second scan signal terminal, so as to reset the second node.

3. The pixel driving circuit according to claim 1, wherein the adjustment sub-circuit includes a second transistor, wherein a gate of the second transistor is coupled to the second scan signal terminal, a first electrode of the second transistor is coupled to the second node, and a second electrode of the second transistor is coupled to the first reference voltage signal terminal; and/or the driving sub-circuit includes a driving transistor, wherein a gate of the driving transistor is coupled to the first node, a first electrode of the driving transistor is coupled to the second node, and a second electrode of the driving transistor is coupled to the third node.

4. The pixel driving circuit according to claim 1, wherein the writing sub-circuit includes a third transistor, wherein a gate of the third transistor is coupled to the first scan signal terminal, a first electrode of the third transistor is coupled to the data signal terminal, and a second electrode of the third transistor is coupled to the second node.

5. The pixel driving circuit according to claim 1, further comprising a second energy storage sub-circuit, wherein the second energy storage sub-circuit includes a second capacitor;

a first electrode plate of the second capacitor is coupled to the first voltage terminal, and a second electrode plate of the second capacitor is coupled to the first node; and wherein $$\frac{1}{5}Cst \leq C1 \leq \frac{1}{2}Cst,$$

C1 represents a capacitance of the first capacitor, and Cst represents a capacitance of the second capacitor.

6. The pixel driving circuit according to claim 1, further comprising a first reset sub-circuit, wherein the first reset sub-circuit is coupled to the first node, a first reset signal terminal, and a first initialization signal terminal; and the first reset sub-circuit is configured to, in a reset phase, transmit an initialization signal received at the first initialization signal terminal to the first node under control of a reset signal received from the first reset signal terminal, so as to reset the first node.

7. The pixel driving circuit according to claim 6, wherein the first reset sub-circuit includes a fourth transistor group, and the fourth transistor group includes at least two fourth transistors that are connected in series;

gates of all fourth transistors in the fourth transistor group are coupled to the first reset signal terminal, a first electrode of a first fourth transistor in the fourth transistor group is coupled to the first node, and a second electrode of a last fourth transistor in the fourth transistor group is coupled to the first initialization signal terminal;

the first reset signal terminal is configured to control at least one fourth transistor to be turned on at least once before a second electrode of the at least one fourth transistor is controlled to receive the initialization signal of the first initialization signal terminal.

8. The pixel driving circuit according to claim 1, further comprising a light-emitting control sub-circuit, wherein the light-emitting control sub-circuit is coupled to a first voltage terminal, an enable signal terminal, the second node, the third node and a light-emitting device; and the light-emitting control sub-circuit is configured to cooperate with the driving sub-circuit to transmit a driving signal to the light-emitting device under control of an enable signal from the enable signal terminal.

9. The pixel driving circuit according to claim 8, wherein the light-emitting control sub-circuit includes a fifth transistor and a sixth transistor;

a gate of the fifth transistor is coupled to the enable signal terminal, a first electrode of the fifth transistor is coupled to the first voltage terminal, and a second electrode of the fifth transistor is coupled to the second node;

a gate of the sixth transistor is coupled to the enable signal terminal, a first electrode of the sixth transistor is coupled to the third node, and a second electrode of the sixth transistor is coupled to the light-emitting device.

10. The pixel driving circuit according to claim 9, further comprising a second reset sub-circuit, wherein the second reset sub-circuit is coupled to a second reset signal terminal, a second initialization signal terminal, and the light-emitting device; and the second reset sub-circuit is configured to transmit an initialization signal received at the second initialization signal terminal to the light-emitting device under control of a reset signal received from the second reset signal terminal.

11. A display panel, comprising:

a plurality of pixel driving circuits according to claim 1; and a plurality of light-emitting devices electrically connected to the plurality of pixel driving circuits.

12. The display panel according to claim 11, comprising a substrate and a first gate conductive layer located on a side of the substrate, wherein the first gate conductive layer includes a second scan signal line, and the second scan signal line extends in a first direction;

the pixel driving circuit includes a second transistor and a seventh transistor;

the second scan signal line includes a first portion and a second portion;

the first portion is also used as a gate of the second transistor, and the second portion is also used as a gate of the seventh transistor.

13. The display panel according to claim 12, further comprising:

a shielding layer located on a side of the substrate proximate to the first gate conductive layer;

an active layer located between the shielding layer and the first gate conductive layer;

a second gate conductive layer located on a side of the first gate conductive layer away from the active layer; and a first source-drain conductive layer located on a side of the second gate conductive layer away from the active layer;

wherein the pixel driving circuit further includes a first capacitor, wherein a first electrode plate of the first capacitor and a second electrode plate of the first capacitor are located in at least two layers of the shielding layer, the active layer, the first gate conductive layer, the second gate conductive layer, and the first source-drain conductive layer.

14. The display panel according to claim 13, wherein the pixel driving circuit further includes a second capacitor, a third transistor and a fifth transistor;

the active layer includes an active portion of the third transistor, an active portion of the fifth transistor, and the first electrode plate of the first capacitor; the first electrode plate of the first capacitor is located between the active portion of the third transistor and the active portion of the fifth transistor;

the second gate conductive layer includes a first electrode plate of the second capacitor, and the second electrode plate of the first capacitor and the first electrode plate of the second capacitor are located in a same layer and electrically connected to each other; and/or, the first source-drain conductive layer includes a first electrode of the second transistor, a second electrode of the third transistor, and the second electrode plate of the first capacitor, and the second electrode plate of the first capacitor is located between the first electrode of the second transistor and the second electrode of the third transistor.

15. A driving method of a pixel driving circuit, wherein the pixel driving circuit includes: a driving sub-circuit, a writing sub-circuit, a compensation sub-circuit, a light-emitting control sub-circuit, an adjustment sub-circuit, and a first storage sub-circuit;

the driving sub-circuit is coupled to a first node, a second node and a third node;

the writing sub-circuit is coupled to the second node, a first scan signal terminal, and a data signal terminal;

the compensation sub-circuit is coupled to the first node, the third node, and a compensation control terminal;

the light-emitting control sub-circuit is coupled to a first voltage terminal, an enable signal terminal, the second node, the third node, and a light-emitting device;

the adjustment sub-circuit is coupled to at least one of the second node and the third node, and is further coupled to a second scan signal terminal and a first reference voltage signal terminal; and the first storage sub-circuit is coupled to a first voltage terminal and the second node, wherein the first storage sub-circuit includes a first capacitor, a first electrode plate of the first capacitor is coupled to the first voltage terminal, and a second electrode plate of the first capacitor is coupled to the second node;

the driving method comprising a plurality of light-emitting cycles, a light-emitting cycle including a reset phase, a writing phase, a first light-emitting phase, a light-emitting adjustment phase, and a second light-emitting phase, wherein in the writing phase, under control of a gate scan signal received from the first scan signal terminal, the writing sub-circuit transmits a data signal received at the data signal terminal to the second node, and the data signal received at the data signal terminal is also transmitted to the first capacitor of the first storage sub-circuit to charge the first capacitor at the same time; the driving sub-circuit transmits the data signal from the second node to the third node, and the compensation sub-circuit transmits a voltage of the third node to the first node;

in the first light-emitting phase, under control of an enable signal from the enable signal terminal, the light-emitting control sub-circuit cooperates with the driving sub-circuit to transmit a voltage signal provided by the first voltage terminal to the light-emitting device, so as to drive the light-emitting device to emit light; and the first storage sub-circuit discharges electricity to the second node, so as to compensate a voltage of the second node;

in the light-emitting adjustment phase, the adjustment sub-circuit transmits a reference voltage signal received at the first reference voltage signal terminal to the at least one of the second node and the third node under control of a scan signal transmitted by the second scan signal terminal;

in the second light-emitting stage, under control of the enable signal from the enable signal terminal and the first node, the light-emitting control sub-circuit and the driving sub-circuit cooperate to transmit the voltage signal provided by the first voltage terminal to the light-emitting device, so as to drive the light-emitting device to emit light.

16. The driving method according to claim 15, wherein in the reset phase, the adjustment sub-circuit transmits the reference voltage signal received at the first reference voltage signal terminal to the second node to reset the second node at least once.

17. The driving method according to claim 16, wherein the pixel driving circuit further includes a first reset sub-circuit;

the first reset sub-circuit is coupled to the first node, a first reset signal terminal, and a first initialization signal terminal;

in the reset phase, after the adjustment sub-circuit resets the second node, the first reset sub-circuit transmits an initialization signal received at the first initialization signal terminal to the first node under control of a reset signal received from the first reset signal terminal.

18. The driving method according to claim 15, wherein in the writing phase, after the data signal received at the data signal terminal is transmitted to the first node, the adjustment sub-circuit transmits the reference voltage signal received at the first reference voltage signal terminal to the second node under the control of the scan signal transmitted by the second scan signal terminal, so as to reset the second node.

19. The driving method according to claim 15, wherein the pixel driving circuit further includes a second reset sub-circuit coupled to a second reset signal terminal, a second initialization signal terminal, and the light-emitting device;

the second reset signal terminal and the second scan signal terminal are controlled in response a same control signal; in the reset phase and the light-emitting adjustment phase, the adjustment sub-circuit transmits the reference voltage signal received at the first reference voltage signal terminal to the second node, and at the same time the second reset sub-circuit transmits an initialization signal received at the second initialization signal terminal to the light-emitting device under control of a reset signal received from the second reset signal terminal; or the reset signal received from the second reset signal terminal and the enable signal received at the enable signal terminal are inverted; in the reset phase and the light-emitting adjustment phase, the second reset sub-circuit transmits the initialization signal received at the second initialization signal terminal to the light-emitting device under control of the reset signal received from the second reset signal terminal.

* * * * *